United States Patent
Deshpande

(10) Patent No.: US 9,699,480 B2
(45) Date of Patent: Jul. 4, 2017

(54) LEVEL LIMITS

(71) Applicant: Sharp Laboratories of America, Inc., Camas, WA (US)

(72) Inventor: Sachin G. Deshpande, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 200 days.

(21) Appl. No.: 14/738,552

(22) Filed: Jun. 12, 2015

(65) Prior Publication Data

US 2015/0365702 A1 Dec. 17, 2015

Related U.S. Application Data

(60) Provisional application No. 62/012,021, filed on Jun. 13, 2014.

(51) Int. Cl.
*H04N 19/70* (2014.01)
*H04N 19/44* (2014.01)
*H04N 19/30* (2014.01)

(52) U.S. Cl.
CPC ............ *H04N 19/70* (2014.11); *H04N 19/30* (2014.11); *H04N 19/44* (2014.11)

(58) Field of Classification Search
CPC ............................... H04N 19/70; H04N 19/39
See application file for complete search history.

(56) References Cited

U.S. PATENT DOCUMENTS

| | | | |
|---|---|---|---|
| 2015/0103888 A1* | 4/2015 | Chen ................... | H04N 21/4343 375/240.02 |
| 2015/0195578 A1* | 7/2015 | Chen .............. | H04N 21/234327 375/240.26 |
| 2015/0264404 A1* | 9/2015 | Hannuksela ........... | H04N 19/70 375/240.16 |
| 2015/0304665 A1* | 10/2015 | Hannuksela ........... | H04N 19/70 375/240.02 |
| 2015/0319462 A1* | 11/2015 | Ramasubramanian | H04N 19/39 375/240.29 |

OTHER PUBLICATIONS

Bros et al., "High efficiency video coding (HEVC) text specification draft 10," JCTVC-L1003, Geneva, Jan. 2013, 50 pgs., Part 1.
Bros et al., "High efficiency video coding (HEVC) text specification draft 10," JCTVC-L1003, Geneva, Jan. 2013, 50 pgs., Part 2.
Bros et al., "High efficiency video coding (HEVC) text specification draft 10," JCTVC-L1003, Geneva, Jan. 2013, 50 pgs., Part 3.

(Continued)

*Primary Examiner* — Tung Vo
*Assistant Examiner* — Rowina Cattungal
(74) *Attorney, Agent, or Firm* — Chernoff Vilhauer McClung & Stenzel, LLP

(57) ABSTRACT

A system for encoding and/or decoding a video bitstream that includes a base bitstream and enhancement bitstreams representative of a video sequence. The receiver receives a video parameter set and a video parameter set extension, where the video parameter set extension includes decoder picture buffer parameters.

1 Claim, 22 Drawing Sheets

(56) References Cited

OTHER PUBLICATIONS

Bros et al., "High efficiency video coding (HEVC) text specification draft 10," JCTVC-L1003, Geneva, Jan. 2013, 50 pgs., Part 4.
Bros et al., "High efficiency video coding (HEVC) text specification draft 10," JCTVC-L1003, Geneva, Jan. 2013, 50 pgs., Part 5.
Bros et al., "High efficiency video coding (HEVC) text specification draft 10," JCTVC-L1003, Geneva, Jan. 2013, 50 pgs., Part 6.
Bros et al., "High efficiency video coding (HEVC) text specification draft 10," JCTVC-L1003, Geneva, Jan. 2013, 10 pgs., Part 7.
Tech et al., "MV-HEVC Draft Text 8," JCT3V-H1002, Valencia, ES, May 2014, 50 pgs., Part 1.
Tech et al., "MV-HEVC Draft Text 8," JCT3V-H1002, Valencia, ES, May 2014, 50 pgs., Part 2.
Tech et al., "MV-HEVC Draft Text 8," JCT3V-H1002, Valencia, ES, May 2014, 50 pgs., Part 3.
Tech et al., "MV-HEVC Draft Text 8," JCT3V-H1002, Valencia, ES, May 2014, 14 pgs., Part 4.
Chen et al., "High Efficiency Video Coding (HEVC) Scalable Extension Draft 6," JCTVC-Q1008, Valencia, ES, May 2014, 50 pgs., Part 1.
Chen et al., "High Efficiency Video Coding (HEVC) Scalable Extension Draft 6," JCTVC-Q1008, Valencia, ES, May 2014, 50 pgs., Part 2.
Chen et al., "High Efficiency Video Coding (HEVC) Scalable Extension Draft 6," JCTVC-Q1008, Valencia, ES, May 2014, 50 pgs., Part 3.
Chen et al., "High Efficiency Video Coding (HEVC) Scalable Extension Draft 6," JCTVC-Q1008, Valencia, ES, May 2014, 31 pgs., Part 4.

* cited by examiner

| nal_unit_header( ) { | Descriptor |
|---|---|
|   forbidden_zero_bit | f(1) |
|   nal_unit_type | u(6) |
|   nuh_reserved_zero_6bits | u(6) |
|   nuh_temporal_id_plus1 | u(3) |
| } | |

NAL UNIT HEADER SYNTAX

FIG. 9A

| nal_unit_header( ) { | Descriptor |
|---|---|
|   forbidden_zero_bit | f(1) |
|   nal_unit_type | u(6) |
|   layer_id_plus1 | u(6) |
|   nuh_temporal_id_plus1 | u(3) |
| } | |

NAL UNIT HEADER SYNTAX

FIG. 9B

| nal_unit_header( ) { | Descriptor |
|---|---|
|   forbidden_zero_bit | f(1) |
|   nal_unit_type | u(6) |
|   layer_id | u(6) |
|   nuh_temporal_id_plus1 | u(3) |
| } | |

NAL UNIT HEADER SYNTAX

FIG. 9C

| nal_unit( NumBytesInNALunit ) { | Descriptor |
|---|---|
|   nal_unit_header( ) | |
|   NumBytesInRBSP = 0 | |
|   for( i = 2; i < NumBytesInNALunit; i++ ) { | |
|     if( i + 2 < NumBytesInNALunit && next_bits( 24 ) == 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

GENERAL NAL UNIT SYNTAX

FIG. 10

| vps_extension( ) { | Descriptor |
|---|---|
|   while( !byte_aligned( ) ) | |
|     vps_extension_byte_alignment_reserved_one_bit | u(1) |
|   ... | |
|   num_output_layer_sets | ue(v) |
|   for( i = 0; i < num_output_layer_sets; i++ ) { | |
|     output_layer_set_idx [ i ] | ue(v) |
|     lsIdx = output_layer_set_idx [ i ] | |
|     for( j = 0 ; j < vps_max_layer_id; j++) | |
|       if( layer_id_included_flag[ lsIdx ][ j ]) | |
|         output_layer_flag[ lsIdx ][ j ] | u(1) |
|   } | |
|   num_op_dpb_info_parameters | ue(v) |
|   for( i = 0; i < num_op_dpb_info_parameters; i++) { | |
|     operation_point_layer_set_idx[i] | ue(v) |
|     for( j = 0; j <= vps_max_layer_id; j++ ) | |
|       op_dpb_info_parameters(j) | |
|   } | |
|   ... | |
| } | |

Figure 10A

| vps_extension( ) { | Descriptor |
|---|---|
|   while( !byte_aligned( ) ) | |
|     vps_extension_byte_alignment_reserved_one_bit | u(1) |
|   ... | |
|   num_output_layer_sets | ue(v) |
|   for( i = 0; i < num_output_layer_sets; i++ ) { | |
|     output_layer_set_idx [ i ] | ue(v) |
|     lsIdx = output_layer_set_idx [ i ] | |
|     for( j = 0 ; j < vps_max_layer_id; j++) | |
|       if( layer_id_included_flag[ lsIdx ][ j ]) | |
|         output_layer_flag[ lsIdx ][ j ] | u(1) |
|   } | |
|   num_op_dpb_info_parameters | ue(v) |
|   for( i = 0; i < num_op_dpb_info_parameters; i++ ) { | |
|     operation_point_layer_set_idx[i] | ue(v) |
|     for( j = 0; j <= vps_max_layer_id; j++ ) | |
|       op_dpb_info_parameters(j) | |
|   } | |
|   ... | |
| } | |

Figure 10B

| vps_extension( ) { | Descriptor |
|---|---|
|   while( !byte_aligned( ) ) | |
|     vps_extension_byte_alignment_reserved_one_bit | u(1) |
|   ... | |
|   for( i = 1; i < NumOutputLayerSets; i++ ) { | |
|     vps_sub_layer_ordering_info_present_flag[ i ] | u(1) |
|     for( j =( vps_sub_layer_ordering_info_present_flag[ i ] ? 0: vps_max_sub_layers_minus1); j <= vps_max_sub_layers_minus1; j++ ) { | |
|       for( k = 0; k < NumLayersInOutputLayerSet[ i ]; k++ ) | |
|         max_vps_dec_pic_buffering_minus1[ i ][ k ][ j ] | ue(v) |
|         max_vps_num_reorder_pics[ i ][ j ] | ue(v) |
|         max_vps_latency_increase_plus1[ i ][ j ] | ue(v) |
|     } | |
|   } | |
|   } | |
|   ... | |
| } | |

Figure 10X

| op_dpb_info_parameters(j) { | |
|---|---|
|   vps_max_sub_layers_minus1[ j ] | u(3) |
|   vps_sub_layer_ordering_info_present_flag[ j ] | u(1) |
|   for( k = ( vps_sub_layer_ordering_info_present_flag[ j ] ? 0 : vps_max_sub_layers_minus1[ j ] ); k <= vps_max_sub_layers_minus1[ j ]; k++ ) { | |
|     vps_max_dec_pic_buffering_minus1[ j ][ k ] | ue(v) |
|     vps_max_num_reorder_pics[ j ][ k ] | ue(v) |
|     vps_max_latency_increase_plus1[ j ][ k ] | ue(v) |
|   } | |
| } | |

Figure 11A

| | |
|---|---|
| op_dpb_info_parameters( id, j ) { | |
| vps_max_sub_layers_minus1[ id ][ j ] | u(3) |
| vps_sub_layer_ordering_info_present_flag[ id ][ j ] | u(1) |
| for( k = ( vps_sub_layer_ordering_info_present_flag[ id ][ j ] ? 0 : vps_max_sub_layers_minus1[ id ][ j ] ); k <= vps_max_sub_layers_minus1[ id ][ j ]; k++ ) { | |
|   vps_max_dec_pic_buffering_minus1[ id ][ j ][ k ] | ue(v) |
|   vps_max_num_reorder_pics[ id ][ j ][ k ] | ue(v) |
|   vps_max_latency_increase_plus1[ id ][ j ][ k ] | ue(v) |
|   } | |
| } | |

Figure 11B

| vps_extension( ) { | Descriptor |
|---|---|
|   while( !byte_aligned( ) ) | |
|     vps_extension_byte_alignment_reserved_one_bit | u(1) |
|   ... | |
|   num_output_layer_sets | ue(v) |
|   for( i = 0; i < num_output_layer_sets; i++ ) { | |
|     output_layer_set_idx[ i ] | ue(v) |
|     lsIdx = output_layer_set_idx[ i ] | |
|     for( j = 0 ; j <= vps_max_layer_id; j++) | |
|       if( layer_id_included_flag[ lsIdx ][ j ] ) | |
|         output_layer_flag[ lsIdx ][ j ] | u(1) |
| } | |
|   num_dpb_info_parameters | ue(v) |
|   for( i = 0; i < num_dpb_info_parameters; i++ ) { | |
|     output_point_layer_set_idx[i] | ue(v) |
|     oplsIdx=output_point_layer_set_idx[i] | |
|     for( j = 0; j <= vps_max_layer_id; j++ ) | |
|       oop_dpb_info_parameters(j) | |
| } | |
|   ... | |
| } | |

Figure 12

| | |
|---|---|
| oop_dpb_info_parameters(j) { | |
|   vps_max_sub_layers_minus1[ j ] | u(3) |
|   vps_sub_layer_ordering_info_present_flag[ j ] | u(1) |
|   for( k = ( vps_sub_layer_ordering_info_present_flag[ j ] ? 0 : vps_max_sub_layers_minus1[ j ] ); k <= vps_max_sub_layers_minus1[ j ]; k++ ) { | |
|     vps_max_dec_pic_buffering_minus1[ j ][ k ] | ue(v) |
|     vps_max_num_reorder_pics[ j ][ k ] | ue(v) |
|     vps_max_latency_increase_plus1[ j ][ k ] | ue(v) |
|   } | |
| } | |

Figure 13

| | |
|---|---|
| oop_dpb_info_parameters() { | |
|   vps_max_sub_layers_minus1 | u(3) |
|   vps_sub_layer_ordering_info_present_flag | u(1) |
|   for( k = ( vps_sub_layer_ordering_info_present_flag ? 0 : vps_max_sub_layers_minus1 ); k <= vps_max_sub_layers_minus1; k++ ) { | |
|     vps_max_dec_pic_buffering_minus1[ k ] | ue(v) |
|     vps_max_num_reorder_pics[ k ] | ue(v) |
|     vps_max_latency_increase_plus1[ k ] | ue(v) |
|   } | |
| } | |

Figure 14

| | |
|---|---|
| num_dpb_info_parameters | ue(v) |
| for( i = 0; i < num_dpb_info_parameters; i++ ) { | |
|   output_point_layer_set_idx[i] | ue(v) |
|   opIsIdx=output_point_layer_set_idx[i] | |
|   for( j = 0; j <=vps_max_layer_id; j++ ) | |
|     oop_dpb_info_parameters() | |
| } | |

Figure 15

| | |
|---|---|
| oop_dpb_info_parameters( id, j ) { | |
|   vps_max_sub_layers_minus1[ id ][ j ] | u(3) |
|   vps_sub_layer_ordering_info_present_flag[ id ][ j ] | u(1) |
|   for( k = ( vps_sub_layer_ordering_info_present_flag[ id ][ j ] ? 0 : vps_max_sub_layers_minus1[ id ][ j ] ); k <= vps_max_sub_layers_minus1[ id ][ j ]; k++ ) { | |
|     vps_max_dec_pic_buffering_minus1[ id ][ j ][ k ] | ue(v) |
|     vps_max_num_reorder_pics[ id ][ j ][ k ] | ue(v) |
|     vps_max_latency_increase_plus1[ id ][ j ][ k ] | ue(v) |
|   } | |
| } | |

Figure 16

| | |
|---|---|
| num_dpb_info_parameters | ue(v) |
| for( i = 0; i < num_dpb_info_parameters; i++ ) { | |
|   output_point_layer_set_idx[i] | ue(v) |
|   oplsIdx=output_point_layer_set_idx[i] | |
|   for( j = 0; j <= vps_max_layer_id; j++ ) | |
|     oop_dpb_info_parameters(oplsIdx,j) | |
| } | |

Figure 17

| | |
|---|---|
| num_dpb_info_parameters | ue(v) |
| for( i = 0; i < num_dpb_info_parameters; i++ ) { | |
|   output_point_layer_set_idx[i] | ue(v) |
|   oplsIdx=output_point_layer_set_idx[i] | |
|   for( j = 0; j <= vps_max_layer_id; j++ ) | |
|     oop_dpb_info_parameters(i,j) | |
| } | |

Figure 18

| vps_extension( ) { | Descriptor |
|---|---|
|   while( !byte_aligned( ) ) | |
|     vps_extension_byte_alignment_reserved_one_bit | u(1) |
|   ... | |
|   for( i = 1; i <= vps_max_layers_minus1; i++ ) { | |
|     layer_dpb_info(i) | |
|   } | |
|   ... | |
| } | |

| layer_dpb_info (i) { | |
|---|---|
|   vps_max_sub_layers_minus1[ i ] | u(3) |
|   vps_sub_layer_ordering_info_present_flag[ i ] | u(1) |
|   for( k = ( vps_sub_layer_ordering_info_present_flag[ i ] ? 0 : vps_max_sub_layers_minus1[ i ] ); k <= vps_max_sub_layers_minus1[ i ]; k++ ) { | |
|     vps_max_dec_pic_buffering_minus1[ i ][ k ] | ue(v) |
|     vps_max_num_reorder_pics[ i ][ k ] | ue(v) |
|     vps_max_latency_increase_plus1[ i ][ k ] | ue(v) |
|   } | |
| } | |

Figure 19

| oop_dpb_info_parameters(id) / op_dpb_info_parameters( id)/ layer_dpb_info(id) { | |
|---|---|
|   vps_sub_layer_ordering_info_present_flag[id] | u(1) |
|   for( i = ( vps_sub_layer_ordering_info_present_flag ? 0 : vps_max_sub_layers_minus1 ); i <= vps_max_sub_layers_minus1; i++ ) { | |
|     vps_max_dec_pic_buffering_minus1[id][ i ] | ue(v) |
|     vps_max_num_reorder_pics[id][ i ] | ue(v) |
|     vps_max_latency_increase_plus1[id][ i ] | ue(v) |
|   } | |
| } | |

Figure 20

LEVEL LIMITS

CROSS-REFERENCE TO RELATED APPLICATIONS

This application claims the benefit of U.S. Provisional App. No. 62/012,021, filed Jun. 13, 2014.

TECHNICAL FIELD

The present disclosure relates generally to electronic devices. More specifically, the present disclosure relates to electronic devices for signaling sub-picture based hypothetical reference decoder parameters.

BACKGROUND OF THE INVENTION

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and rapid playback presents several challenges. As can be observed from this discussion, systems and methods that represent digital media efficiently with improved performance may be beneficial.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIGS. 9A-9C illustrates different NAL Unit header syntax.

FIG. 10 illustrates a general NAL Unit syntax.

FIG. 10A illustrates an exemplary video parameter extension syntax.

FIG. 10B illustrates an exemplary video parameter extension syntax.

FIG. 10X illustrates an exemplary video parameter extension syntax.

FIG. 11A illustrates an exemplary op_dpb_info_parameters(j) syntax.

FIG. 11B illustrates an exemplary op_dpb_info_parameters(j) syntax.

FIG. 12 illustrates another exemplary video parameter extension syntax.

FIG. 13 illustrates another exemplary oop_dpb_info_parameters(j) syntax.

FIG. 14 illustrates another exemplary oop_dpb_info_parameters(j) syntax.

FIG. 15 illustrates an exemplary num_dpb_info_parameters syntax.

FIG. 16 illustrates another exemplary oop_dpb_info_parameters(j) syntax.

FIG. 17 illustrates another exemplary num_dpb_info_parameters syntax.

FIG. 18 illustrates another exemplary num_dpb_info_parameters syntax.

FIG. 19 illustrates another exemplary video parameter extension syntax and layer_dpb_info(i).

FIG. 20 illustrates an exemplary oop_dpb_info_parameters and layer_dpb_info(i) syntax.

DETAILED DESCRIPTION OF PREFERRED EMBODIMENT

Figure 1A:
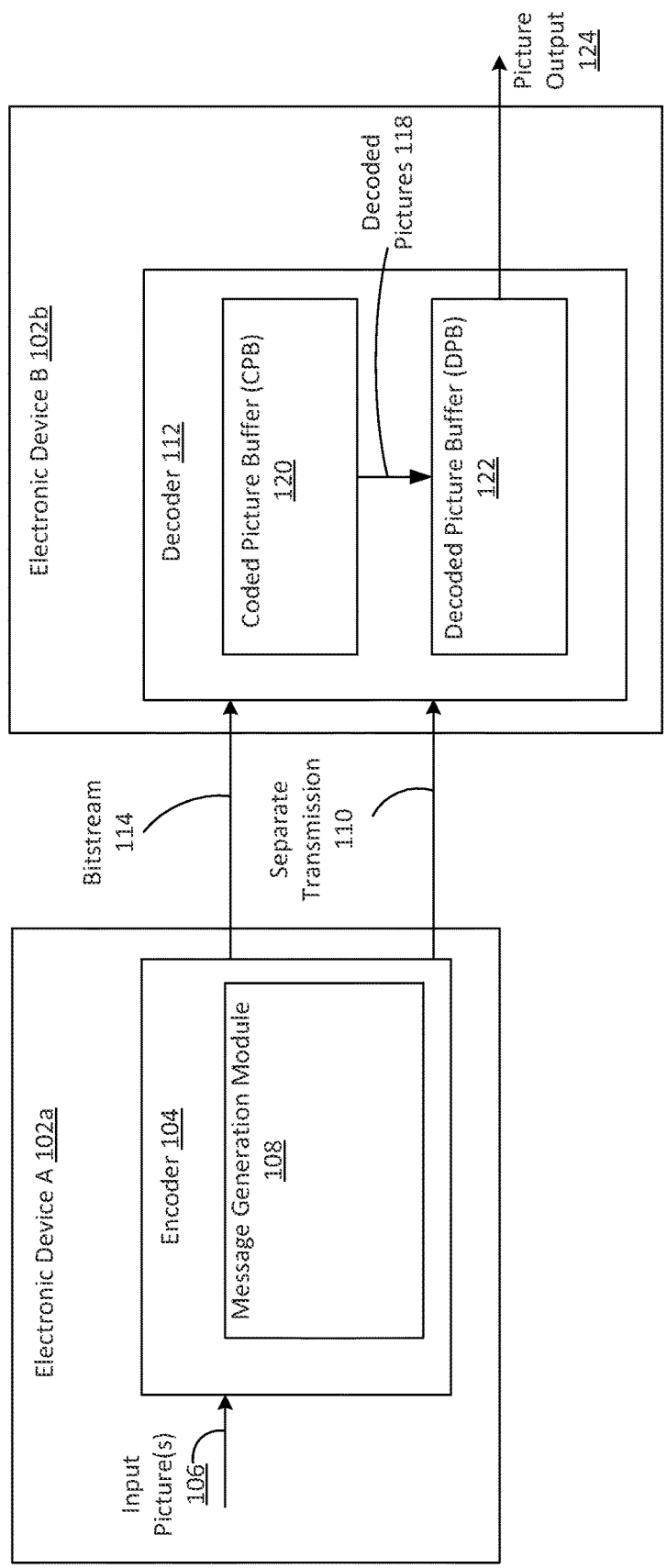
FIG. 1A is a block diagram illustrating an example of one or more electronic devices in which systems and methods for sending a message and buffering a bitstream may be implemented.

An electronic device for sending a message is described. The electronic device includes a processor and instructions stored in memory that is in electronic communication with the processor. The electronic device determines, when a Coded Picture Buffer (CPB) supports operation on a sub-picture level, whether to include a common decoding unit CPB removal delay parameter in a picture timing Supplemental Enhancement Information (SEI) message. The electronic device also generates, when the common decoding unit CPB removal delay parameter is to be included in the picture timing SEI message (or some other SEI message or some other parameter set e.g. picture parameter set or sequence parameter set or video parameter set or adaptation parameter set), the common decoding unit CPB removal delay parameter, wherein the common decoding unit CPB removal delay parameter is applicable to all decoding units in an access unit from the CPB. The electronic device also generates, when the common decoding unit CPB removal delay parameter is not to be included in the picture timing SEI message, a separate decoding unit CPB removal delay parameter for each decoding unit in the access unit. The electronic device also sends the picture timing SEI message with the common decoding unit CPB removal delay parameter or the decoding unit CPB removal delay parameters.

The common decoding unit CPB removal delay parameter may specify an amount of sub-picture clock ticks to wait after removal from the CPB of an immediately preceding decoding unit before removing from the CPB a current decoding unit in the access unit associated with the picture timing SEI message.

Furthermore, when a decoding unit is a first decoding unit in an access unit, the common decoding unit CPB removal delay parameter may specify an amount of sub-picture clock ticks to wait after removal from the CPB of a last decoding unit in an access unit associated with a most recent buffering period SEI message in a preceding access unit before removing from the CPB the first decoding unit in the access unit associated with the picture timing SEI message.

In contrast, when the decoding unit is a non-first decoding unit in an access unit, the common decoding unit CPB removal delay parameter may specify an amount of sub-picture clock ticks to wait after removal from the CPB of a preceding decoding unit in the access unit associated with the picture timing SEI message before removing from the CPB a current decoding unit in the access unit associated with the picture timing SEI message.

The decoding unit CPB removal delay parameters may specify an amount of sub-picture clock ticks to wait after removal from the CPB of the last decoding unit before removing from the CPB an i-th decoding unit in the access unit associated with the picture timing SEI message.

The electronic device may calculate the decoding unit CPB removal delay parameters according to a remainder of a modulo $2^{cpb\_removal\_delay\_length\_minus1+1}$ counter where cpb_removal_delay_length_minus1+1 is a length of a common decoding unit CPB removal delay parameter.

The electronic device may also generate, when the CPB supports operation on an access unit level, a picture timing SEI message including a CPB removal delay parameter that specifies how many clock ticks to wait after removal from the CPB of an access unit associated with a most recent buffering period SEI message in a preceding access unit before removing from the CPB the access unit data associated with the picture timing SEI message.

The electronic device may also determine whether the CPB supports operation on a sub-picture level or an access unit level. This may include determining a picture timing flag that indicates whether a Coded Picture Buffer (CPB) provides parameters supporting operation on a sub-picture level based on a value of the picture timing flag. The picture timing flag may be included in the picture timing SEI message.

Determining whether to include a common decoding unit CPB removal delay parameter may include setting a common decoding unit CPB removal delay flag to 1 when the common decoding unit CPB removal delay parameter is to be included in the picture timing SEI message. It may also include setting the common decoding unit CPB removal delay flag to 0 when the common decoding unit CPB removal delay parameter is not to be included in the picture timing SEI message. The common decoding unit CPB removal delay flag may be included in the picture timing SEI message.

The electronic device may also generate, when the CPB supports operation on a sub-picture level, separate network abstraction layer (NAL) units related parameters that indicate an amount, offset by one, of NAL units for each decoding unit in an access unit. Alternatively, or in addition to, the electronic device may generate a common NAL parameter that indicates an amount, offset by one, of NAL units common to each decoding unit in an access unit.

An electronic device for buffering a bitstream is also described. The electronic device includes a processor and instructions stored in memory that is in electronic communication with the processor. The electronic device determines that a CPB signals parameters on a sub-picture level for an access unit. The electronic device also determines, when a received picture timing Supplemental Enhancement Information (SEI) message comprises the common decoding unit Coded Picture Buffer (CPB) removal delay flag, a common decoding unit CPB removal delay parameter applicable to all decoding units in the access unit. The electronic device also determines, when the picture timing SEI message does not comprise the common decoding unit CPB removal delay flag, a separate decoding unit CPB removal delay parameter for each decoding unit in the access unit. The electronic device also removes decoding units from the CPB using the common decoding unit CPB removal delay parameter or the separate decoding unit CPB removal delay parameters. The electronic device also decodes the decoding units in the access unit.

When sub_pic_cpb_params_present_flag equals to 1 then sub-picture level CPB removal delay parameters are present and the CPB may operate at access unit level or sub-picture level. sub_pic_cpb_params_present_flag equal to 0 specifies that sub-picture level CPB removal delay parameters are not present and the CPB operates at access unit level. When sub_pic_cpb_params_present_flag is not present, its value is inferred to be equal to 0.

Specifically, one example of timing of decoding unit removal and decoding of decoding unit implementation is as follows. The variable SubPicCpbPreferredFlag is either specified by external means, or when not specified by external means, set to 0. The variable SubPicCpbFlag is derived as follows: SubPicCpbFlag=SubPicCpbPreferredFlag && sub_pic_cpb_params_present_flag. If SubPicCpbFlag is equal to 0, the CPB operates at access unit level and each decoding unit is an access unit. Otherwise the CPB operates at sub-picture level and each decoding unit is a subset of an access unit.

If SubPicCpbFlag is equal to 0, the variable CpbRemovalDelay(m) is set to the value of cpb_removal_delay in the picture timing SEI message associated with the access unit that is decoding unit m, and the variable $T_c$ is set to $t_c$. Otherwise the variable CpbRemovalDelay(m) is set to the value of du_cpb_removal_delay[i] for decoding unit m in the picture timing SEI message associated with the access unit that contains decoding unit m, and the variable $T_c$ is set to $t_{c\_sub}$.

As illustrated by the foregoing, the systems and methods disclosed herein provide syntax and semantics that modify a picture timing SEI message bitstreams carrying sub-picture based parameters. In some configurations, the systems and methods disclosed herein may be applied to HEVC specifications.

For convenience, several definitions are given as follows, which may be applied to the systems and methods disclosed herein. A random access point may be any point in a stream of data (e.g., bitstream) where decoding of the bitstream does not require access to any point in a bitstream preceding the random access point to decode a current picture and all pictures subsequent to said current picture in output order.

A buffering period may be specified as a set of access units between two instances of the buffering period SEI message in decoding order. Supplemental Enhancement Information (SEI) may contain information that is not necessary to decode the samples of coded pictures from VCL NAL units. SEI messages may assist in procedures related to decoding, display or other purposes. Conforming decoders may not be required to process this information for output order conformance to HEVC specifications (Annex C of HEVC specifications (JCTVC-11003) includes specifications for conformance, for example). Some SEI message information may be used to check bitstream conformance and for output timing decoder conformance.

A buffering period SEI message may be an SEI message related to buffering period. A picture timing SEI message may be an SEI message related to CPB removal timing. These messages may define syntax and semantics which define bitstream arrival timing and coded picture removal timing.

A Coded Picture Buffer (CPB) may be a first-in first-out buffer containing access units in decoding order specified in a hypothetical reference decoder (HRD). An access unit may be a set of Network Access Layer (NAL) units that are consecutive in decoding order and contain exactly one coded picture. In addition to the coded slice NAL units of the coded picture, the access unit may also contain other NAL units not containing slices of the coded picture. The decoding of an access unit always results in a decoded picture. A NAL unit may be a syntax structure containing an indication of the type of data to follow and bytes containing that data in the form of a raw byte sequence payload interspersed as necessary with emulation prevention bytes.

As used herein, the term "common" generally refers to a syntax element or a variable that is applicable to more than one thing. For example, in the context of syntax elements in a picture timing SEI message, the term "common" may mean that the syntax element (e.g., common_du_cpb_removal_delay) is applicable to all decoding units in an access unit associated with the picture timing SEI message. Additionally, units of data are described in terms of "n" and "m" generally refer to access units and decoding units, respectively.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1A is a block diagram illustrating an example of one or more electronic devices 102 in which systems and methods for sending a message and buffering a bitstream may be implemented. In this example, electronic device A 102a and electronic device B 102b are illustrated. However, it should be noted that one or more of the features and functionality described in relation to electronic device A 102a and electronic device B 102b may be combined into a single electronic device in some configurations.

Electronic device A 102a includes an encoder 104. The encoder 104 includes a message generation module 108. Each of the elements included within electronic device A 102a (e.g., the encoder 104 and the message generation module 108) may be implemented in hardware, software or a combination of both.

Electronic device A 102a may obtain one or more input pictures 106. In some configurations, the input picture(s) 106 may be captured on electronic device A 102a using an image sensor, may be retrieved from memory and/or may be received from another electronic device.

The encoder 104 may encode the input picture(s) 106 to produce encoded data. For example, the encoder 104 may encode a series of input pictures 106 (e.g., video). In one configuration, the encoder 104 may be a HEVC encoder. The encoded data may be digital data (e.g., part of a bitstream 114). The encoder 104 may generate overhead signaling based on the input signal.

The message generation module 108 may generate one or more messages. For example, the message generation module 108 may generate one or more SEI messages or other messages. For a CPB that supports operation on a sub-picture level, the electronic device 102 may send sub-picture parameters, (e.g., CPB removal delay parameter). Specifically, the electronic device 102 (e.g., the encoder 104) may determine whether to include a common decoding unit CPB removal delay parameter in a picture timing SEI message. For example, the electronic device may set a flag (e.g., common_du_cpb_removal_delay_flag) to one when the encoder 104 is including a common decoding unit CPB removal delay parameter (e.g., common_du_cpb_removal_delay) in the picture timing SEI message. When the common decoding unit CPB removal delay parameter is included, the electronic device may generate the common decoding unit CPB removal delay parameter that is applicable to all decoding units in an access unit. In other words, rather than including a decoding unit CPB removal delay parameter for each decoding unit in an access unit, a common parameter may apply to all decoding units in the access unit with which the picture timing SEI message is associated.

In contrast, when the common decoding unit CPB removal delay parameter is not to be included in the picture timing SEI message, the electronic device 102 may generate a separate decoding unit CPB removal delay for each decoding unit in the access unit with which the picture timing SEI message is associated. A message generation module 108 may perform one or more of the procedures described in connection with FIG. 2 and FIG. 3 below.

In some configurations, electronic device A 102a may send the message to electronic device B 102b as part of the bitstream 114. In some configurations electronic device A 102a may send the message to electronic device B 102b by a separate transmission 110. For example, the separate transmission may not be part of the bitstream 114. For instance, a picture timing SEI message or other message may be sent using some out-of-band mechanism. It should be noted that, in some configurations, the other message may include one or more of the features of a picture timing SEI message described above. Furthermore, the other message, in one or more aspects, may be utilized similarly to the SEI message described above.

The encoder 104 (and message generation module 108, for example) may produce a bitstream 114. The bitstream 114 may include encoded picture data based on the input picture(s) 106. In some configurations, the bitstream 114 may also include overhead data, such as a picture timing SEI message or other message, slice header(s), PPS(s), etc. As additional input pictures 106 are encoded, the bitstream 114 may include one or more encoded pictures. For instance, the bitstream 114 may include one or more encoded pictures with corresponding overhead data (e.g., a picture timing SEI message or other message).

The bitstream 114 may be provided to a decoder 112. In one example, the bitstream 114 may be transmitted to electronic device B 102b using a wired or wireless link. In some cases, this may be done over a network, such as the Internet or a Local Area Network (LAN). As illustrated in FIG. 1A, the decoder 112 may be implemented on electronic device B 102b separately from the encoder 104 on electronic device A 102a. However, it should be noted that the encoder 104 and decoder 112 may be implemented on the same electronic device in some configurations. In an implementation where the encoder 104 and decoder 112 are implemented on the same electronic device, for instance, the bitstream 114 may be provided over a bus to the decoder 112 or stored in memory for retrieval by the decoder 112.

The decoder 112 may be implemented in hardware, software or a combination of both. In one configuration, the decoder 112 may be a HEVC decoder. The decoder 112 may receive (e.g., obtain) the bitstream 114. The decoder 112 may generate one or more decoded pictures 118 based on the bitstream 114. The decoded picture(s) 118 may be displayed, played back, stored in memory and/or transmitted to another device, etc.

The decoder 112 may include a CPB 120. The CPB 120 may temporarily store encoded pictures. The CPB 120 may use parameters found in a picture timing SEI message to determine when to remove data. When the CPB 120 supports operation on a sub-picture level, individual decoding units may be removed rather than entire access units at one time. The decoder 112 may include a Decoded Picture Buffer (DPB) 122. Each decoded picture is placed in the DPB 122 for being referenced by the decoding process as well as for output and cropping. A decoded picture is removed from the DPB at the later of the DPB output time or the time that it becomes no longer needed for inter-prediction reference.

The decoder 112 may receive a message (e.g., picture timing SEI message or other message). The decoder 112 may also determine whether the received message includes a common decoding unit CPB removal delay parameter (e.g., common_du_cpb_removal_delay). This may include identifying a flag (e.g., common_du_cpb_removal_delay_flag) that is set when the common parameter is present in the picture timing SEI message. If the common parameter is present, the decoder 112 may determine the common decoding unit CPB removal delay parameter applicable to all decoding units in the access unit. If the common parameter is not present, the decoder 112 may determine a separate decoding unit CPB removal delay parameter for each decoding unit in the access unit. The decoder 112 may also remove decoding units from the CPB 120 using either the common decoding unit CPB removal delay parameter or the separate decoding unit CPB removal delay parameters. The CPB 120 may perform one or more of the procedures described in connection with FIG. 4 and FIG. 5 below.

The decoded picture buffer (DPB) 122 may include separately identified and managed picture buffers for decoded pictures having different characteristics. For example, the decoded picture buffer (DPB) 122 may include separately identified and managed picture buffers for decoded pictures with different resolutions, different bit-depths and/or different color chromaticity.

A decoded picture may instead be stored in a common pool of picture storage buffers in the decoded picture buffer (DPB) 122. For example, two additional sub-cases may be used to determine the decoded picture buffer (DPB) 122 size constraints that affect the bumping/removal process and level definitions. In a byte based decoded picture buffer (DPB) 122 constraint, a decoded picture may be stored with consideration for the size based on resolution and/orbit-depth. The decoded picture buffer (DPB) 122 size constraints may be defined as a byte limit that considers resolution and bit-depth of each decoded picture. In a picture unit based decoded picture buffer (DPB) 122 constraint, a decoded picture may be stored (and is considered to take one picture buffer slot). The decoded picture buffer (DPB) 122 size constraints may then be defined as a number of picture slots limit without considering resolution and bit-depth of each decoded picture.

In one configuration, the decoded picture buffer (DPB) fullness may be tracked per layer. For example, the decoded picture buffer (DPB) 122 size constraints may be signaled, and bumping may be applied, per layer. Where each layer with layer identifier nuh_layer_id includes its own picture storage buffers a variable DPBFullness[nuh_layer_id] could be used to track to the decoded picture buffer (DPB) fullness of each layer. When a picture is removed from a layer with a layer ID value equal to nuh_layer_id, the variable DPBFullness[nuh_layer_id] may be set equal to DPBFullness[nuh_layer_id]−1 (i.e., DPBFullness[nuh_layer_id] may be decremented by one). In this case, the picture was removed from a picture storage buffer PSB[nuh_layer_id].

Similarly, when a currently decoded picture with a layer ID value equal to nuh_layer_id is stored in the decoded picture buffer (DPB) 122, the variable DPBFullness[nuh_layer_id] is set equal to DPBFullness[nuh_layer_id]+1 (i.e., DPBFullness[nuh_layer_id] is incremented by one). In this case, the picture was stored into a picture storage buffer PSB[nuh_layer_id].

The decoded picture buffer (DPB) fullness could also be tracked for an output layer set. The decoded picture buffer (DPB) 122 size constraints may then be signaled, and bumping may be applied, based on the constraints specified for an output layer set. A DPBFullness value could be tracked for the output layer set which is associated with the operation point under test. Thus, when a picture is removed from a layer belonging to the output layer set, the value of the decoded picture buffer (DPB) fullness may be decremented by one as DPBFullness=DPBFullness−1. Likewise, when a currently decoded picture is stored in the decoded picture buffer (DPB) 122, the decoded picture buffer (DPB) fullness may be decremented by one as DPBFullness=DPBFullness+1.

The HRD described above may be one example of the decoder 112 illustrated in FIG. 1A. Thus, an electronic device 102 may operate in accordance with the HRD and CPB 120 and DPB 122 described above, in some configurations.

It should be noted that one or more of the elements or parts thereof included in the electronic device(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an Application-Specific Integrated Circuit (ASIC), a Large-Scale Integrated circuit (LSI) or integrated circuit, etc.

Figure 1B:
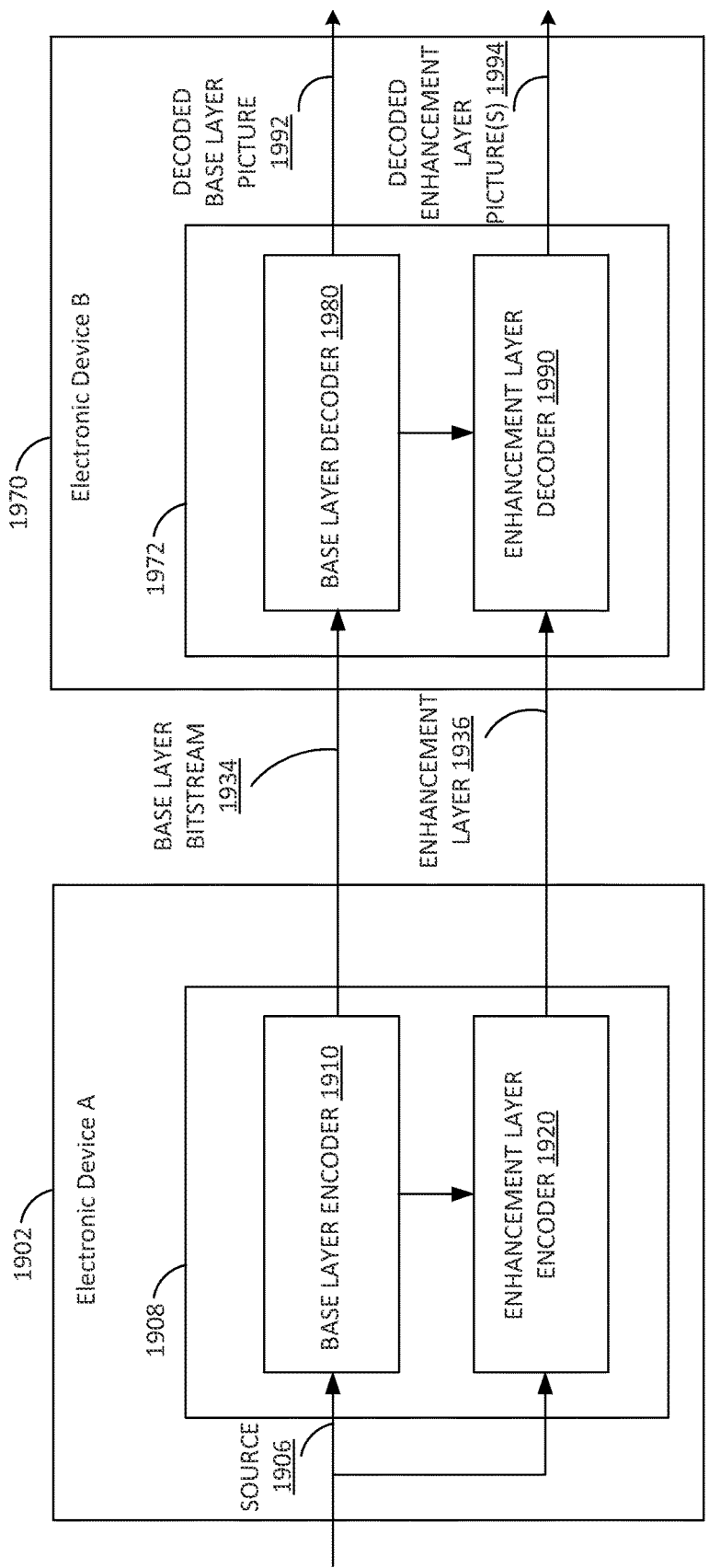
FIG. 1B is another block diagram illustrating an example of one or more electronic devices in which systems and methods for sending a message and buffering a bitstream may be implemented.

FIG. 1B is a block diagram illustrating another example of an encoder 1908 and a decoder 1972. In this example, electronic device A 1902 and electronic device B 1970 are illustrated. However, it should be noted that the features and functionality described in relation to electronic device A 1902 and electronic device B 1970 may be combined into a single electronic device in some configurations.

Electronic device A 1902 includes the encoder 1908. The encoder 1908 may include a base layer encoder 1910 and an enhancement layer encoder 1920. The video encoder 1908 is suitable for scalable video coding and multi-view video coding, as described later. The encoder 1908 may be implemented in hardware, software or a combination of both. In one configuration, the encoder 1908 may be a high-efficiency video coding (HEVC) coder, including scalable and/or multi-view. Other coders may likewise be used. Electronic device A 1902 may obtain a source 1906. In some configurations, the source 1906 may be captured on electronic device A 1902 using an image sensor, retrieved from memory or received from another electronic device.

The encoder 1908 may code the source 1906 to produce a base layer bitstream 1934 and an enhancement layer bitstream 1936. For example, the encoder 1908 may code a series of pictures (e.g., video) in the source 1906. In particular, for scalable video encoding for SNR scalability also known as quality scalability the same source 1906 may be provided to the base layer and the enhancement layer encoder. In particular, for scalable video encoding for spatial scalability a downsampled source may be used for the base layer encoder. In particular, for multi-view encoding a different view source may be used for the base layer encoder and the enhancement layer encoder. The encoder 1908 may be similar to the encoder 1782 described later in connection with FIG. 6B.

The bitstreams 1934, 1936 may include coded picture data based on the source 1906. In some configurations, the bitstreams 1934, 1936 may also include overhead data, such as slice header information, PPS information, etc. As additional pictures in the source 1906 are coded, the bitstreams 1934, 1936 may include one or more coded pictures.

The bitstreams 1934, 1936 may be provided to the decoder 1972. The decoder 1972 may include a base layer decoder 1980 and an enhancement layer decoder 1990. The video decoder 1972 is suitable for scalable video decoding and multi-view video decoding. In one example, the bitstreams 1934, 1936 may be transmitted to electronic device B 1970 using a wired or wireless link. In some cases, this may be done over a network, such as the internet or a Local Area Network (LAN). As illustrated in FIG. 1B, the decoder 1972 may be implemented on electronic device B 1970 separately from the encoder 1908 on electronic device A 1902. However, it should be noted that the encoder 1908 and decoder 1972 may be implemented on the same electronic device in some configurations. In an implementation where the encoder 1908 and decoder 1972 are implemented on the same electronic device, for instance, the bitstreams 1934, 1936 may be provided over a bus to the decoder 1972 or stored in memory for retrieval by the decoder 1972. The decoder 1972 may provide a decoded base layer 1992 and decoded enhancement layer picture(s) 1994 as output.

The decoder 1972 may be implemented in hardware, software or a combination of both. In one configuration, the decoder 1972 may be a high-efficiency video coding (HEVC) decoder, including scalable and/or multi-view. Other decoders may likewise be used. The decoder 1972 may be similar to the decoder 1812 described later in connection with FIG. 7B. Also, the base layer encoder and/or the enhancement layer encoder may each include a message generation module, such as that described in relation to FIG. 1A. Also, the base layer decoder and/or the enhancement layer decoder may include a coded picture buffer and/or a decoded picture buffer, such as that described in relation to FIG. 1A. In addition, the electronic devices of FIG. 1B may operate in accordance with the functions of the electronic devices of FIG. 1A, as applicable.

Figure 2:
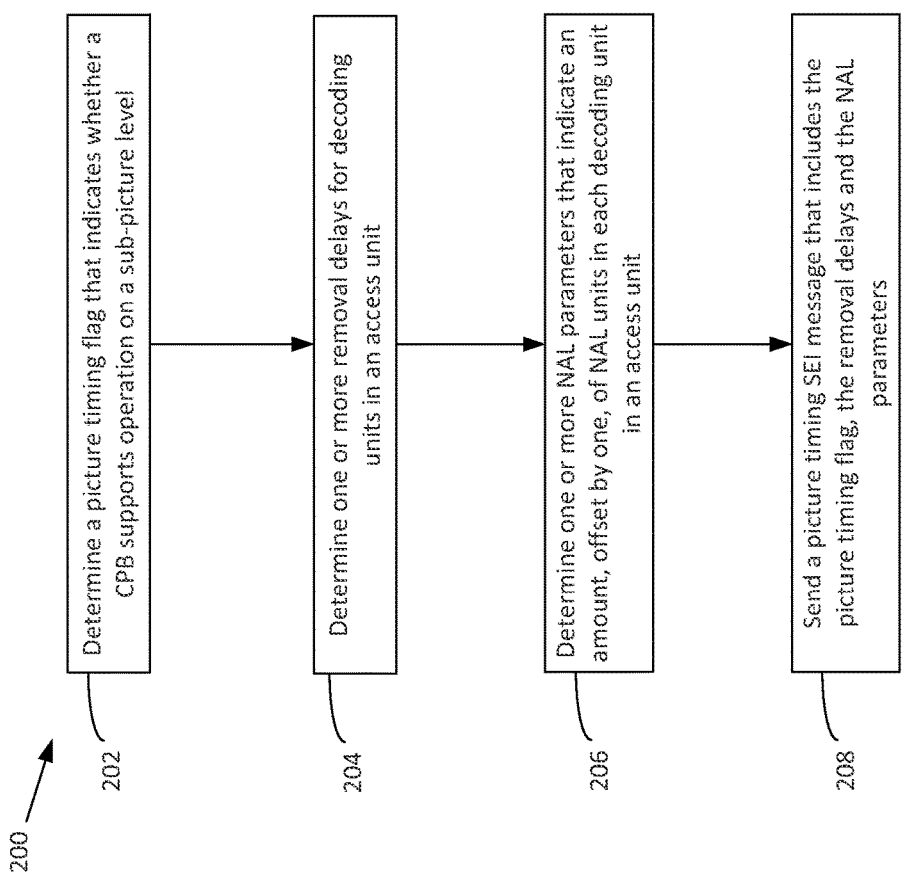
FIG. 2 is a flow diagram illustrating one configuration of a method for sending a message.

FIG. 2 is a flow diagram illustrating one configuration of a method 200 for sending a message. The method 200 may be performed by an encoder 104 or one of its sub-parts (e.g., a message generation module 108). The encoder 104 may determine 202 a picture timing flag (e.g., sub_pic_cpb_params_present_flag) that indicates whether a CPB 120 supports operation on a sub-picture level. For example, when the picture timing flag is set to 1, the CPB 120 may operate on an access unit level or a sub-picture level. It should be noted that even when the picture timing flag is set to 1, the decision about whether to actually operate at the sub-picture level is left to the decoder 112 itself.

The encoder 104 may also determine 204 one or more removal delays for decoding units in an access unit. For example, the encoder 104 may determine a single common decoding unit CPB removal delay parameter (e.g., common_du_cpb_removal_delay) that is applicable to all decoding units in the access unit from the CPB 120. Alternatively, the encoder 104 may determine a separate decoding unit CPB removal delay (e.g., du_cpb_removal_delay[i]) for each decoding unit in the access unit.

The encoder 104 may also determine 206 one or more NAL parameters that indicate an amount, offset by one, of NAL units in each decoding unit in the access point. For example, the encoder 104 may determine a single common NAL parameter (e.g., common_num_nalus_in_du_minus1) that is applicable to all decoding units in the access unit from the CPB 120. Alternatively, the encoder 104 may determine a separate decoding unit CPB removal delay (e.g., num_nalus_in_du_minus1[i]) for each decoding unit in the access unit.

The encoder 104 may also send 208 a picture timing SEI message that includes the picture timing flag, the removal delays and the NAL parameters. The picture timing SEI message may also include other parameters (e.g., cpb_removal_delay, dpb_output_delay, etc). For example, the electronic device 102 may transmit the message via one or more of wireless transmission, wired transmission, device bus, network, etc. For instance, electronic device A 102a may transmit the message to electronic device B 102b. The message may be part of the bitstream 114, for example. In some configurations, electronic device A 102a may send 208 the message to electronic device B 102b in a separate transmission 110 (that is not part of the bitstream 114). For instance, the message may be sent using some out-of-band mechanism. In some case the information indicated in 204, 206 may be sent in a SEI message different than picture timing SEI message. In yet another case the information indicated in 204, 206 may be sent in a parameter set e.g. video parameter set and/or sequence parameter set and/or picture parameter set and/or adaptation parameter set and/or slice header.

Figure 3:
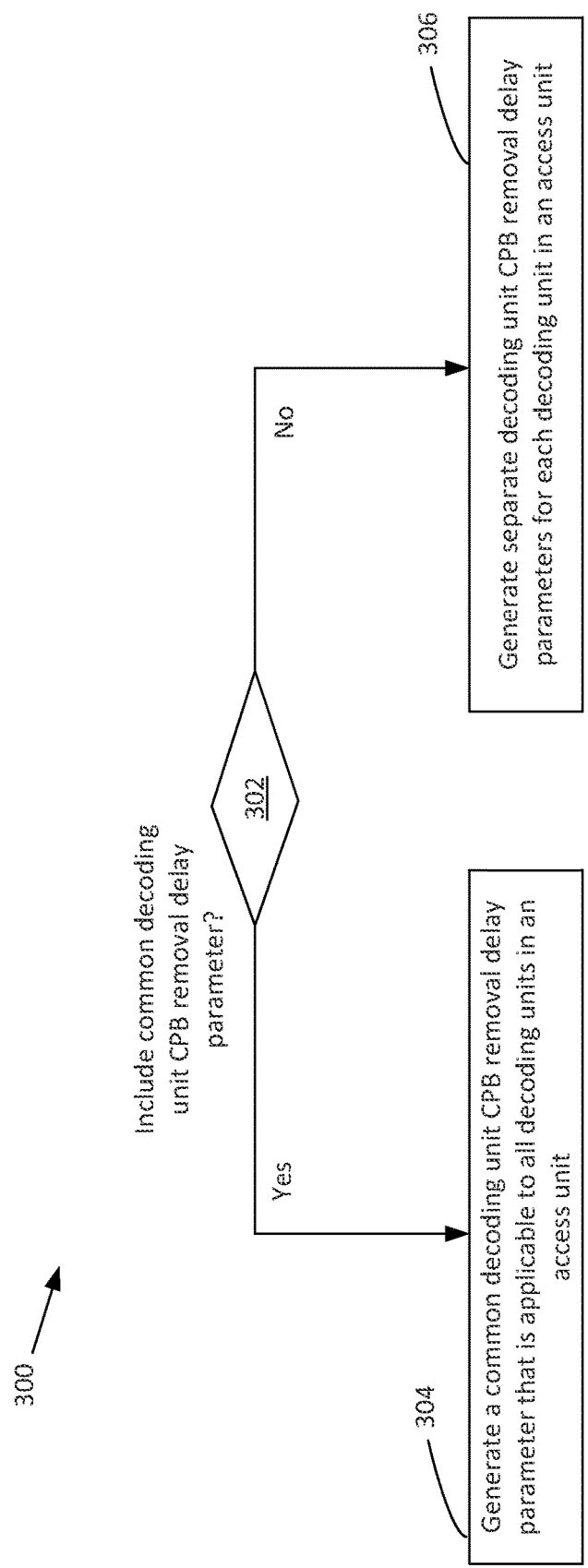
FIG. 3 is a flow diagram illustrating one configuration of a method for determining one or more removal delays for decoding units in an access unit.

FIG. 3 is a flow diagram illustrating one configuration of a method 300 for determining one or more removal delays for decoding units in an access unit. In other words, the method 300 illustrated in FIG. 3 may further illustrate step 204 in the method 200 illustrated in FIG. 2. The method 300 may be performed by an encoder 104. The encoder 104 may determine 302 whether to include a common decoding unit CPB removal delay parameter (e.g., common_du_cpb_removal_delay). This may include determining whether a common decoding unit CPB removal delay flag (e.g., common_du_cpb_removal_delay_flag) is set. An encoder 104 may send this common parameter in case the decoding units are removed from the CPB at regular interval. This may be the case, for example, when each decoding unit corresponds to certain number of rows of the picture or has some other regular structure.

For example, the common decoding unit CPB removal delay flag may be set to 1 when the common decoding unit CPB removal delay parameter is to be included in the picture timing SEI message and 0 when it is not to be included. If yes (e.g., flag is set to 1), the encoder 104 may determine 304 a common decoding unit CPB removal delay parameter (e.g., common_du_cpb_removal_delay) that is applicable to all decoding units in an access unit. If no (e.g., flag is set to 0), the encoder 104 may determine 306 separate decoding unit CPB removal delay parameters (e.g., du_cpb_removal_delay[i]) for each decoding unit in an access unit.

If a common decoding unit CPB removal delay parameter is present in a picture timing SEI message, it may specify an amount of sub-picture clock ticks to wait after removal from the CPB 120 of an immediately preceding decoding unit before removing from the CPB 120 a current decoding unit in the access unit associated with the picture timing SEI message.

For example, when a decoding unit is a first decoding unit in an access unit, the common decoding unit CPB 120 removal delay parameter may specify an amount of sub-picture clock ticks to wait after removal from the CPB 120 of a last decoding unit in an access unit associated with a most recent buffering period SEI message in a preceding access unit before removing from the CPB 120 the first decoding unit in the access unit associated with the picture timing SEI message.

When the decoding unit is a non-first decoding unit in an access unit, the common decoding unit CPB removal delay parameter may specify an amount of sub-picture clock ticks to wait after removal from the CPB 120 of a preceding decoding unit in the access unit associated with the picture timing SEI message before removing from the CPB a current decoding unit in the access unit associated with the picture timing SEI message.

In contrast, when a common decoding unit CPB removal delay parameter (e.g., common_du_cpb_removal_delay) is not sent in a picture timing SEI message, separate decoding unit CPB removal delay parameters (e.g., du_cpb_removal_delay[i]) may be included in the picture timing SEI message for each decoding unit in an access unit. The decoding unit CPB removal delay parameters (e.g., du_cpb_removal_delay[i]) may specify an amount of sub-picture clock ticks to wait after removal from the CPB 120 of the last decoding unit before removing from the CPB 120 an i-th decoding unit in the access unit associated with the picture timing SEI message. The decoding unit CPB removal delay parameters may be calculated according to a remainder of a modulo $2^{cpb\_removal\_delay\_length\_minus1+1}$ counter where cpb_removal_delay_length_minus1+1 is a length of a common decoding unit CPB removal delay parameter.

Figure 4:
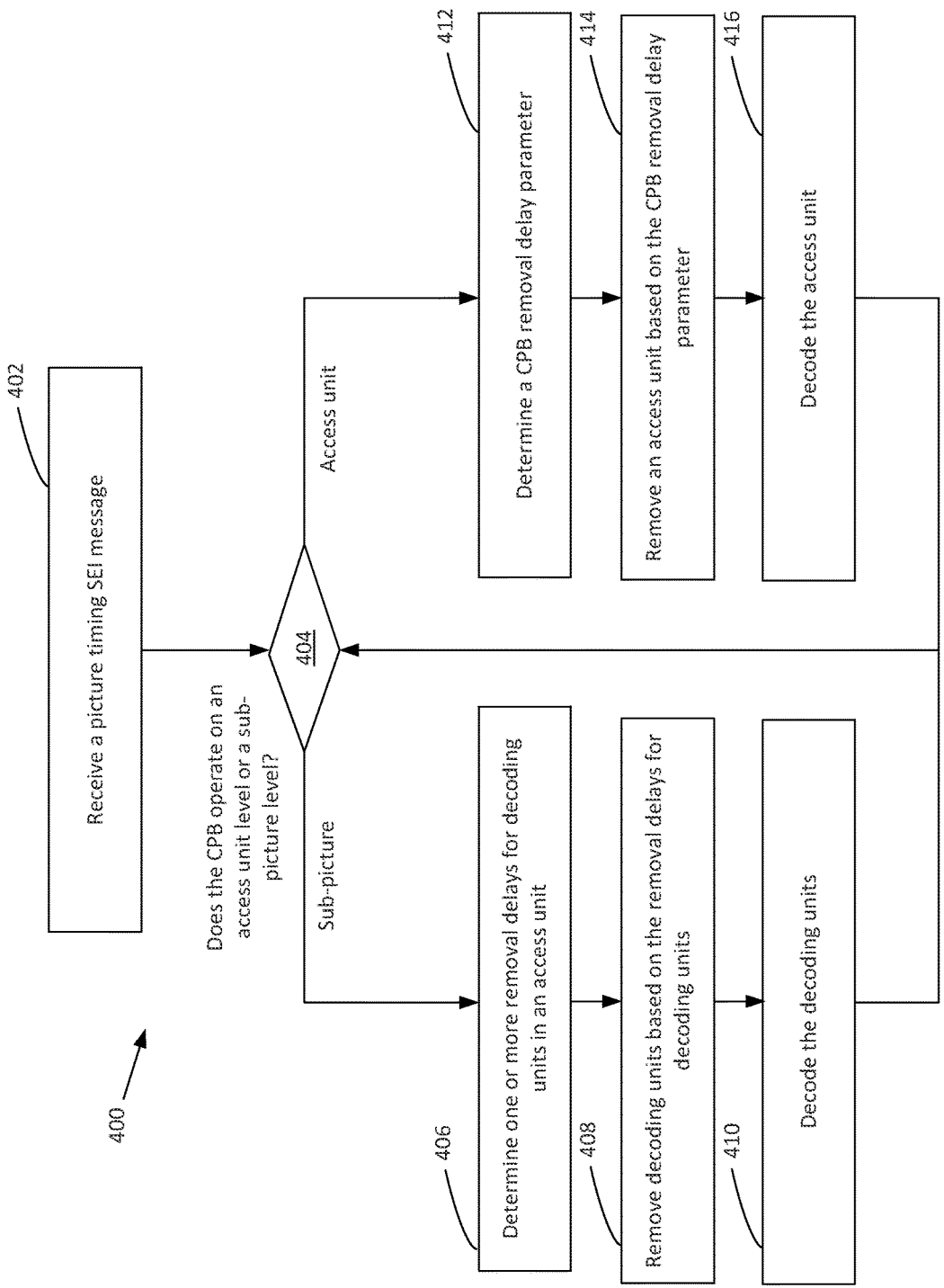
FIG. 4 is a flow diagram illustrating one configuration of a method for buffering a bitstream.

FIG. 4 is a flow diagram illustrating one configuration of a method 400 for buffering a bitstream. The method 400 may be performed by a decoder 112 in an electronic device 102 (e.g., electronic device B 102b), which may receive 402 a message (e.g., a picture timing SEI message or other message). For example, the electronic device 102 may receive 402 the message via one or more of wireless transmission, wired transmission, device bus, network, etc. For instance, electronic device B 102b may receive 402 the message from electronic device A 102a. The message may be part of the bitstream 114, for example. In another example, electronic device B 102b may receive the message from electronic device A 102a in a separate transmission 110 (that is not part of the bitstream 114, for example). For instance, the picture timing SEI message may be received using some out-of-band mechanism. In some configurations, the message may include one or more of a picture timing flag, one or more removal delays for decoding units in an access unit and one or more NAL parameters. Thus, receiving 402 the message may include receiving one or more of a picture timing flag, one or more removal delays for decoding units in an access unit and one or more NAL parameters.

The decoder 112 may determine 404 whether a CPB 120 operates on an access unit level or a sub-picture level. For example, a decoder 112 may decide to operate on sub-picture basis if it wants to achieve low latency. Alternatively, the decision may be based on whether the decoder 112 has enough resources to support sub-picture based operation. If the CPB 120 operates on a sub-picture level, the decoder may determine 406 one or more removal delays for decoding units in an access unit. For example, the decoder 112 may determine a single common decoding unit CPB removal delay parameter (e.g., common_du_cpb_removal_delay) that is applicable to all decoding units in the access unit. Alternatively, the decoder 112 may determine a separate decoding unit CPB removal delay (e.g., du_cpb_removal_delay[i]) for each decoding unit in the access unit. In other words, the picture timing SEI message may include a common parameter applicable to all decoding units in an access unit or separate parameters for every decoding unit.

The decoder 112 may also remove 408 decoding units based on the removal delays for the decoding units, i.e., using either a common parameter applicable to all decoding units in an access unit or separate parameters for every decoding unit. The decoder 112 may also decode 410 the decoding units.

The decoder 112 may use a variable ClockDiff when determining a removal time for determined from various signaled parameters. Specifically, ClockDiff may be determined according to ClockDiff=(num_units_in_tick-(num_units_in_sub_tick*(num_decoding_units_minus1+1))/time_scale) where num_units_in_tick is number of time units of a clock operating at the frequency time_scale Hz that corresponds to one increment of a clock tick counter, num_units_in_sub_tick is number of time units of a clock operating at the frequency time_scale Hz that corresponds to one increment of a sub-picture clock tick counter, num_decoding_units_minus1+1 is an amount of decoding units in the access unit, and time_scale is the number of time units that pass in one second.

When a low delay hypothetical reference decoder (HRD) flag (e.g., low_delay_hrd_flag) is set to 1, $t_{r,n}(m)<t_{af}(m)$, a picture timing flag is set to 1, the CPB is operating at sub-picture level and ClockDiff is greater than zero, the removal time for decoding unit m, $t_r(m)$ is determined according to: $t_r(m)=t_{r,n}(m)+t_{c\_sub}*Ceil((t_{af}(m)-t_{r,n}(m))/t_{c\_sub})+ClockDiff$ where $t_{r,n}(m)$ is the nominal removal time of the decoding unit m, $t_{c\_sub}$ is a sub-picture clock tick, Ceil( ) is a ceiling function and $t_{af}(m)$ is final arrival time of decoding unit m.

When a low delay hypothetical reference decoder (HRD) flag (e.g., low_delay_hrd_flag) is set to 1, $t_{r,n}(n)<t_{af}(n)$, a picture timing flag is set to 1, the CPB is operating at an access unit level and ClockDiff is greater than zero, the removal time for access unit n, $t_r(n)$ is determined according to: $t_r(n)=t_{r,n}(n)+t_c*Ceil((t_{af}(n)-t_{r,n}(n))/t_c)-ClockDiff$ where $t_{r,n}(n)$ is the nominal removal time of the access unit n, $t_c$ is a clock tick, Ceil( ) is a ceiling function and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$ according to: $t_r(m)=t_{r,n}(m)+\max$ $((t_{c\_sub}*\text{Ceil}((t_{af}(m)-t_{r,n}(m))/t_{c\_sub}))$, $(t_c*\text{Ceil}((t_{af}(n)-t_{r,n}(n))/t_c)))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+\max$ $((t_{c\_sub}*\text{Ceil}((t_{af}(m)-t_{r,n}(m))/t_{c\_sub}))$, $(t_c*\text{Ceil}((t_{af}(n)-t_{r,n}(n))/t_c)))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$ according to: $t_r(m)=t_{r,n}(m)+\min$ $((t_{c\_sub}*\text{Ceil}((t_{af}(m)-t_{r,n}(m))/t_{c\_sub}), (t_c*\text{Ceil}((t_{af}(n)-t_{r,n}(n))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+\min$ $((t_{c\_sub}*\text{Ceil}((t_{af}(m)-t_{r,n}(m))/t_{c\_sub}))$, $(t_c*\text{Ceil}((t_{af}(n)-t_{r,n}(n))/t_c)))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$ according to: $t_r(m)=t_{r,n}(m)+(t_c*\text{Ceil}((t_{af}(n)-t_{r,n}(n))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+(t_c*\text{Ceil}((t_{af}(n)-t_{r,n}(n))/t_c))$ where $t_{r,n}(m)$ is the nominal removal time of the last decoding unit n, $t_{c\_Sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the decoding unit which is not the last decoding unit of the access unit is set as $t_r(m)=t_{af}(m)$, where $t_{af}(m)$ is a final arrival time of decoding unit m. And the removal time for the last decoding unit m of access unit, $t_r(m)$ according to: $t_r(m)=t_{r,n}(m)+(t_{c\_sub}*\text{Ceil}((t_{af}(m)-t_{r,n}(m))/t_{c\_sub}))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, to is clock tick, $t_{af}(n)$ is a final arrival time of access unit n and $t_{af}(m)$ is a final arrival time of the last decoding unit in the access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the decoding unit which is not the last decoding unit of the access unit is set as $t_r(m)=t_{af}(m)$, where $t_{af}(m)$ is a final arrival time of decoding unit m. And the removal time for the last decoding unit m of access unit, $t_r(m)$ according to: $t_r(m)=t_{r,n}(m)+(t_c*\text{Ceil}((t_{af}(m)-t_{r,n}(m))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick, $t_{af}(n)$ is a final arrival time of access unit n and $t_{af}(m)$ is a final arrival time of the last decoding unit in the access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the decoding unit is set as $t_r(m)=t_{af}(m)$ where $t_{r,n}(m)$ is the nominal removal time of the decoding unit m, $t_{c\_sub}$ is sub-picture clock tick, Ceil( ) is a ceiling function, $t_{af}(m)$ is a final arrival time of decoding unit m, $t_{r,n}(n)$ is the nominal removal time of the access unit n, to is clock tick, $t_{af}(n)$ is a final arrival time of access unit n and $t_{af}(m)$ is a final arrival time of the decoding unit in the access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{af}(n)$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

If the CPB operates on an access unit level, the decoder 112 may determine 412 a CPB removal delay parameter. This may be included in the received picture timing SEI message (e.g., cpb_removal_delay). The decoder 112 may also remove 414 an access unit based on the CPB removal delay parameter and decode 416 the access unit. In other words, the decoder 112 may decode whole access units at a time, rather than decoding units within the access unit.

Figure 5:
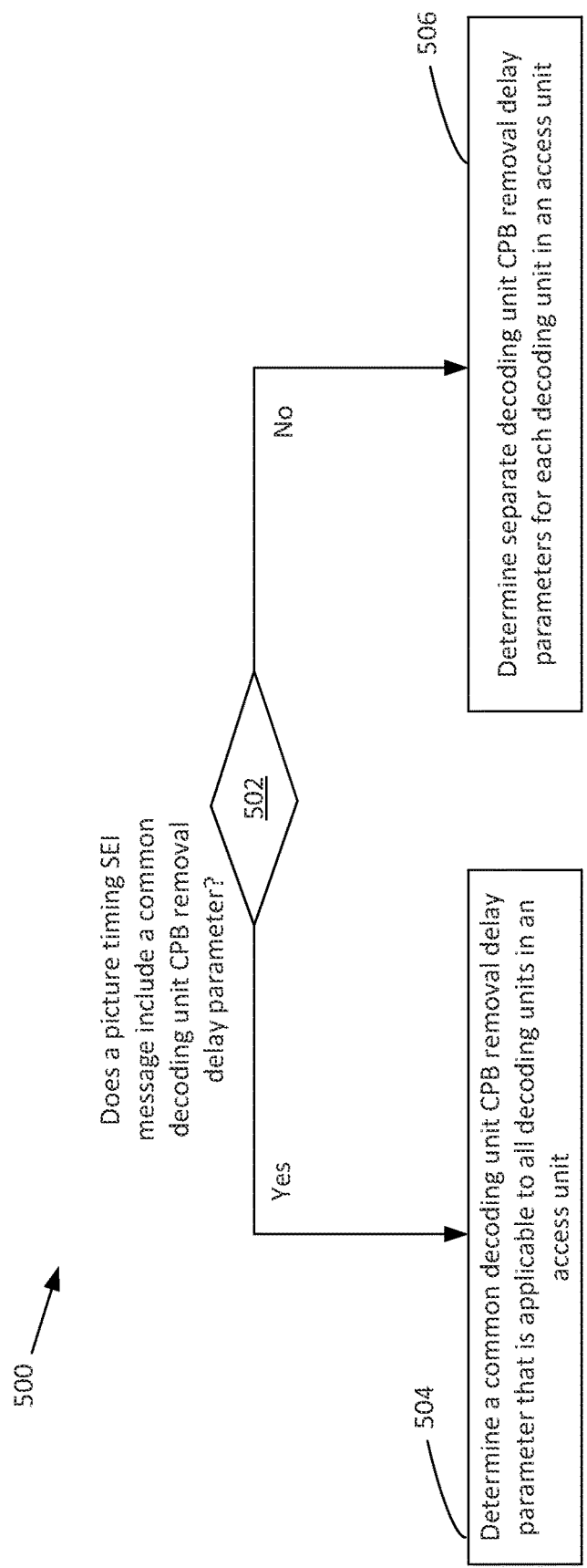
FIG. 5 is a flow diagram illustrating one configuration of a method for determining one or more removal delays for decoding units in an access unit.

FIG. 5 is a flow diagram illustrating one configuration of a method 500 for determining one or more removal delays for decoding units in an access unit. In other words, the method 500 illustrated in FIG. 5 may further illustrate step 406 in the method 400 illustrated in FIG. 4. The method 500 may be performed by a decoder 112. The decoder 112 may determine 502 whether a received picture timing SEI message includes a common decoding unit CPB removal delay parameter. This may include determining whether a common decoding unit CPB removal delay flag (e.g., common_du_cpb_removal_delay_flag) is set. If yes, the decoder 112 may determine 504 a common decoding unit CPB removal delay parameter (e.g., common_du_cpb_removal_delay) that is applicable to all decoding units in an access unit. If no, the decoder 112 may determine 506 separate decoding unit CPB removal delay parameters (e.g., du_cpb_removal_delay[i]) for each decoding unit in an access unit.

In addition to modifying the picture timing SEI message semantics, the present systems and methods may also impose a bitstream constraint so that the operation of sub-picture based CPB operation and access unit based CPB operation result in the same timing of decoding unit removal. Specifically, when the picture timing flag (e.g., sub_pic_cpb_params_present_flag) is set to 1, the CPB removal delay may be set according to $$\text{cpb\_removal\_delay} = \frac{\left(\sum_{i=0}^{num\_decoding\_units\_minus1} \text{du\_cpb\_removal\_delay}[i]\right) * t_{c,sub}}{t_c}$$

where du_cpb_removal_delay[i] are the decoding unit CPB removal delay parameters, $t_c$ is a clock tick, $t_{c\_sub}$ is a sub-picture clock tick, num_decoding_units_minus1 is an amount of decoding units in the access unit offset by one, and i is an index.

Alternatively, the CPB removal delay may be set as described next: Let the variable $T_{du}(k)$ be defined as:

$$T_{du}(k) = T_{du}(k-1) + t_{c\_sub} * \sum_{i=0}^{num\_decoding\_units\_minus1} (\text{du\_cpb\_removal\_delay\_minus1}_k[i] + 1)$$

where du_cpb_removal_delay_minus1$_k$[i] and num_decoding_units_minus1$_k$ are parameters for i'th decoding unit of k'th access unit (with k=0 for the access unit that initialized the HRD and $T_{du}(k)=0$ for k<1), and where du_cpb_removal_delay_minus1$_k$[i]+1=du_cpb_removal_delay_minus1$_k$[i] is the decoding unit CPB removal delay parameter for the i'th decoding unit of the k'th access unit, and num_decoding_units_minus1$_k$ is the number of decoding units in the k'th access unit, $t_c$ is a clock tick, $t_{c,sub}$ is a sub-picture clock tick, and i and k are an indices. Then when the picture timing flag (e.g., sub_pic_cpb_params_present_flag) is set to 1, the following condition may be true:

(au_cpb_removal_delay_minus1+1)*to =$T_{du}$(k), where (au_cpb_removal_delay_minus1+1)=cpb_removal_delay, the CPB removal delay. Thus in this case the CPB removal delay (au_cpb_removal_delay_minus1+1) is set such that the operation of sub-picture based CPB operation and access unit based CPB operation result in the same timing of access unit removal and last decoding unit of the access unit removal.

Alternatively, the CPB removal delay may be set according to $$-1 \le \left[\text{cpb\_removal\_delay} * t_c - \left(\sum_{i=0}^{num\_decoding\_units\_minus1} \text{du\_cpb\_removal\_delay}[i]\right) * t_{c,sub}\right] \le 1$$

where du_cpb_removal_delay[i] are the decoding unit CPB removal delay parameters, $t_c$ is a clock tick, $t_{c,sub}$ is a sub-picture clock tick, num_decoding_units_minus1 is an amount of decoding units in the access unit offset by one, and i is an index.

Alternatively, cpb_removal_delay and du_cpb_removal_delay[num_decoding_units_minus1] may be set according to: cpb_removal_delay*$t_c$=du_cpb_removal_delay[num_decoding_units_minus1]*$t_{c,sub}$ where du_cpb_removal_delay[num_decoding_units_minus1] is the decoding unit CPB removal delay parameter for the num_decoding_units_minus1'th decoding unit, $t_c$ is a clock tick, $t_{c\_sub}$ is a sub-picture clock tick, num_decoding_units_minus1 is an amount of decoding units in the access unit offset by one.

In addition to modifying the picture timing SEI message semantics, the present systems and methods may also impose a bitstream constraint so that the operation of sub-picture based CPB operation and access unit based CPB operation result in the same timing of decoding unit removal. Specifically, when the picture timing flag (e.g., sub_pic_cpb_params_present_flag) is set to 1, the values for cpb_removal_delay and du_cpb_removal_delay[num_decoding_units_minus1] may be set so as to satisfy: $-1 \le$ (cpb_removal_delay*$t_c$−du_cpb_removal_delay[num_decoding_units_minus1]*$t_{c,sub)} \le 1$ where du_cpb_removal_delay[num_decoding_units_minus1] is the decoding unit CPB removal delay parameter for the num_decoding_units_minus1'th decoding unit, to is a clock tick, $t_{c\_sub}$ is a sub-picture clock tick, num_decoding_units_minus1 is an amount of decoding units in the access unit offset by one.

Figure 6A:
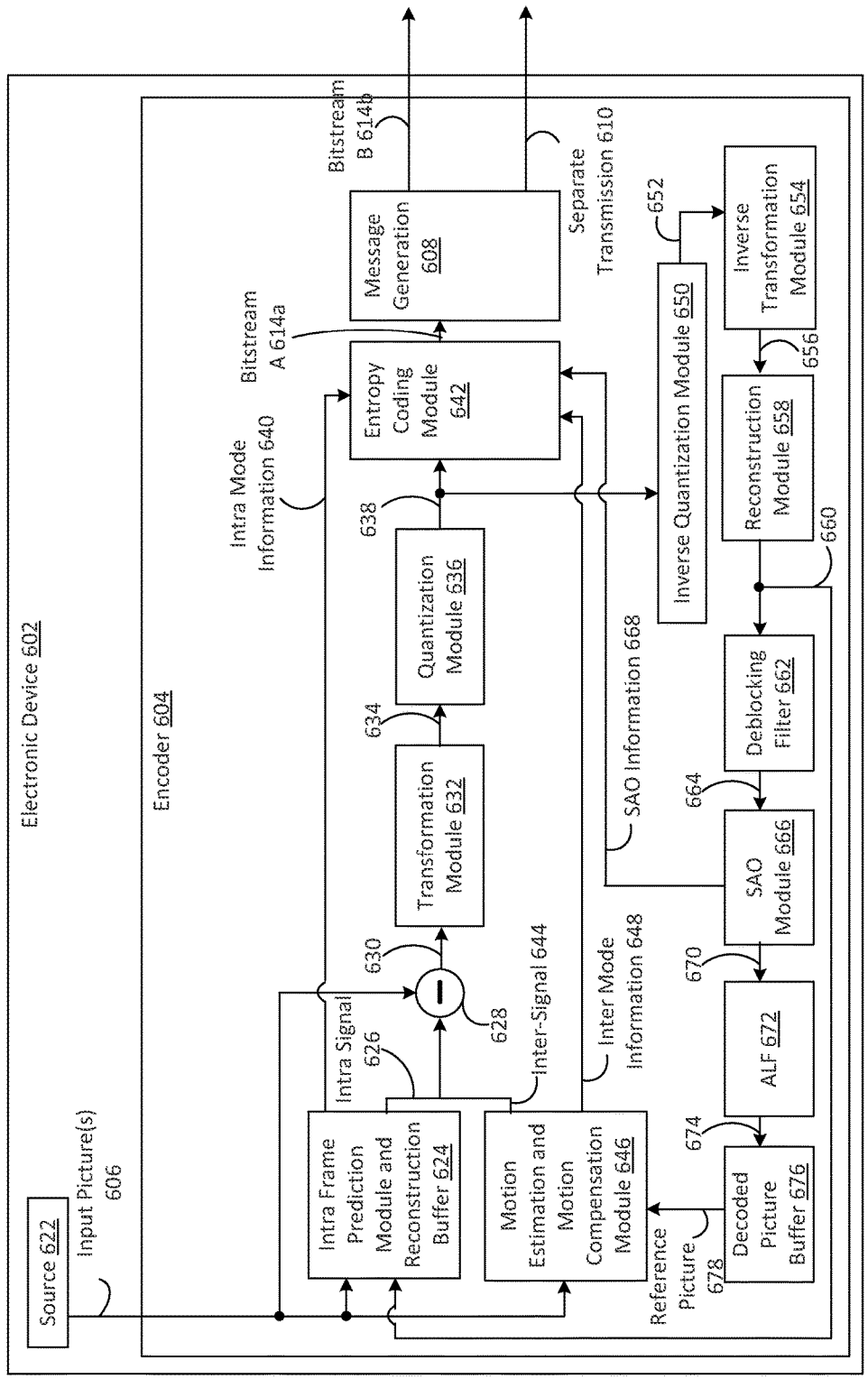
FIG. 6A is a block diagram illustrating one configuration of an encoder 604 on an electronic device.

FIG. 6A is a block diagram illustrating one configuration of an encoder 604 on an electronic device 602. It should be noted that one or more of the elements illustrated as included within the electronic device 602 may be implemented in hardware, software or a combination of both. For example, the electronic device 602 includes an encoder 604, which may be implemented in hardware, software or a combination of both. For instance, the encoder 604 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 604 may be a HEVC coder.

The electronic device 602 may include a source 622. The source 622 may provide picture or image data (e.g., video) as one or more input pictures 606 to the encoder 604. Examples of the source 622 may include image sensors, memory, communication interfaces, network interfaces, wireless receivers, ports, etc.

One or more input pictures 606 may be provided to an intra-frame prediction module and reconstruction buffer 624. An input picture 606 may also be provided to a motion estimation and motion compensation module 646 and to a subtraction module 628.

The intra-frame prediction module and reconstruction buffer 624 may generate intra mode information 640 and an intra-signal 626 based on one or more input pictures 606 and reconstructed data 660. The motion estimation and motion compensation module 646 may generate inter mode information 648 and an inter signal 644 based on one or more input pictures 606 and a reference picture 678 from decoded picture buffer 676. In some configurations, the decoded picture buffer 676 may include data from one or more reference pictures in the decoded picture buffer 676.

The encoder 604 may select between the intra signal 626 and the inter signal 644 in accordance with a mode. The intra signal 626 may be used in order to exploit spatial characteristics within a picture in an intra-coding mode. The inter signal 644 may be used in order to exploit temporal characteristics between pictures in an inter coding mode. While in the intra coding mode, the intra signal 626 may be provided to the subtraction module 628 and the intra mode information 640 may be provided to an entropy coding module 642. While in the inter coding mode, the inter signal 644 may be provided to the subtraction module 628 and the inter mode information 648 may be provided to the entropy coding module 642.

Either the intra signal 626 or the inter signal 644 (depending on the mode) is subtracted from an input picture 606 at the subtraction module 628 in order to produce a prediction residual 630. The prediction residual 630 is provided to a transformation module 632. The transformation module 632 may compress the prediction residual 630 to produce a transformed signal 634 that is provided to a quantization module 636. The quantization module 636 quantizes the transformed signal 634 to produce transformed and quantized coefficients (TQCs) 638.

The TQCs 638 are provided to an entropy coding module 642 and an inverse quantization module 650. The inverse quantization module 650 performs inverse quantization on the TQCs 638 to produce an inverse quantized signal 652 that is provided to an inverse transformation module 654. The inverse transformation module 654 decompresses the inverse quantized signal 652 to produce a decompressed signal 656 that is provided to a reconstruction module 658.

The reconstruction module 658 may produce reconstructed data 660 based on the decompressed signal 656. For example, the reconstruction module 658 may reconstruct (modified) pictures. The reconstructed data 660 may be provided to a deblocking filter 662 and to the intra prediction module and reconstruction buffer 624. The deblocking filter 662 may produce a filtered signal 664 based on the reconstructed data 660.

The filtered signal 664 may be provided to a sample adaptive offset (SAO) module 666. The SAO module 666 may produce SAO information 668 that is provided to the entropy coding module 642 and an SAO signal 670 that is provided to an adaptive loop filter (ALF) 672. The ALF 672 produces an ALF signal 674 that is provided to the decoded picture buffer 676. The ALF signal 674 may include data from one or more pictures that may be used as reference pictures.

The entropy coding module 642 may code the TQCs 638 to produce bitstream A 614a (e.g., encoded picture data). For example, the entropy coding module 642 may code the TQCs 638 using Context-Adaptive Variable Length Coding (CAVLC) or Context-Adaptive Binary Arithmetic Coding (CABAC). In particular, the entropy coding module 642 may code the TQCs 638 based on one or more of intra mode information 640, inter mode information 648 and SAO information 668. Bitstream A 614a (e.g., encoded picture data) may be provided to a message generation module 608. The message generation module 608 may be configured similarly to the message generation module 108 described in connection with FIG. 1. Additionally or alternatively, the message generation module 608 may perform one or more of the procedures described in connection with FIG. 2 and FIG. 3.

For example, the message generation module 608 may generate a message (e.g., picture timing SEI message or other message) including sub-picture parameters. The sub-picture parameters may include one or more removal delays for decoding units (e.g., common_du_cpb_removal_delay or du_cpb_removal_delay[i]) and one or more NAL parameters (e.g., common_num_nalus_in_du_minus1 or num_nalus_in_du_minus1[i]). In some configurations, the message may be inserted into bitstream A 614a to produce bitstream B 614b. Thus, the message may be generated after the entire bitstream A 614a is generated (e.g., after most of bitstream B 614b is generated), for example. In other configurations, the message may not be inserted into bitstream A 614a (in which case bitstream B 614b may be the same as bitstream A 614a), but may be provided in a separate transmission 610.

In some configurations, the electronic device 602 sends the bitstream 614 to another electronic device. For example, the bitstream 614 may be provided to a communication interface, network interface, wireless transmitter, port, etc. For instance, the bitstream 614 may be transmitted to another electronic device via LAN, the Internet, a cellular phone base station, etc. The bitstream 614 may additionally or alternatively be stored in memory or other component on the electronic device 602.

Figure 6B:
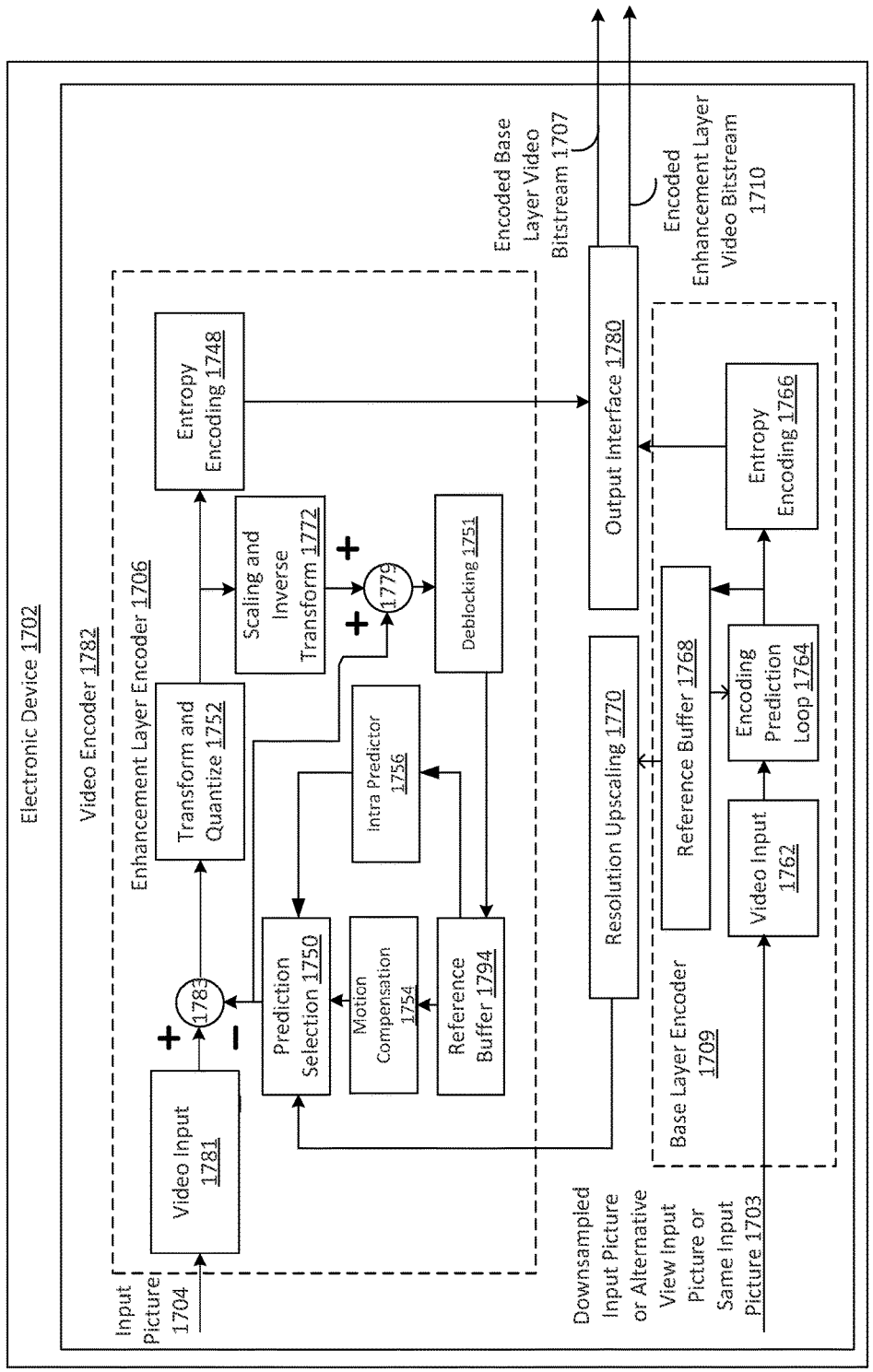
FIG. 6B is another block diagram illustrating one configuration of an encoder 604 on an electronic device.

FIG. 6B is a block diagram illustrating one configuration of a video encoder 1782 on an electronic device 1702. The video encoder 1782 may include an enhancement layer encoder 1706, a base layer encoder 1709, a resolution upscaling block 1770 and an output interface 1780. The video encoder of FIG. 6B, for example, is suitable for scalable video coding and multi-view video coding, as described herein.

The enhancement layer encoder 1706 may include a video input 1781 that receives an input picture 1704. The output of the video input 1781 may be provided to an adder/subtractor 1783 that receives an output of a prediction selection 1750. The output of the adder/subtractor 1783 may be provided to a transform and quantize block 1752. The output of the transform and quantize block 1752 may be provided to an entropy encoding 1748 block and a scaling and inverse transform block 1772. After entropy encoding 1748 is performed, the output of the entropy encoding block 1748 may be provided to the output interface 1780. The output interface 1780 may output both the encoded base layer video bitstream 1707 and the encoded enhancement layer video bitstream 1710.

The output of the scaling and inverse transform block 1772 may be provided to an adder 1779. The adder 1779 may also receive the output of the prediction selection 1750. The output of the adder 1779 may be provided to a deblocking block 1751. The output of the deblocking block 1751 may be provided to a reference buffer 1794. An output of the reference buffer 1794 may be provided to a motion compensation block 1754. The output of the motion compensation block 1754 may be provided to the prediction selection 1750. An output of the reference buffer 1794 may also be provided to an intra predictor 1756. The output of the intra predictor 1756 may be provided to the prediction selection 1750. The prediction selection 1750 may also receive an output of the resolution upscaling block 1770.

The base layer encoder 1709 may include a video input 1762 that receives a downsampled input picture, or other image content suitable for combing with another image, or an alternative view input picture or the same input picture 1703 (i.e., the same as the input picture 1704 received by the enhancement layer encoder 1706). The output of the video input 1762 may be provided to an encoding prediction loop 1764. Entropy encoding 1766 may be provided on the output of the encoding prediction loop 1764. The output of the encoding prediction loop 1764 may also be provided to a reference buffer 1768. The reference buffer 1768 may provide feedback to the encoding prediction loop 1764. The output of the reference buffer 1768 may also be provided to the resolution upscaling block 1770. Once entropy encoding 1766 has been performed, the output may be provided to the output interface 1780. The encoded base layer video bitstream 1707 and/or the encoded enhancement layer video bitstream 1710 may be provided to one or more message generation modules, as desired.

Figure 7A:
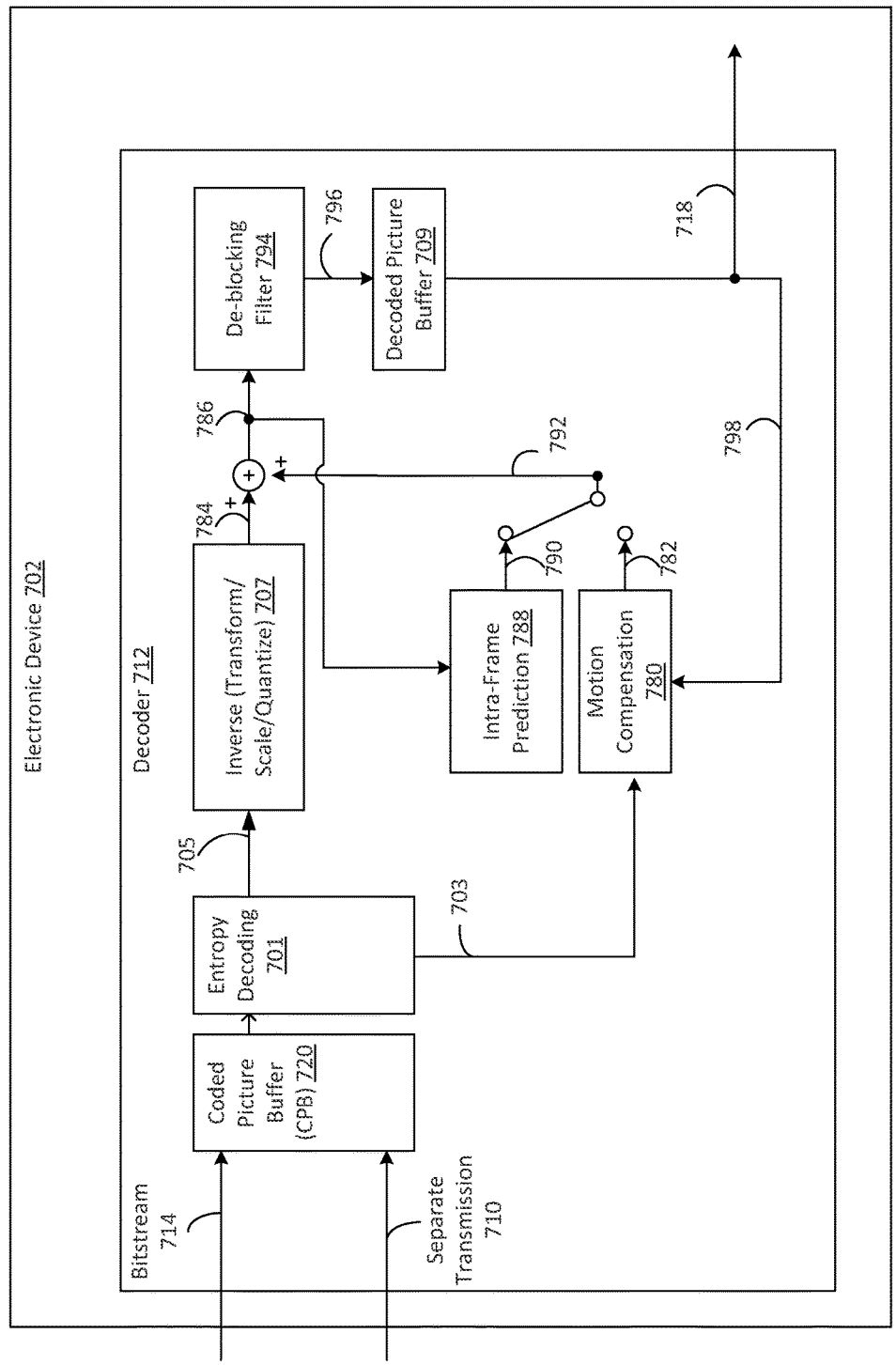
FIG. 7A is a block diagram illustrating one configuration of a decoder on an electronic device.

FIG. 7A is a block diagram illustrating one configuration of a decoder 712 on an electronic device 702. The decoder 712 may be included in an electronic device 702. For example, the decoder 712 may be a HEVC decoder. The decoder 712 and one or more of the elements illustrated as included in the decoder 712 may be implemented in hardware, software or a combination of both. The decoder 712 may receive a bitstream 714 (e.g., one or more encoded pictures and overhead data included in the bitstream 714) for decoding. In some configurations, the received bitstream 714 may include received overhead data, such as a message (e.g., picture timing SEI message or other message), slice header, PPS, etc. In some configurations, the decoder 712 may additionally receive a separate transmission 710. The separate transmission 710 may include a message (e.g., a picture timing SEI message or other message). For example, a picture timing SEI message or other message may be received in a separate transmission 710 instead of in the bitstream 714. However, it should be noted that the separate transmission 710 may be optional and may not be utilized in some configurations.

The decoder 712 includes a CPB 720. The CPB 720 may be configured similarly to the CPB 120 described in connection with FIG. 1 above. Additionally or alternatively, the decoder 712 may perform one or more of the procedures described in connection with FIG. 4 and FIG. 5. For example, the decoder 712 may receive a message (e.g., picture timing SEI message or other message) with sub-picture parameters and remove and decode decoding units in an access unit based on the sub-picture parameters. It should be noted that one or more access units may be included in the bitstream and may include one or more of encoded picture data and overhead data.

The Coded Picture Buffer (CPB) 720 may provide encoded picture data to an entropy decoding module 701. The encoded picture data may be entropy decoded by an entropy decoding module 701, thereby producing a motion information signal 703 and quantized, scaled and/or transformed coefficients 705.

The motion information signal 703 may be combined with a portion of a reference frame signal 798 from a decoded picture buffer 709 at a motion compensation module 780, which may produce an inter-frame prediction signal 782. The quantized, descaled and/or transformed coefficients 705 may be inverse quantized, scaled and inverse transformed by an inverse module 707, thereby producing a decoded residual signal 784. The decoded residual signal 784 may be added to a prediction signal 792 to produce a combined signal 786. The prediction signal 792 may be a signal selected from either the inter-frame prediction signal 782 produced by the motion compensation module 780 or an intra-frame prediction signal 790 produced by an intra-frame prediction module 788. In some configurations, this signal selection may be based on (e.g., controlled by) the bitstream 714.

The intra-frame prediction signal 790 may be predicted from previously decoded information from the combined signal 786 (in the current frame, for example). The combined signal 786 may also be filtered by a de-blocking filter 794. The resulting filtered signal 796 may be written to decoded picture buffer 709. The resulting filtered signal 796 may include a decoded picture. The decoded picture buffer 709 may provide a decoded picture which may be outputted 718. In some cases 709 may be a considered as frame memory.

Figure 7B:
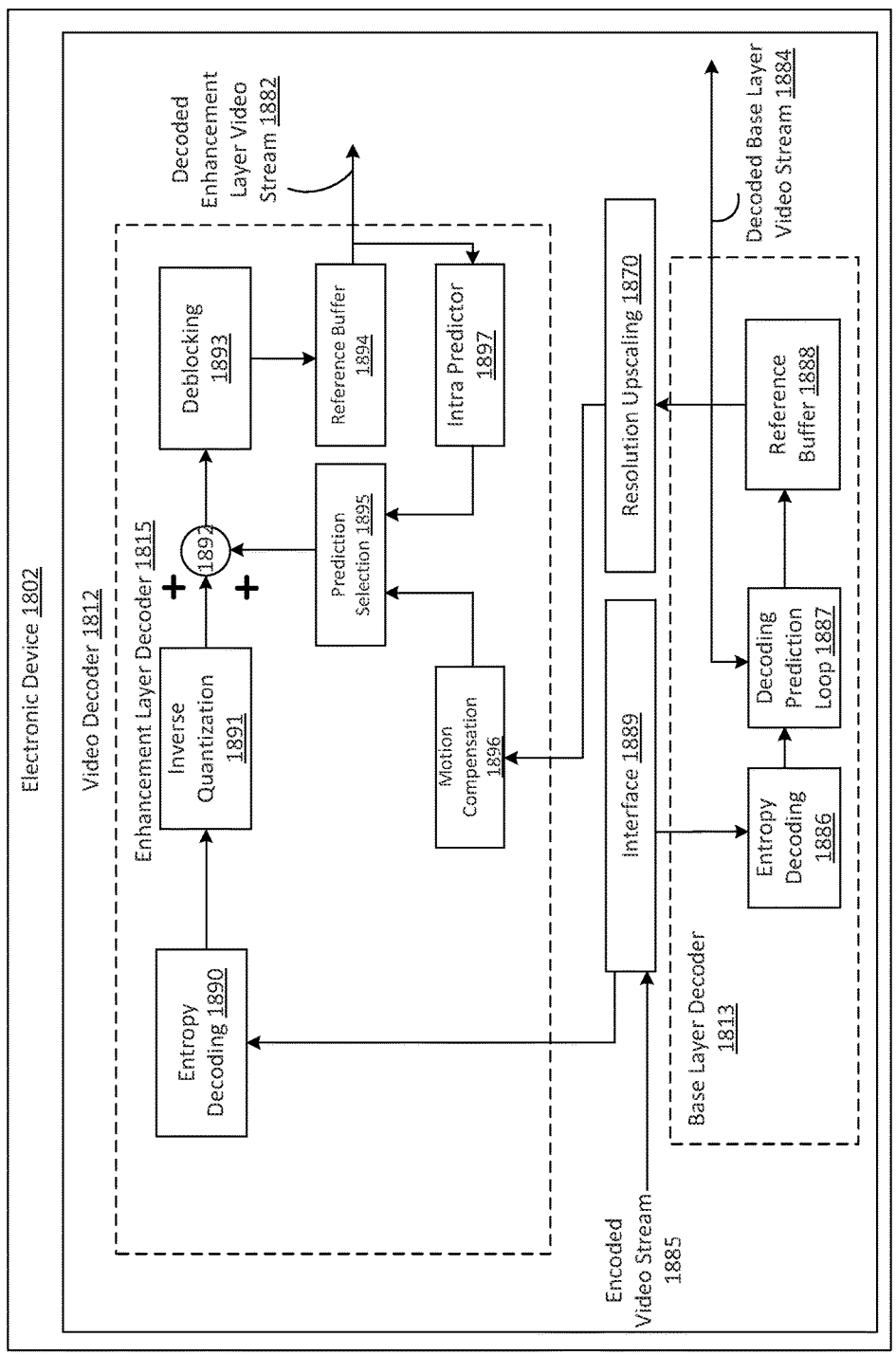
FIG. 7B is another block diagram illustrating one configuration of a decoder on an electronic device.

FIG. 7B is a block diagram illustrating one configuration of a video decoder 1812 on an electronic device 1802. The video decoder 1812 may include an enhancement layer decoder 1815 and a base layer decoder 1813. The video decoder 812 may also include an interface 1889 and resolution upscaling 1870. The video decoder of FIG. 7B, for example, is suitable for scalable video coding and multi-view video encoded, as described herein.

The interface 1889 may receive an encoded video stream 1885. The encoded video stream 1885 may consist of base layer encoded video stream and enhancement layer encoded video stream. These two streams may be sent separately or together. The interface 1889 may provide some or all of the encoded video stream 1885 to an entropy decoding block 1886 in the base layer decoder 1813. The output of the entropy decoding block 1886 may be provided to a decoding prediction loop 1887. The output of the decoding prediction loop 1887 may be provided to a reference buffer 1888. The reference buffer may provide feedback to the decoding prediction loop 1887. The reference buffer 1888 may also output the decoded base layer video stream 1884.

The interface 1889 may also provide some or all of the encoded video stream 1885 to an entropy decoding block 1890 in the enhancement layer decoder 1815. The output of the entropy decoding block 1890 may be provided to an inverse quantization block 1891. The output of the inverse quantization block 1891 may be provided to an adder 1892. The adder 1892 may add the output of the inverse quantization block 1891 and the output of a prediction selection block 1895. The output of the adder 1892 may be provided to a deblocking block 1893. The output of the deblocking block 1893 may be provided to a reference buffer 1894. The reference buffer 1894 may output the decoded enhancement layer video stream 1882. The output of the reference buffer 1894 may also be provided to an intra predictor 1897. The enhancement layer decoder 1815 may include motion compensation 1896. The motion compensation 1896 may be performed after the resolution upscaling 1870. The prediction selection block 1895 may receive the output of the intra predictor 1897 and the output of the motion compensation 1896. Also, the decoder may include one or more coded picture buffers, as desired, such as together with the interface 1889.

Figure 8:
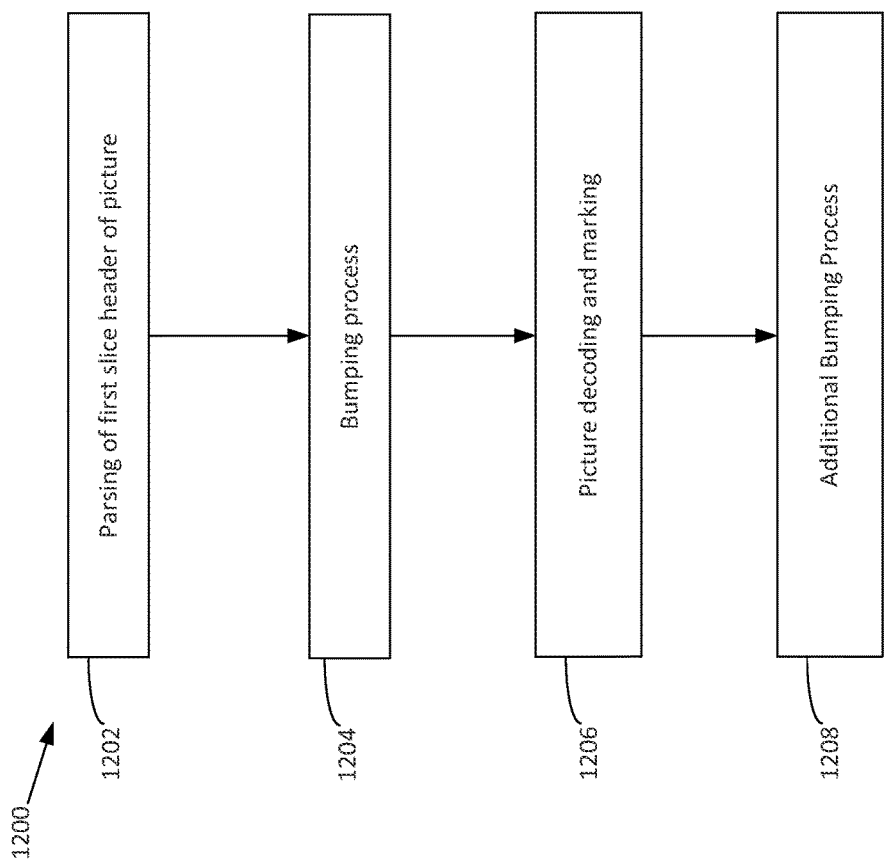
FIG. 8 is a block diagram illustrating one configuration of a method for operation of a decoded picture buffer.

FIG. 8 is a flow diagram illustrating one configuration of a method 1200 for operation of decoded picture buffer (DPB). The method 1200 may be performed by an encoder 104 or one of its sub-parts (e.g., a decoded picture buffer module 676). The method 1200 may be performed by a decoder 112 in an electronic device 102 (e.g., electronic device B 102*b*). Additionally or alternatively the method 1200 may be performed by a decoder 712 or one of its sub-parts (e.g., a decoded picture buffer module 709). The decoder may parse first slice header of a picture 1202. The output and removal of pictures from DPB before decoding of the current picture (but after parsing the slice header of the first slice of the current picture) happens instantaneously when first decoding unit of the access unit containing the current picture is removed from the CPB and proceeds as follows.

The decoding process for reference picture set (RPS) is invoked. Reference picture set is a set of reference pictures associated with a picture, consisting of all reference pictures that are prior to the associated picture in decoding order, that may be used for inter prediction of the associated picture or any picture following the associated picture in decoding order.

The bitstream of the video may include a syntax structure that is placed into logical data packets generally referred to as Network Abstraction Layer (NAL) units. Each NAL unit includes a NAL unit header, such as a two-byte NAL unit header (e.g., 16 bits), to identify the purpose of the associated data payload. For example, each coded slice (and/or picture) may be coded in one or more slice (and/or picture) NAL units. Other NAL units may be included for other categories of data, such as for example, supplemental enhancement information, coded slice of temporal sub-layer access (TSA) picture, coded slice of step-wise temporal sub-layer access (STSA) picture, coded slice a non-TSA, non-STSA trailing picture, coded slice of broken link access picture, coded slice of instantaneous decoded refresh picture, coded slice of clean random access picture, coded slice of decodable leading picture, coded slice of tagged for discard picture, video parameter set, sequence parameter set, picture parameter set, access unit delimiter, end of sequence, end of bitstream, filler data, and/or sequence enhancement information message. Table (4) illustrates one example of NAL unit codes and NAL unit type classes. Other NAL unit types may be included, as desired. It should also be understood that the NAL unit type values for the NAL units shown in the Table (4) may be reshuffled and reassigned. Also additional NAL unit types may be added. Also some NAL unit types may be removed.

An intra random access point (IRAP) picture is a coded picture for which each video coding layer NAL unit has nal_unit_type in the range of BLA_W_LP to RSV_I-RAP_VCL23, inclusive as shown in Table (4). An IRAP picture contains only Intra coded (I) slices. An instantaneous decoding refresh (IDR) picture is an IRAP picture for which each video coding layer NAL unit has nal_unit_type equal to IDR_W_RADL or IDR_N_LP as shown in Table (4). An instantaneous decoding refresh (IDR) picture contains only I slices, and may be the first picture in the bitstream in decoding order, or may appear later in the bitstream. Each IDR picture is the first picture of a coded video sequence (CVS) in decoding order. A broken link access (BLA) picture is an IRAP picture for which each video coding layer NAL unit has nal_unit_type equal to BLA_W_LP, BLA_W_RADL, or BLA_N_LP as shown in Table (4). A BLA picture contains only I slices, and may be the first picture in the bitstream in decoding order, or may appear later in the bitstream. Each BLA picture begins a new coded video sequence, and has the same effect on the decoding process as an IDR picture. However, a BLA picture contains syntax elements that specify a non-empty reference picture set.

TABLE (4)

| nal_unit_type | Name of nal_unit_type | Content of NAL unit and raw byte sequence payload (RBSP) syntax structure | NAL unit type class |
|---|---|---|---|
| 0 | TRAIL_N | Coded slice segment of a non-TSA, non-STSA trailing picture slice_segment_layer_rbsp( ) | Video Coding Layer (VCL) |
| 1 | TRAIL_R | | |
| 2 | TSA_N | Coded slice segment of a temporal sub-layer access (TSA) picture slice_segment_layer_rbsp( ) | VCL |
| 3 | TSA_R | | |
| 4 | STSA_N | Coded slice segment of an Step-wise Temporal sub-layer access (STSA) picture slice_segment_layer_rbsp( ) | VCL |
| 5 | STSA_R | | |
| 6 | RADL_N | Coded slice segment of a random access decodable leading (RADL) picture slice_segment_layer_rbsp( ) | VCL |
| 7 | RADL_R | | |
| 8 | RASL_N | Coded slice segment of a random access skipped leading (RASL) picture slice_segment_layer_rbsp( ) | VCL |
| 9 | RASL_R | | |
| 10 | RSV_VCL_N10 | Reserved non-IRAP sub-layer non-reference VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a broken link access (BLA) picture slice_segment_layer_rbsp( ) | VCL |
| 17 | BLA_W_RADL | | |
| 18 | BLA_N_LP | | |
| 19 | IDR_W_RADL | Coded slice segment of an instantaneous decoding refresh (IDR) picture slice_segment_layer_rbsp( ) | VCL |
| 20 | IDR_N_LP | | |
| 21 | CRA_NUT | Coded slice segment of a clean random access (CRA) picture slice_segment_layer_rbsp( ) | VCL |
| 22 | RSV_IRAP_VCL22 | Reserved IRAP VCL NAL unit types | VCL |
| 23 | RSV_IRAP_VCL23 | | |

TABLE (4)-continued

| nal_unit_type | Name of nal_unit_type | Content of NAL unit and raw byte sequence payload (RBSP) syntax structure | NAL unit type class |
|---|---|---|---|
| 24 . . . 31 | RSV_VCL24 . . . RSV_VCL31 | Reserved non-TRAP VCL NAL unit types | VCL |
| 32 | VPS_NUT | Video parameter set<br>video_parameter_set_rbsp( ) | non-video coding layer (non-VCL) |
| 33 | SPS_NUT | Sequence parameter set<br>seq_parameter_set_rbsp( ) | non-VCL |
| 34 | PPS_NUT | Picture parameter set<br>pic_parameter_set_rbsp( ) | non-VCL |
| 35 | AUD_NUT | Access unit delimiter<br>access_unit_delimiter_rbsp( ) | non-VCL |
| 36 | EOS_NUT | End of sequence<br>end_of_seq_rbsp( ) | non-VCL |
| 37 | EOB_NUT | End of bitstream<br>end_of_bitstream_rbsp( ) | non-VCL |
| 38 | FD_NUT | Filler data<br>filler_data_rbsp( ) | non-VCL |
| 39 | PREFIX_SEI_NUT | Supplemental enhancement information | non-VCL |
| 40 | SUFFIX_SEI_NUT | sei_rbsp( ) | |
| 41 . . . 47 | RSV_NVCL41 . . . RSV_NVCL47 | Reserved | non-VCL |
| 48 . . . 63 | UNSPEC48 . . . UNSPEC63 | Unspecified | non-VCL |

Referring to Table (5), the NAL unit header syntax may include two bytes of data, namely, 16 bits. The first bit is a "forbidden_zero_bit" which is always set to zero at the start of a NAL unit. The next six bits is a "nal_unit_type" which specifies the type of raw byte sequence payloads ("RBSP") data structure contained in the NAL unit as shown in Table (4). The next 6 bits is a "nuh_layer_id" which specify the indentifier of the layer. In some cases these six bits may be specified as "nuh_reserved_zero_6bits" instead. The nuh_reserved_zero_6bits may be equal to 0 in the base specification of the standard. In a scalable video coding and/or syntax extensions nuh_layer_id may specify that this particular NAL unit belongs to the layer identified by the value of these 6 bits. The next syntax element is "nuh_temporal_id_plus1". The nuh_temporal_id_plus1 minus1 may specify a temporal identifier for the NAL unit. The variable temporal identifier TemporalId may be specified as TemporalId=nuh_temporal_id_plus1−1. The temporal identifier TemporalId is used to identify a temporal sub-layer. The variable HighestTid identifies the highest temporal sub-layer to be decoded.

TABLE (5)

| nal_unit_header( ) { | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

Table (6) shows an exemplary sequence parameter set (SPS) syntax structure.

pic_width_in_luma_samples specifies the width of each decoded picture in units of luma samples. pic_width_in_luma_samples may not be equal to 0. pic_height_in_luma_samples specifies the height of each decoded picture in units of luma samples. pic_height_in_luma_samples may not be equal to 0. sps_max_sub_layers_minus1 plus1 specifies the maximum number of temporal sub-layers that may be present in each CVS referring to the SPS. The value of sps_max_sub_layers_minus1 may be in the range of 0 to 6, inclusive.

sps_sub_layer_ordering_info_present_flag flag equal to 1 specifies that sps_max_dec_pic_buffering_minus1 [i], sps_max_num_reorder_pics[i], and sps_max_latency_increase_plus1 [i] syntax elements are present for sps_max_sub_layers_minus1+1 sub-layers. sps_sub_layer_ordering_info_present_flag equal to 0 specifies that the values of sps_max_dec_pic_buffering_minus1 [sps_max_sub_layers_minus1], sps_max_num_reorder_pics[sps_max_sub_layers_minus1], and sps_max_latency_increase_plus1 [sps_max_sub_layers_minus1] apply to all sub-layers.

sps_max_dec_pic_buffering_minus1 [i]plus1 specifies the maximum required size of the decoded picture buffer for the CVS in units of picture storage buffers when HighestTid is equal to i. The value of sps_max_dec_pic_buffering_minus1 [i] may be in the range of 0 to MaxDpbSize−1, inclusive where MaxDpbSize specifies the maximum decoded picture buffer size in units of picture storage buffers. When i is greater than 0, sps_max_dec_pic_buffering_minus1[i] may be greater than or equal to sps_max_dec_pic_buffering_minus1[i−1]. When sps_max_dec_pic_buffering_minus1 [i] is not present for i in the range of 0 to sps_max_sub_layers_minus1−1, inclusive, due to sps_sub_layer_ordering_info_present_flag being equal to 0, it is inferred to be equal to sps_max_dec_pic_buffering_minus1[sps_max_sub_layers_minus1].

sps_max_num_reorder_pics[i] indicates the maximum allowed number of pictures that can precede any picture in the CVS in decoding order and follow that picture in output order when HighestTid is equal to i. The value of sps_max_num_reorder_pics[i] may be in the range of 0 to sps_max_dec_pic_buffering_minus1 [i], inclusive. When i is greater than 0, sps_max_num_reorder_pics[i] may be greater than or equal to sps_max_num_reorder_pics[i−1]. When sps_max_num_reorder_pics[i] is not present for i in the range of 0 to sps_max_sub_layers_minus1−1, inclusive, due to sps_sub_layer_ordering_info_present_flag being equal to 0, it is inferred to be equal to sps_max_num_reorder_pics[sps_max_sub_layers_minus1].

sps_max_latency_increase_plus1[i] not equal to 0 is used to compute the value of SpsMaxLatencyPictures[i], which specifies the maximum number of pictures that can precede any picture in the CVS in output order and follow that picture in decoding order when HighestTid is equal to i.

When sps_max_latency_increase_plus1 [i] is not equal to 0, the value of SpsMaxLatencyPictures[i] is specified as follows:

SpsMaxLatencyPictures[i]=sps_max_num_reorder_pics [i]+sps_max_latency_increase_plus1 [i]−1

When sps_max_latency_increase_plus1 [i] is equal to 0, no corresponding limit is expressed.

The value of sps_max_latency_increase_plus1 [i] may be in the range of 0 to 232-2, inclusive. When sps_max_latency_increase_plus1 [i] is not present for i in the range of 0 to sps_max_sub_layers_minus1−1, inclusive, due to sps_sub_layer_ordering_info_present_flag being equal to 0, it is inferred to be equal to sps_max_latency_increase_plus1 [sps_max_sub_layers_minus1].

TABLE (6)

```
seq_parameter_set_rbsp( ) {
  ...
  sps_max_sub_layers_minus1
  ...
  pic_width_in_luma_samples
  pic_height_in_luma_samples
  ...
  for( i = ( sps_sub_layer_ordering_info_present_flag ?
        0 : sps_max_sub_layers_minus1 );
      i <= sps_max_sub_layers_minus1; i++ ) {
    sps_max_dec_pic_buffering_minus1[ i ]
    sps_max_num_reorder_pics[ i ]
    sps_max_latency_increase_plus1[ i ]
  }
  ...
}
```

Referring to FIG. 9A, as previously described the NAL unit header syntax may include two bytes of data, namely, 16 bits. The first bit is a "forbidden_zero_bit" which is always set to zero at the start of a NAL unit. The next six bits is a "nal_unit_type" which specifies the type of raw byte sequence payloads ("RBSP") data structure contained in the NAL unit. The next 6 bits is a "nuh_reserved_zero_6bits". The nuh_reserved_zero_6bits may be equal to 0 in the base specification of the standard. Other values of nuh_reserved_zero_6bits may be specified as desired. Decoders may ignore (i.e., remove from the bitstream and discard) all NAL units with values of nuh_reserved_zero_6bits not equal to 0 when handling a stream based on the base specification of the standard. In a scalable or other extension nuh_reserved_zero_6bits may specify other values, to signal scalable video coding and/or syntax extensions. In some cases syntax element nuh_reserved_zero_6bits may be called reserved_zero_6bits. In some cases the syntax element nuh_reserved_zero_6bits may be called as layer_id_plus1 or layer_id, as illustrated in FIG. 9B and FIG. 9C. In this case the element layer_id will be layer_id_plus1 minus1. In this case it may be used to signal information related to layer of scalable coded video. The next syntax element is "nuh_temporal_id_plus1". nuh_temporal_id_plus1 minus1 may specify a temporal identifier for the NAL unit. The variable temporal identifier TemporalId may be specified as TemporalId=nuh_temporal_id_plus1−1.

Referring to FIG. 10, a general NAL unit syntax structure is illustrated. The NAL unit header two byte syntax of FIG. 9 is included in the reference to nal_unit_header( ) of FIG. 10. The remainder of the NAL unit syntax primarily relates to the RBSP.

One existing technique for using the "nuh_reserved_zero_6bits" is to signal scalable video coding information by partitioning the 6 bits of the nuh_reserved_zero_6bits into distinct bit fields, namely, one or more of a dependency ID, a quality ID, a view ID, and a depth flag, each of which refers to the identification of a different layer of the scalable coded video. Accordingly, the 6 bits indicate what layer of the scalable encoding technique this particular NAL unit belongs to.}

As previously described, scalable video coding is a technique of encoding a video bitstream that also contains one or more subset bitstreams. A subset video bitstream may be derived by dropping packets from the larger video to reduce the bandwidth required for the subset bitstream. The subset bitstream may represent a lower spatial resolution (smaller screen), lower temporal resolution (lower frame rate), or lower quality video signal. For example, a video bitstream may include 5 subset bitstreams, where each of the subset bitstreams adds additional content to a base bitstream. Hannuksela, et al., "Test Model for Scalable Extensions of High Efficiency Video Coding (HEVC)" JCTVC-L0453, Shanghai, October 2012, is hereby incorporated by reference herein in its entirety. Chen, et al., "SHVC Draft Text 1," JCTVC-L1008; Geneva, March, 2013, is hereby incorporated by reference herein in its entirety.

As previously described, multi-view video coding is a technique of encoding a video bitstream that also contains one or more other bitstreams representative of alternative views. For example, the multiple views may be a pair of views for stereoscopic video. For example, the multiple views may represent multiple views of the same scene from different viewpoints. The multiple views generally contain a large amount of inter-view statistical dependencies, since the images are of the same scene from different viewpoints. Therefore, combined temporal and inter-view prediction may achieve efficient multi-view encoding. For example, a frame may be efficiently predicted not only from temporally related frames, but also from the frames of neighboring viewpoints. B. Bros, W-J. Han, J-R. Ohm, G. J. Sullivan, and T. Wiegand, "High efficiency video coding (HEVC) text specification draft 10," JCTVC-L1003 is hereby incorporated by reference herein in its entirety. G. Tech, K. Wegner, Y. Chen, M. Hannuksela, J. Boyce, "MV-HEVC Draft Text 7," JCT3V-G1004, San Jose, January 2014; and J. Chen, J. Boyce, Y. Ye, M. M. Hannuksela, Y.-K. Wang, "High Efficiency Video Coding (HEVC) Scalable Extension Draft 5," JCTVC-P1008, San Jose, January 2014, are hereby incorporated by reference herein in their entirety. Hannuksela, et al., "Common specification text for scalable and multi-view extensions," JCTVC-L0452, Geneva, January 2013, is hereby incorporated by reference herein in its entirety, Tech, et. al. "MV-HEVC Draft Text 5 (ISO/IEC 23008-2:201x/PDAM2)," JCT3V-E1004_d3, Vienna, August 2013, is hereby incorporated by reference herein in its entirety.

Chen, et al., "SHVC Draft 3," JCTVC-N1008, Vienna, August 2013; Hannuksela, et al. "Test Model for Scalable Extensions of High Efficiency Video Coding (HEVC)," JCTVC-L0453-spec-text, Shanghai, October 2012; and Hannuksela, "Draft Text for Multiview Extension of High Efficiency Video Coding (HEVC)," JCTVC-L0452-spec-text-r1, Shanghai, October 2012; each of which is incorporated by reference herein in its entirety, each have an output order decoded picture buffer (DPB) which operates based on using sps_max_num_reorder_pics[HighestTid], sps_max_latency_increase_plus1 [HighestTid] and sps_max_dec_pic_buffering[HighestTid] syntax elements for the output and removal of pictures 0 from the DPB. This information is signaled in the video parameter set for the base layer, which provides buffering information for the video content including the enhancement layers, if any.

It was determined that signaling the output order decoded picture buffer (DPB) based on using sps_max_num_reorder_pics[HighestTid], sps_max_latency_increase_plus1[HighestTid] and sps_max_dec_pic_buffering[HighestTid] syntax elements for the output and removal of pictures from the DPB does not account for the buffer characteristics that may result from scalable video coding, such as when different numbers of enhancement layers are used which tends to vary after the content has been encoded based upon the user's viewing preferences, and the multi-view enhancement layers which tends to vary after the content has been encoded based upon the user's viewing preferences. Also it was determined that signaling the output order decoded picture buffer (DPB) based on using sps_max_num_reorder_pics[HighestTid], sps_max_latency_increase_plus1[HighestTid] and sps_max_dec_pic_buffering[HighestTid] syntax elements for the output and removal of pictures from the DPB may not be optimal in terms of the memory usage of the DPB when decoder operates at a certain operation point and/or is outputting selected output layer set. To accommodate such differences in the viewing preferences, the output order decoded picture buffer (DPB) may further and/or alternatively be based upon such syntax elements being included together with the video parameter set extension (VPS extension) to provide syntax elements for one or more of the enhancement layers. In this manner the syntax elements may be selected to be especially suitable for the particular operation point or output layer set, which tends to correspond to the user's viewing preferences.

The DPB buffering related parameters, vps_max_dec_pic_buffering_minus1, vps_max_num_reorder_pics, vps_max_latency_increase_plus1 may be signaled for sub-layers for the CVS for one or more operation points and/or for output layer sets in VPS extension. Similarly, the system may define the operation and bumping process for the output order DPB to use the above signalled DPB buffering parameters from the VPS extension if they are signalled for the operation point under test or for the selected output layer set. Otherwise the corresponding SPS level parameters from the active SPS (when currLayerId which corresponds to nuh_layer_id of the current picture is equal to 0) or from the active layer SPS depending upon the layer_id of the current layer are used.

An exemplary vps_Extension syntax is defined in JCTVC-N1008 and JCT3V-E1004 which is incorporated here by reference. Referring to FIG. 10X, an exemplary modified vps_extension is illustrated. The modified vps extension includes new syntax, namely, vps_sub_layer_ordering_info_present_flag[i], max_vps_dec_pic_buffering_minus1 [i][k][j], max_vps_num_reorder_pics[i][j], max_vps_latency_increase_plus1 [i][j]. NumOutputLayerSets may be derived as defined in JCTVC-N1008. NumLayersInOutputLayerSet[i] may be set equal to numLAyersInIdList[output_layer_set_idx[i]] where output_layer_set_idx[i] specifies the index lsIdx of the layer set for which output_layer_flag[lsIdx][j] is present as defined in JCTVC-N1008.

Referring to FIG. 10X The vps_sub_layer_ordering_info_present_flag[j] indicates whether the syntax separately specified for temporal sub-layers or only one syntax is specified which applies to all the temporal sub-layers. The vps_sub_layer_ordering_info_present_flag[j] equal to 1 specifies that max_vps_dec_pic_buffering_minus1 [i][k][j], max_vps_num_reorder_pics[j][k], and max_vps_latency_increase_plus1 [j][k] are present for for i in the range 1 to vps_max_sub_layers_minus1-1, inclusive for each output layer set. The vps_sub_layer_ordering_info_present_flag[j] equal to 0 specifies that the values of max_vps_dec_pic_buffering_minus1 [i][k][vps_max_sub_layers_minus1] max_vps_num_reorder_pics[i][k][vps_max_sub_layers_minus1], and max_vps_latency_increase_plus1 [i][k][vps_max_sub_layers_minus1] apply to all sub-layers for each output layer set.

max_vps_dec_pic_buffering_minus1 [i][k][j]plus1 specifies the maximum required size of the k-th layer for the CVS in the i-th output layer set in units of picture storage buffers when HighestTid is equal to j. When j is greater than 0, max_vps_dec_pic_buffering_minus1[i][k][j] may be greater than or equal to max_vps_dec_pic_buffering_minus1 [i][k][j−1]. When max_vps_dec_pic_buffering_minus1 [i][k][j] is not present for j in the range of 1 to vps_max_sub_layers_minus1-1, inclusive, it is inferred to be equal to max_vps_dec_pic_buffering_minus1 [i][k][vps_max_sub_layers_minus1].

max_vps_num_reorder_pics[i][j] indicates the maximum allowed number of access units containing a picture with PicOutputFlag equal to 1 that can precede any access unit that contains a picture with PicOutputFlag equal to 1 in the i-th output layer set in the CVS in decoding order and follow the access unit that contains a picture with PicOutputFlag equal to 1 in output order, and when HighestTid is equal to j. When max_vps_num_reorder_pics[i][j] is not present for j in the range of 1 to vps_max_sub_layers_minus1−1, inclusive, it is inferred to be equal to max_vps_num_reorder_pies[i][vps_max_sub_layers_minus1].

max_vps_latency_increase_plus1 [i][j] not equal to 0 is used to compute the value of VpsMaxLatencyPictures[i][j], which specifies the maximum number of access units containing a picture with PicOutputFlag equal to 1 in the i-th output layer set that can precede any access unit that contains a picture with PicOutputFlag equal to 1 in the CVS in output order and follow the access unit that contains a picture with PicOutputFlag equal to 1 in decoding order when HighestTid is equal to j. When max_vps_latency_increase_plus1 [i][j] is not present for j in the range of 1 to vps_max_sub_layers_minus1−1, inclusive, it is inferred to be equal to max_vps_latency_increase_plus1 [i][vps_max_sub_layers_minus1].

When max_vps_latency_increase_plus1 [i][j] is not equal to 0, the value of VpsMaxLatencyPictures[i][j] is specified as follows:

VpsMaxLatencyPictures[i][j]=max_vps_num_reorder_pics[i][j]+max_vps_latency_increase_plus1 [i][j]−1

When max_vps_latency_increase_plus1 [i][j] is equal to 0, no corresponding limit is expressed. The value of max_vps_latency_increase_plus1 [i][j] may be in the range of 0 to 232-2, inclusive.

Referring to FIG. 10A, an exemplary modified vps_extension is illustrated. The modified vps extension includes new syntax, namely, num_op_dpb_info_parameters and operation_point_layer_set_idx[i]. This modified vps extension may be defined in terms of the operation point which is a bitstream created from another bitstream by operation of a sub-bitstream extraction process with the another bitstream, a target highest TemporalId, and a target layer identifier list as inputs.

num_output_layer_sets specifies the number of layer sets for which output layers are specified with output_layer_set_index[i] and output_layer_flag[lsIdx][j]. When not present, the value of num_output_layer_sets is inferred to be equal to 0. A layer set describing output layers is an output layer set.

output_layer_set_idx[i] specifies the index lsIdx of the layer set for which output_layer_flag[lsIdx][j] is present.

output_layer_flag[lsIdx][j] equal to 1 specifies that the layer with nuh_layer_id equal to j is a target output layer of the lsIdx-th layer set. A value of output_layer_flag[lsIdx][j] equal to 0 specifies that the layer with nuh_layer_id equal to j is not a target output layer of the lsIdx-th layer set.

The num_op_dpb_info_parameters specifies the number of op_dpb_parameters( ) syntax structures present in the VPS extension RBSP, defined in terms of the operation point. The num_op_dpb_info_parameters decoders is in the range of 0 to vps_num_layer_sets_minus1, inclusive.

The operation_point_layer_set_idx[i] specifies the index, into the list of layer sets defined by operation points to which the i-th op_dpb_info_parameters( ) syntax structure in the VPS extension applies. The value of operation_point_layer_set_idx[i] may be in the range of 0 to vps_num_layer_sets_minus1, inclusive. For bitstream conformance the operation_point_layer_set_idx[i] is not equal to operation_point_layer_set_idx[j] for any j not equal to i.

Referring to FIG. 11A, the op_dpb_info_parameters specifies vps_max_sub_layers_minus1[j], vps_sub_layer_ordering_info_present_flag[j], vps_max_dec_pic_buffering_minus1 [j][k], vps_max_num_reorder_pics[j][k], and vps_max_latency_increase_plus1 [j][k].

The vps_max_sub_layers_minus1 [j]plus1 indicates how many sub layers are included. The vps_max_sub_layers_minus1 [j]plus1 specifies the maximum number of temporal sub-layers that may be present in the CVS for layer with nuh_layer_id equal to j. The value of vps_max_sub_layers_minus1 [j] is in the range of 0 to 6, inclusive.

The vps_sub_layer_ordering_info_present_flag[j] indicates whether the syntax is for one set including all layers or for each individual layer. The vps_sub_layer_ordering_info_present_flag[j] equal to 1 specifies that vps_max_dec_pic_buffering_minus1 [j][k], vps_max_num_reorder_pics[j][k], and vps_max_latency_increase_plus1 [j][k] are present for layer with nuh_layer_id equal to j for vps_max_sub_layers_minus1 [j]+1 sub-layers. The vps_sub_layer_ordering_info_present_flag[j] equal to 0 specifies that the values of vps_max_dec_pic_buffering_minus1 [j][vps_max_sub_layers_minus1 [j]], vps_max_num_reorder_pics[j][vps_max_sub_layers_minus1[j]], and vps_max_latency_increase_plus1 [j][vps_max_sub_layers_minus1 [j]] apply to all sub-layers for layer with nuh_layer_id equal to j.

The vps_max_dec_pic_buffering_minus1 [j][k]plus1 specifies the maximum required size of the decoded picture buffer for the CVS for layer with nuh_layer_id equal to j in units of picture storage buffers when HighestTid is equal to k. The value of vps_max_dec_pic_buffering_minus1 [j][k] may be in the range of 0 to MaxDpbSize−1 (as specified in subclause A.4), inclusive. When k is greater than 0, vps_max_dec_pic_buffering_minus1[j][k] may be greater than or equal to vps_max_dec_pic_buffering_minus1 [j][k−1]. When vps_max_dec_pic_buffering_minus1 [j][k] is not present for k in the range of 0 to vps_max_sub_layers_minus1 [j]−1, inclusive, due to vps_sub_layer_ordering_info_present_flag[j] being equal to 0, it is inferred to be equal to vps_max_dec_pic_buffering_minus1 [j][vps_max_sub_layers_minus1 [j]].

The vps_max_num_reorder_pics[j][k] indicates the maximum allowed number of pictures that can precede any picture in the CVS for layer with nuh_layer_id equal to j in decoding order and follow that picture in output order when HighestTid is equal to k. The value of vps_max_num_reorder_pics[j][k] may be in the range of 0 to vps_max_dec_pic_buffering_minus1 [j][k], inclusive. When k is greater than 0, vps_max_num_reorder_pics[j][k] is greater than or equal to vps_max_num_reorder_pics[j][k−1]. When vps_max_num_reorder_pics[j][k] is not present for k in the range of 0 to vps_max_sub_layers_minus1[j]−1, inclusive, due to vps_sub_layer_ordering_info_present_flag[j] being equal to 0, it is inferred to be equal to vps_max_num_reorder_pics[j][vps_max_sub_layers_minus1 [j]].

The vps_max_latency_increase_plus1 [j][k] not equal to 0 is used to compute the value of VpsMaxLatencyPictures [j][k], which specifies the maximum number of pictures that can precede any picture in the CVS for layer with nuh_layer_id equal to j in output order and follow that picture in decoding order when HighestTid is equal to k.

When vps_max_latency_increase_plus1 [j][k] is not equal to 0, the value of VpsMaxLatencyPictures[j][k] may be specified as follows:
VpsMaxLatencyPictures[j][k]=vps_max_num_reorder_pics [j][k]+vps_max_latency_increase_plus1 [j][k]−1

When vps_max_latency_increase_plus1 [j][k] is equal to 0, no corresponding limit is expressed.

The value of vps_max_latency_increase_plus1 [j][k] is in the range of 0 to 232-2, inclusive. When vps_max_latency_increase_plus1 [j][k] is not present for k in the range of 0 to vps_max_sub_layers_minus1 [j]−1, inclusive, due to vps_sub_layer_ordering_info_present_flag[j] being equal to 0, it is inferred to be equal to vps_max_latency_increase_plus1 [j][vps_max_sub_layers_minus1 [j]].

The vps_max_sub_layers_minus1 [id][j]plus1 specifies the maximum number of temporal sub-layers that may be present in the CVS for layer with nuh_layer_id equal to j for the operation point associated with index id. The value of vps_max_sub_layers_minus1 [id][j] may be in the range of 0 to 6, inclusive.

The vps_sub_layer_ordering_info_present_flag[id][j] equal to 1 specifies that vps_max_dec_pic_buffering_minus1 [id][j][k], vps_max_num_reorder_pics[id][j][k], and vps_max_latency_increase_plus1 [id][j][k] are present for layer with nuh_layer_id equal to j for the operation point associated with index id for vps_max_sub_layers_minus1 [id][j]+1 sub-layers. vps_sub_layer_ordering_info_present_flag[id][j] equal to 0 specifies that the values of vps_max_dec_pic_buffering_minus1 [id][j][vps_max_sub_layers_minus1 [id][j]], vps_max_num_reorder_pics[id][j][vps_max_sub_layers_minus1 [id][j]], and vps_max_latency_increase_ plus1[id][j][vps_max_sub_layers_minus1 [id][j]] apply to all sub-layers for layer with nuh_layer_id equal to j for the operation point associated with index id.

The vps_max_dec_pic_buffering_minus1 [id][j][k]plus1 specifies the maximum required size of the decoded picture buffer for the CVS for layer with nuh_layer_id equal to j for the operation point associated with index id in units of picture storage buffers when HighestTid is equal to k. The value of vps_max_dec_pic_buffering_minus1 [id][j][k] may be in the range of 0 to MaxDpbSize−1 (as specified in subclause A.4), inclusive. When k is greater than 0, vps_max_dec_pic_buffering_minus1 [id][j][k] may be greater than or equal to vps_max_dec_pic_buffering_minus1[id][j][k−1]. When vps_max_dec_pic_buffering_minus1 [id][j][k] is not present for k in the range of 0 to vps_max_sub_layers_minus1 [id][j]−1, inclusive, due to vps_sub_layer_ordering_info_present_flag[id][j] being equal to 0, it is inferred to be equal to vps_max_dec_pic_suffering_minus1 [id][j][vps_max_sub_layers_minus1 [id][j]].

The vps_max_num_reorder_pics[id][j][k] indicates the maximum allowed number of pictures that can precede any picture in the CVS for layer with nuh_layer_id equal to j for the operation point associated with index id in decoding order and follow that picture in output order when HighestTid is equal to k. The value of vps_max_num_reorder_pics [id][j][k] may be in the range of 0 to vps_max_dec_pic_buffering_minus1 [id][j][k], inclusive. When k is greater than 0, vps_max_num_reorder_pics[id][j][k] may be greater than or equal to vps_max_num_reorder_pics[id][j][k−1]. When vps_max_num_reorder_pics[id][j][k] is not present for k in the range of 0 to vps_max_sub_layers_minus1 [id][j]−1, inclusive, due to vps_sub_layer_reordering_info_present_flag[id][j] being equal to 0, it is inferred to be equal to vps_max_num_reorder_pics[id][j][vps_max_sub_layers_minus1 [id][j]].

The vps_max_latency_increase_plus1 [id][j][k] not equal to 0 is used to compute the value of VpsMaxLatencyPictures [id][j][k], which specifies the maximum number of pictures that can precede any picture in the CVS for layer with nuh_layer_id equal to j for the operation point associated with index id in output order and follow that picture in decoding order when HighestTid is equal to k.

When vps_max_latency_increase_plus1 [id][j][k] is not equal to 0, the value of VpsMaxLatencyPictures[id][j][k] is specified as follows:
VpsMaxLatencyPictures[id][j][k]=vps_max_num_reorder_pics[id][j][k]+vps_max_latency_increase_plus1 [id][j][k]−1

When vps_max_latency_increase_plus1 [id][j][k] is equal to 0, no corresponding limit is expressed.

The value of vps_max_latency_increase_plus1 [id][j][k] may be in the range of 0 to $2^{32}-2$, inclusive. When vps_max_latency_increase_plus1 [id][j][k] is not present for k in the range of 0 to vps_max_sub_layers_minus1 [id][j]−1, inclusive, due to vps_sub_layer_ordering_info_present_flag [id][j] being equal to 0, it is inferred to be equal to vps_max_latency_increase_plus1 [id][j][vps_max_sub_layers_minus1 [id][j]].

Referring to FIG. 11B, the op_dpb_info_parameters may be further modified as shown to op_dpb_info_parameters (id,j). In this case the syntax of VPS extension may be as illustrated in FIG. 10B. The hypothetical reference decoder (HRD) is used to check bitstream and decoder conformance. Two types of bitstreams or bitstream subsets are subject to HRD conformance checking for the Joint Collaborative Team on Video Coding (JCT-VC). The first type, called a Type I bitstream, is a NAL unit stream containing only the VCL NAL units and NAL units with nal_unit_type equal to FD_NUT (filler data NAL units) for all access units in the bitstream. The second type, called a Type II bitstream, contains, in addition to the VCL NAL units and filler data NAL units for all access units in the bitstream, at least one of (a) additional non-VCL NAL units other than filler data NAL units, and (b) all leading_zero_8bits, zero_byte, start_code_prefix_pne_3bytes, and trailing_zero_8bits syntax elements that form a byte stream from the NAL unit stream.

The syntax elements of non-VCL NAL units (or their default values for some of the syntax elements), required for the HRD, are specified in the semantic subclauses of clause 7, Annexes D and E.

Two types of HRD parameter sets (NAL HRD parameters and VCL HRD parameters) are used. The HRD parameter sets are signalled through the hrd_parameters( ) syntax structure, which may be part of the SPS syntax structure or the VPS syntax structure.

Multiple tests may be needed for checking the conformance of a bitstream, which is referred to as the bitstream under test. For each test, the following steps apply in the order listed:

(1) An operation point under test, denoted as TargetOp, is selected. The layer identifier list OpLayerIdList of TargetOp consists of the list of nuh_layer_id values, in increasing order of nuh_layer_id values, present in the bitstream subset associated with TargetOp, which is a subset of the nuh_layer_id values present in the bitstream under test. The OpTid of TargetOp is equal to the highest TemporalId present in the bitstream subset associated with TargetOp.

(2) TargetDecLayerIdList is set equal to OpLayerIdList of TargetOp, HighestTid is set equal to OpTid of TargetOp, and the sub-bitstream extraction process as specified in clause 10 is invoked with the bitstream under test, HighestTid, and TargetDecLayerIdList as inputs, and the output is assigned to BitstreamToDecode.

(3) The hrd_parameters( ) syntax structure and the sub_layer_hrd_parameters( ) syntax structure applicable to TargetOp are selected. If TargetDecLayerIdList contains all nuh_layer_id values present in the bitstream under test, the hrd_parameters( ) syntax structure in the active SPS (or provided through an external means not specified in this Specification) is selected. Otherwise, the hrd_parameters( ) syntax structure in the active VPS (or provided through some external means not specified in this Specification) that applies to TargetOp is selected. Within the selected hrd_parameters( ) syntax structure, if BitstreamToDecode is a Type I bitstream, the sub_layer_hrd_parameters(HighestTid) syntax structure that immediately follows the condition "if (vcl_hrd_parameters_present_flag)" is selected and the variable NalHrdModeFlag is set equal to 0; otherwise (BitstreamToDecode is a Type II bitstream), the sub_layer_hrd_parameters(HighestTid) syntax structure that immediately follows either the condition "if(vcl_hrd_parameters_present_flag)" (in this case the variable NalHrdModeFlag is set equal to 0) or the condition "if(nal_hrd_parameters_present_flag)" (in this case the variable NalHrdModeFlag is set equal to 1) is selected. When BitstreamToDecode is a Type II bitstream and NalHrdModeFlag is equal to 0, all non-VCL NAL units except filler data NAL units, and all leading_zero_8bits, zero_byte, start_code_prefix_one_3bytes, and trailing_zero_8bits syntax elements that form a byte stream from the NAL unit stream (as specified in Annex B), when present, are discarded from BitstreamToDecode, and the remaining bitstream is assigned to BitstreamToDecode.

In another case Multiple tests may be needed for checking the conformance of a bitstream, which is referred to as the bitstream under test. For each test, the following steps apply in the order listed:

(1) An output layer set under test, denoted as TargetOpLs is selected. The operation point referred in TargetOpLs by output_layer_set_idx[ ] identifies the operation point under test. The output layer identifier list OpLayerIdList of TargetOpLs consists of the list of nuh_layer_id values, in increasing order of nuh_layer_id values, present in the bitstream subset associated with TargetOp and TargetOpLs, which is a subset of the nuh_layer_id values present in the bitstream under test. The OpTid of TargetOp is equal to the highest TemporalId present in the bitstream subset associated with TargetOp.

(2) TargetDecLayerIdList is set equal to target decoded layer identifier list targetDLayerIdList for the selected output layer set TargetOpLs, HighestTid is set equal to OpTid of TargetOp, and the sub-bitstream extraction process as specified in clause 10 is invoked with the bitstream under test, HighestTid, and TargetDecLayerIdList as inputs, and the output is assigned to BitstreamToDecode.

(3) The hrd_parameters( ) syntax structure and the sub_layer_hrd_parameters( ) syntax structure applicable to TargetOp are selected. If TargetDecLayerIdList contains all nuh_layer_id values present in the bitstream under test, the hrd_parameters( ) syntax structure in the active SPS (or provided through an external means not specified in this Specification) is selected. Otherwise, the hrd_parameters( ) syntax structure in the active VPS (or provided through some external means not specified in this Specification) that applies to TargetOp is selected. Within the selected hrd_parameters( ) syntax structure, if BitstreamToDecode is a Type I bitstream, the sub_layer_hrd_parameters(HighestTid) syntax structure that immediately follows the condition "if (vcl_hrd_parameters_present_flag)" is selected and the variable NalHrdModeFlag is set equal to 0; otherwise (BitstreamToDecode is a Type II bitstream), the sub_layer_hrd_parameters(HighestTid) syntax structure that immediately follows either the condition "if(vcl_hrd_parameters_present_flag)" (in this case the variable NalHrdModeFlag is set equal to 0) or the condition "if(nal_hrd_parameters_present_flag)" (in this case the variable NalHrdModeFlag is set equal to 1) is selected. When BitstreamToDecode is a Type II bitstream and NalHrdModeFlag is equal to 0, all non-VCL NAL units except filler data NAL units, and all leading_zero_8bits, zero_byte, start_code_prefix_one_3bytes, and trailing_zero_8bits syntax elements that form a byte stream from the NAL unit stream (as specified in Annex B), when present, are discarded from BitstreamToDecode, and the remaining bitstream is assigned to BitstreamToDecode.

A conforming decoder may fulfil all requirements specified in this subclause.

(1) A decoder claiming conformance to a specific profile, tier and level may be able to successfully decode all bitstreams that conform to the bitstream conformance requirements specified in subclause C.4, in the manner specified in Annex A, provided that all VPSs, SPSs and PPSs referred to in the VCL NAL units, and appropriate buffering period and picture timing SEI messages are conveyed to the decoder, in a timely manner, either in the bitstream (by non-VCL NAL units), or by external means not specified in this Specification.

(2) When a bitstream contains syntax elements that have values that are specified as reserved and it is specified that decoders may ignore values of the syntax elements or NAL units containing the syntax elements having the reserved values, and the bitstream is otherwise conforming to this Specification, a conforming decoder may decode the bitstream in the same manner as it would decode a conforming bitstream and may ignore the syntax elements or the NAL units containing the syntax elements having the reserved values as specified.

There are two types of conformance of a decoder: output timing conformance and output order conformance.

To check conformance of a decoder, test bitstreams conforming to the claimed profile, tier and level, as specified in subclause C.4 are delivered by a hypothetical stream scheduler (HSS) both to the HRD and to the decoder under test (DUT). All cropped decoded pictures output by the HRD may also be output by the DUT, each cropped decoded picture output by the DUT may be a picture with PicOutputFlag equal to 1, and, for each such cropped decoded picture output by the DUT, the values of all samples that are output may be equal to the values of the samples produced by the specified decoding process.

For output timing decoder conformance, the HSS operates as described above, with delivery schedules selected only from the subset of values of SchedSelIdx for which the bit rate and CPB size are restricted as specified in Annex A for the specified profile, tier and level, or with "interpolated" delivery schedules as specified below for which the bit rate and CPB size are restricted as specified in Annex A. The same delivery schedule is used for both the HRD and the DUT.

When the HRD parameters and the buffering period SEI messages are present with cpb_cnt_minus1 [HighestTid] greater than 0, the decoder may be capable of decoding the bitstream as delivered from the HSS operating using an "interpolated" delivery schedule specified as having peak bit rate r, CPB size c(r), and initial CPB removal delay (f(r) □□□r) as follows:

$$\alpha=(r-BitRate[SchedSelIdx-1])\square(BitRate[SchedSelIdx]-BitRate[SchedSelIdx-1]), \quad (C\text{-}22)$$

$$c(r)=\square*CpbSize[SchedSelIdx]+(1-\square\square*CpbSize[SchedSelIdx-1], \quad (C\text{-}23)$$

$$f(r)=\square\square\square\square InitCpbRemovalDelay[SchedSelIdx]*BitRate[SchedSelIdx]+(1-\square\square\square\square InitCpbRemovalDelay[SchedSelIdx-1]*BitRate[SchedSelIdx-1] \quad (C\text{-}24)$$

for any SchedSelIdx>0 and r such that BitRate[SchedSelIdx-1]<=r<=BitRate[SchedSelIdx] such that r and c(r) are within the limits as specified in Annex A for the maximum bit rate and buffer size for the specified profile, tier and level. The InitCpbRemovalDelay[SchedSelIdx] can be different from one buffering period to another and have to be re-calculated.

For output timing decoder conformance, an HRD as described above is used and the timing (relative to the delivery time of the first bit) of picture output is the same for both the HRD and the DUT up to a fixed delay.

For output order decoder conformance, the following applies:

(1) The HSS delivers the bitstream BitstreamToDecode to the DUT "by demand" from the DUT, meaning that the HSS delivers bits (in decoding order) only when the DUT requires more bits to proceed with its processing. This means that for this test, the coded picture buffer of the DUT could be as small as the size of the largest decoding unit.

(2) A modified HRD as described below is used, and the HSS delivers the bitstream to the HRD by one of the schedules specified in the bitstream BitstreamToDecode such that the bit rate and CPB size are restricted as specified in Annex A. The order of pictures output may be the same for both the HRD and the DUT.

(3) The HRD CPB size is given by CpbSize[SchedSelIdx] as specified in subclause E.2.3, where SchedSelIdx and the HRD parameters are selected as specified in subclause C.1. The DPB size is given by sps_max_dec_pic_buffering_minus1 [HighestTid]+1 from the active SPS (when nuh_layer_id for the current decoded picture is equal to 0) or from the active layer SPS for the value of nuh_layer_id of the current decoded picture. In some cases, if DPB information parameters are signaled in VPS extension for the selected output layer set for example as in FIG. 10X, the DPB size is given by max_vps_dec_pic_buffering_minus1[TargetOutputLayerId][currLayerId][HighestTid] when Let TargetOutputLayerId be the index to the entry in the list of output layer sets signalled in the VPS that corresponds to the set of target output layers TargetOptLayerIdList.

In other cases for example other varaints in FIG. 10A, 10B in this scenario the DPB size is given by vps_max_dec_pic_buffering_minus1 [HighestTid] when currLayerId is equal to 0 or is set to vps_max_dec_pic_buffering_minus1 [CurrLayerId][HighestTid] for the currLayerId for the operation point under test when currLayerId is greater than 0, where currLayerId is the nuh_layer_id of the current decoded picture. Otherwise if operation point DPB information parameters op_dp_info_parameters( ) are not present for the operation point under test, the DPB Size is given by sps_max_dec_pic_buffering_minus1[HighestTid]+1 from the active SPS (when nuh_layer_id for the current decoded picture is equal to 0) or from the active layer SPS for the value of nuh_layer_id of the current decoded picture.

In some cases, if output layer sets DPB information parameters oop_dp_info_parameters( ) are present for the selected output layer set, The DPB size is given by vps_max_dec_pic_buffering_minus1 [HighestTid] when currLayerId is equal to 0 or is set to vps_max_dec_pic_buffering_minus1 [CurrLayerId][HighestTid] for the currLayerId for the selected output layer set, where currLayerId is the nuh_layer_id of the current decoded picture. Otherwise if output layer sets DPB information parameters oop_dp_info_parameters( ) are not present for the selected output layer set, the DPB Size is given by sps_max_dec_pic_buffering_minus1[HighestTid]+1 from the active SPS (when nuh_layer_id for the current decoded picture is equal to 0) or from the active layer SPS for the value of nuh_layer_id of the current decoded picture.

The removal time from the CPB for the HRD is the final bit arrival time and decoding is immediate. The operation of the DPB of this HRD is as described in subclauses C.5.2 through C.5.2.3.

The decoded picture buffer contains picture storage buffers. The number of picture storage buffers for nuh_layer_id equal to 0 is derived from the active SPS. The number of picture storage buffers for each non-zero nuh_layer_id value is derived from the active layer SPS for that non-zero nuh_layer_id value. Each of the picture storage buffers contains a decoded picture that is marked as "used for reference" or is held for future output. The process for output and removal of pictures from the DPB as specified in subclause F.13.5.2.2 is invoked, followed by the invocation of the process for picture decoding, marking, additional bumping, and storage as specified in subclause F.13.5.2.3. The "bumping" process is specified in subclause F.13.5.2.4 and is invoked as specified in subclauses F.13.5.2.2 and F.13.5.2.3.

The output and removal of pictures from the DPB before the decoding of the current picture (but after parsing the slice header of the first slice of the current picture) happens instantaneously when the first decoding unit of the access unit containing the current picture is removed from the CPB and proceeds as follows.

The decoding process for RPS as specified in subclause 8.3.2 is invoked.

(1) If the current picture is an IRAP picture with NoRaslOutputFlag equal to 1 and with nuh_layer_id equal to 0 that is not picture 0, the following ordered steps are applied:
  (A) The variable NoOutputOfPriorPicsFlag is derived for the decoder under test as follows:
    (i) If the current picture is a CRA picture, NoOutputOfPriorPicsFlag is set equal to 1 (regardless of the value of no_output_of_prior_pics_flag).
    (ii) Otherwise, if the value of pic_width_in_luma_samples, pic_height_in_luma_samples, or sps_max_dec_pic_buffering_minus1[HighestTid] derived from the active SPS is different from the value of pic_width_in_luma_samples, pic_height_in_luma_samples, or sps_max_dec_pic_buffering_minus1 [HighestTid], respectively, derived from the SPS active for the preceding picture, NoOutputOfPriorPicsFlag may (but should not) be set to 1 by the decoder under test, regardless of the value of no_output_of_prior_pics_flag. Although setting NoOutputOfPriorPicsFlag equal to no_output_of_prior_pics_flag is preferred under these conditions, the decoder under test is allowed to set NoOutputOfPriorPicsFlag to 1 in this case.
    (iii) Otherwise, NoOutputOfPriorPicsFlag is set equal to no_output_of_prior_pics_flag.
  (B) The value of NoOutputOfPriorPicsFlag derived for the decoder under test is applied for the HRD as follows:
    (i) If NoOutputOfPriorPicsFlag is equal to 1, all picture storage buffers in the DPB are emptied without output of the pictures they contain, and the DPB fullness is set equal to 0.
    (ii) Otherwise (NoOutputOfPriorPicsFlag is equal to 0), all picture storage buffers containing a picture that is marked as "not needed for output" and "unused for reference" are emptied (without output), and all non-empty picture storage buffers in the DPB are emptied by repeatedly invoking the "bumping" process specified in subclause F.13.5.2.4, and the DPB fullness is set equal to 0.
    (iii) Otherwise (the current picture is not an IRAP picture with NoRaslOutputFlag equal to 1 and with nuh_layer_id equal to 0), all picture storage buffers containing a picture which are marked as "not needed for output" and "unused for reference" are emptied (without output). For each picture storage buffer that is emptied, the DPB fullness is decremented by one. The variable currLayerId is set equal to nuh_layer_id of the current decoded picture.

The variables MaxNumReorderPics[currLayerId][HighestTid], MaxLatencyIncreasePlus1 [currLayerId][HighestTid], MaxLatencyPictures[currLayerId][HighestTid], MaxDecPicBufferingMinus1 [currLayerId][HighestTid] are derived as follows:

When a coded video sequence conforming to one or more of the profiles specified in Annex A is decoded by applying the decoding process specified in clauses 2-10, MaxNumReorderPics[currLayerId][HighestTid] is set to sps_max_num_reorder_pics[HighestTid] from the active SPS, MaxLatencyIncreasePlus1 [currLayerId][HighestTid] is set to sps_max_latency_increase_plus1 [HighestTid] of the active SPS, MaxLatencyPictures[currLayerId][HighestTid] is set to SpsMaxLatencyPictures[HighestTid] of the active SPS, MaxDecPicBufferingMinus1 [currLayerId][HighestTid] is set to sps_max_dec_pic_buffering_minus1 [HighestTid] of the active SPS.

When a coded video sequence conforming to one or more of the profiles specified in Annex G or H is decoded by applying the decoding process specified in clauses 2-10, Annex F, and Annex G or H, MaxNumReorderPics[currLayerId][HighestTid] is set to max_vps_num_reorder_pics [TargetOutputLayerId][HighestTid] of the active VPS, MaxLatencyIncreasePlus1 [currLayerId][HighestTid] is set to max_vps_latency_increase_plus1 [TargetOutputLayerId][HighestTid] of the active VPS, MaxLatencyPictures[curr- LayerId][HighestTid] is set to VpsMaxLatencyPictures [TargetOutputLayerId][HighestTid] of the active VPS, MaxDecPicBufferingMinus1 [currLayerId][HighestTid] is set to max_vps_dec_pic_buffering_minus1[TargetOutputLayerId][currLayerId][HighestTid] of the active VPS.

In a variant embodiment the variables MaxNumReorderPics[TargetOp][currLayerId][HighestTid], MaxLatencyIncreasePlus1 [TargetOp][currLayerId][HighestTid], MaxLatencyPictures[TargetOp][currLayerId][HighestTid], MaxDecPicBufferingMinus1 [TargetOp] [currLayerId][HighestTid] are derived as follows based on the current operation point under test:

(1) If operation point DPB information parameters op_dp_info_parameters( ) are present for the operation point under test TargetOp, MaxNumReorderPics[TargetOp][currLayerId][HighestTid] is set to vps_max_num_reorder_pics [HighestTid] when currLayerId is equal to 0 or is set to vps_max_num_reorder_pics[TargetOp][CurrLayerId][HighestTid] for the currLayerId for the operation point under test when currLayerId is greater than 0. Otherwise if operation point DPB information parameters op_dp_info_parameters( ) are not present for the operation point under test MaxNumReorderPics[TargetOp][currLayerId][HighestTid] is set to sps_max_num_reorder_pics[HighestTid] from the active SPS (when currLayerId is equal to 0) or from the active layer SPS for the value of currLayerId.

(2) If operation point DPB information parameters op_dpb_info_parameters( ) are present for the operation point under test TargetOp, MaxLatencyIncreasePlus1 [TargetOp][currLayerId][HighestTid] is set to vps_max_latency_increase_plus1 [HighestTid] when currLayerId is equal to 0 or is set to vps_max_latency_increase_plus1 [TargetOp][CurrLayerId][HighestTid] for the currLayerId for the operation point under test when currLayerId is greater than 0. If operation point DPB information parameters op_dpb_info_parameters( ) are present for the operation point under test, MaxLatencyPictures[TargetOp][currLayerId][HighestTid] is set to VpsMaxLatencyPictures[HighestTid] when currLayerId is equal to 0 or is set to VpsMaxLatencyPictures[TargetOp][CurrLayerId][HighestTid] for the currLayerId for the operation point under test when currLayerId is greater than 0. Otherwise if operation point DPB information parameters op_dp_info_parameters( ) are not present for the operation point under test, MaxLatencyIncreasePlus1 [TargetOp][currLayerId][HighestTid] is set to sps_max_latency_increase_plus1 [HighestTid] of the active SPS (when currLayerId is equal to 0) or the active layer SPS for the value of currLayerId and MaxLatencyPictures[TargetOp][currLayerId][HighestTid] is set to SpsMaxLatencyPictures [HighestTid] derived from the active SPS (when currLayerId is equal to 0) or from the active layer SPS for the value of currLayerId.

(3) If operation point DPB information parameters op_dpb_info_parameters( ) are present for the selected operation point under test TargetOp, MaxDecPicBufferingMinus1 [TargetOp] [currLayerId][HighestTid] is set to vps_max_dec_pic_buffering_minus1 [HighestTid] when currLayerId is equal to 0 or is set to vps_max_dec_pic_buffering_minus1 [TargetOp][CurrLayerId][HighestTid] for the currLayerId for the operation point under test when currLayerId is greater than 0. Otherwise if operation point DPB information parameters op_dpb_info_parameters( ) are not present for the operation point under test, MaxDecPicBufferingMinus1 [TargetOp][currLayerId][HighestTid] is set to sps_max_dec_pic_buffering_minus1 [HighestTid] from the active SPS (when currLayerId is equal to 0) or from the active layer SPS for the value of currLayerId.

When one or more of the following conditions are true, the "bumping" process specified in subclause F.13.5.2.4 is invoked repeatedly while further decrementing the DPB fullness by one for each additional picture storage buffer that is emptied, until none of the following conditions are true:

(1) The number of access units that contain at least one picture, that is marked as "needed for output" is greater than MaxNumReorderPics[currLayerId][HighestTid].

(2) If MaxLatencyIncreasePlus1 [currLayerId][HighestTid] is not equal to 0 and there is at least one access unit that contains a picture that is marked as "needed for output" for which the associated variable PicLatencyCount is greater than or equal to MaxLatencyPictures[currLayerId][HighestTid].

(3) The number of pictures with nuh_layer_id equal to currLayerId in the associated sub-DPB is greater than or equal to MaxDecPicBufferingMinus1 [currLayerId][HighestTid]+1.

The processes specified in this subclause happen instantaneously when the last decoding unit of access unit n containing the current picture is removed from the CPB.

The variable currLayerId is set equal to nuh_layer_id of the current decoded picture.

For each picture in the DPB that is marked as "needed for output" and that has a nuh_layer_id value equal to currLayerId, the associated variable PicLatencyCount[currLayerId] is set equal to PicLatencyCount[currLayerId]+1.

The current picture is considered as decoded after the last decoding unit of the picture is decoded. The current decoded picture is stored in an empty picture storage buffer in the DPB, and the following applies:

(A) If the current decoded picture has PicOutputFlag equal to 1, it is marked as "needed for output" and its associated variable PicLatencyCount[currLayerId] is set equal to 0.

(B) Otherwise (the current decoded picture has PicOutputFlag equal to 0), it is marked as "not needed for output". The current decoded picture is marked as "used for short-term reference".

When one or more of the following conditions are true, the "bumping" process specified in subclause F.13.5.2.4 is invoked repeatedly until none of the following conditions are true:

(A) The number of number of access units that contain at least one picture that is marked as "needed for output" is greater than MaxNumReorderPics[currLayerId][HighestTid].

(B) MaxLatencyIncreasePlus1[currLayerId][HighestTid] is not equal to 0 and there is at least one access unit containing a picture that is marked as "needed for output" for which the associated variable PicLatencyCount[currLayerId] that is greater than or equal to MaxLatencyPictures [currLayerId][HighestTid].

In a variant embodiment when one or more of the following conditions are true, the "bumping" process specified in subclause F.13.5.2.4 is invoked repeatedly while further decrementing the DPB fullness by one for each additional picture storage buffer that is emptied, until none of the following conditions are true:

(1) The number of pictures with nuh_layer_id equal to currLayerId in the DPB that are marked as "needed for output" is greater than MaxNumReorderPics[TargetOp][CurrLayerId][HighestTid].

(2) If MaxLatencyIncreasePlus1 [TargetOp][CurrLayerId][HighestTid] is not equal to 0 and there is at least one picture with nuh_layer_id equal to currLayerId in the DPB that is marked as "needed for output" for which the associated variable PicLatencyCount[currLayerId] is greater than or equal to MaxLatencyPictures[TargetOp][CurrLayerId][HighestTid].

(3) The number of pictures with nuh_layer_id equal to currLayerId in the DPB is greater than or equal to MaxDecPicBufferingMinus1 [TargetOp][CurrLayerId][HighestTid]+1.

The processes specified in this subclause happen instantaneously when the last decoding unit of access unit n containing the current picture is removed from the CPB.

The variable currLayerId is set equal to nuh_layer_id of the current decoded picture.

For each picture in the DPB that is marked as "needed for output" and that has a nuh_layer_id value equal to currLayerId, the associated variable PicLatencyCount[currLayerId] is set equal to PicLatencyCount[currLayerId]+1.

The current picture is considered as decoded after the last decoding unit of the picture is decoded. The current decoded picture is stored in an empty picture storage buffer in the DPB, and the following applies:

(A) If the current decoded picture has PicOutputFlag equal to 1, it is marked as "needed for output" and its associated variable PicLatencyCount[currLayerId] is set equal to 0.

(B) Otherwise (the current decoded picture has PicOutputFlag equal to 0), it is marked as "not needed for output".

The current decoded picture is marked as "used for short-term reference".

When one or more of the following conditions are true, the "bumping" process specified in subclause F.13.5.2.4 is invoked repeatedly until none of the following conditions are true.

(A) The number of pictures with nuh_layer_id equal to currLayerId in the DPB that are marked as "needed for output" is greater than MaxNumReorderPics[TargetOp][CurrLayerId][HighestTid].

(B) MaxLatencyIncreasePlus1 [TargetOp][CurrLayerId][HighestTid] is not equal to 0 and there is at least one picture with nuh_layer_id equal to currLayerId in the DPB that is marked as "needed for output" for which the associated variable PicLatencyCount[currLayerId] is greater than or equal to MaxLatencyPictures[TargetOp][CurrLayerId][HighestTid].

In other case the variables MaxNumReorderPics[currLayerId][HighestTid], MaxLatencyIncreasePlus1 [currLayerId][HighestTid], MaxLatencyPictures[currLayerId][HighestTid], MaxDecPicBufferingMinus1 [currLayerId][HighestTid] may be derived as follows:

(1) If operation point DPB information parameters op_dp_info_parameters( ) are present for the operation point under test, MaxNumReorderPics[currLayerId][HighestTid] is set to vps_max_num_reorder_pics[HighestTid] when currLayerId is equal to 0 or is set to vps_max_num_reorder_pics[CurrLayerId][HighestTid] for the currLayerId for the operation point under test when currLayerId is greater than 0. Otherwise if operation point DPB information parameters op_dp_info_parameters( ) are not present for the operation point under test MaxNumReorderPics[currLayerId][HighestTid] is set to sps_max_num_reorder_pics[HighestTid] from the active SPS (when currLayerId is equal to 0) or from the active layer SPS for the value of currLayerId.

(2) If operation point DPB information parameters op_dp_info_parameters( ) are present for the operation point under test, MaxLatencyIncreasePlus1[currLayerId][HighestTid] is set to vps_max_latency_increase_plus1 [HighestTid] when currLayerId is equal to 0 or is set to vps_max_latency_increase_plus1 [CurrLayerId][HighestTid] for the currLayerId for the operation point under test when currLayerId is greater than 0. If operation point DPB information parameters op_dp_info_parameters( ) are present for the operation point under test, MaxLatencyPictures[currLayerId][HighestTid] is set to VpsMaxLatencyPictures [HighestTid] when currLayerId is equal to 0 or is set to VpsMaxLatencyPictures [CurrLayerId][HighestTid] for the currLayerId for the operation point under test when currLayerId is greater than 0. Otherwise if operation point DPB information parameters op_dp_info_parameters( ) are not present for the for the operation point under test, MaxLatencyIncreasePlus1[currLayerId][HighestTid] is set to sps_max_latency_increase_plus1 [HighestTid] of the active SPS (when currLayerId is equal to 0) or the active layer SPS for the value of currLayerId and MaxLatencyPictures[currLayerId][HighestTid] is set to SpsMaxLatencyPictures [HighestTid] derived from the active SPS (when currLayerId is equal to 0) or from the active layer SPS for the value of currLayerId.

(3) If operation point DPB information parameters op_dp_info_parameters( ) are present for the selected operation point under test, MaxDecPicBufferingMinus1 [currLayerId][HighestTid] is set to vps_max_dec_pic_buffering_minus1 [HighestTid] when currLayerId is equal to 0 or is set to vps_max_dec_pic_buffering_minus1 [CurrLayerId][HighestTid] for the currLayerId for the operation point under test when currLayerId is greater than 0. Otherwise if operation point DPB information parameters op_dpb_info_parameters( ) are not present for the operation point under test, MaxDecPicBufferingMinus1 [currLayerId][HighestTid] is set to sps_max_dec_pic_buffering_minus1 [HighestTid] from the active SPS (when currLayerId is equal to 0) or from the active layer SPS for the value of currLayerId.

When one or more of the following conditions are true, the "bumping" process specified in subclause F.13.5.2.4 is invoked repeatedly while further decrementing the DPB fullness by one for each additional picture storage buffer that is emptied, until none of the following conditions are true:

(1) The number of pictures with nuh_layer_id equal to currLayerId in the DPB that are marked as "needed for output" is greater than MaxNumReorderPics[CurrLayerId][HighestTid].

(2) If MaxLatencyIncreasePlus1 [CurrLayerId][HighestTid] is not equal to 0 and there is at least one picture with nuh_layer_id equal to currLayerId in the DPB that is marked as "needed for output" for which the associated variable PicLatencyCount[currLayerId] is greater than or equal to MaxLatencyPictures[CurrLayerId][HighestTid].

(3) The number of pictures with nuh_layer_id equal to currLayerId in the DPB is greater than or equal to MaxDecPicBuffering[CurrLayerId][HighestTid].

The processes specified in this subclause happen instantaneously when the last decoding unit of access unit n containing the current picture is removed from the CPB.

The variable currLayerId is set equal to nuh_layer_id of the current decoded picture.

For each picture in the DPB that is marked as "needed for output" and that has a nuh_layer_id value equal to currLayerId, the associated variable PicLatencyCount[currLayerId] is set equal to PicLatencyCount[currLayerId]+1.

The current picture is considered as decoded after the last decoding unit of the picture is decoded. The current decoded picture is stored in an empty picture storage buffer in the DPB, and the following applies:

(A) if the current decoded picture has PicOutputFlag equal to 1, it is marked as "needed for output" and its associated variable PicLatencyCount[currLayerId] is set equal to 0.

(B) Otherwise (the current decoded picture has PicOutputFlag equal to 0), it is marked as "not needed for output".

The current decoded picture is marked as "used for short-term reference".

When one or more of the following conditions are true, the "bumping" process specified in subclause F.13.5.2.4 is invoked repeatedly until none of the following conditions are true.

(A) The number of pictures with nuh_layer_id equal to currLayerId in the DPB that are marked as "needed for output" is greater than MaxNumReorderPics[CurrLayerId][HighestTid].

(B) MaxLatencyIncreasePlus1 [CurrLayerId][HighestTid] is not equal to 0 and there is at least one picture with nuh_layer_id equal to currLayerId in the DPB that is marked as "needed for output" for which the associated variable PicLatencyCount[currLayerId] is greater than or equal to MaxLatencyPictures[CurrLayerId][HighestTid].

The "bumping" process consists of the following ordered steps:

(A) The pictures that are first for output are selected as the ones having the smallest value of PicOrderCntVal of all pictures in the DPB marked as "needed for output".

(B) These pictures are cropped, using the conformance cropping window specified in the active SPS for the picture with nuh_layer_id equal to 0 or in the active layer SPS for a nuh_layer_id value equal to that of the picture, the cropped pictures are output in ascending order of nuh_layer_id, and the pictures are marked as "not needed for output".

(C) Each picture storage buffer that contains a picture marked as "unused for reference" and that included one of the pictures that was cropped and output is emptied.

The VPS Extension may have additional modifications, if desired.

Referring to FIG. 12, an additional modification may include the DPB parameters being sent in the VPS extension for output layer sets instead of for operation points, where the oops_dp_info_parameters(j) are illustrated in FIG. 13.

The num_dpb_info_parameters specifies the number of oop_dpb_parameters( ) syntax structures present in the VPS extension RBSP. num_dp_info_parameters decoders may be in the range of 0 to num_output_layer_sets, inclusive.

The output_point_layer_set_dx[i] specifies the index, into the list of target output layer sets to which the i-th oop_dp_info_parameters( ) syntax structure in the VPS extension applies.

The value of output_point_layer_set_idx[i] should be in the range of 0 to num_output_layer_sets, inclusive. It is requirement of bitstream conformance that output_point_layer_set_idx [i] may not be equal to output_point_layer_set_idx [j] for any j not equal to i.

Referring to FIG. 14, the oop_dpb_info_paremters(c) may be further modified, where the syntax in the VPS extension may be as illustrated in FIG. 15.

Referring to FIG. 16, the oop_dp_info_paremters(c) may be further modified, where the syntax in the VPS extension may be as illustrated in FIG. 17 or FIG. 18.

An exemplary alternative for the syntax in VPS extension is that

```
for( j = 0; j <= vps_max_layer_id; j++ )
    oop_dpb_info_parameters(j)
``` may be changed to

```
for( j = 0; j <= vps_max_layers_minus1; j++ )
    oop_dpb_info_parameters(j)
```

The vps_max_layer_id specifies the maximum allowed value of nuh_layer_id of all NAL units in the CVS. The vps_max_layers_minus1, specifies the maximum number of layers that may be present in the CVS, wherein a layer may e.g. be a spatial scalable layer, a quality scalable layer, a texture view or a depth view.

Another exemplary alternative for the syntax in VPS extension is that

```
for( j = 0; j <= vps_max_layer_id; j++ )
    oop_dpb_info_parameters(j)
``` may be changed to

```
for( j = 0; j < numOutputLayers; j++ )
    oop_dpb_info_parameters(j)
``` where numOutputLayers for the selected output layer set index opIsIdx is derived as:

```
for(k=0, numOutputLayers=0;k<=vps_max_layer_id;k++)
    if(output_layer_flag[opLsIdx][k])
        targetOpLayerIdList [numOutputLayers++]=layer_id_in_nuh[k].
```

Another exemplary alternative for the syntax in VPS extension is that

```
for( j = 0; j <= vps_max_layer_id; j++ )
    oop_dpb_info_parameters(j)
``` may be changed to

```
for( j = 0; j < numDecodedLayers; j++ )
    oop_dpb_info_parameters(j)
``` where numOutputLayers for the selected opIsIdx is derived as:

```
for(k=0, numOutputLayers=0;k<=vps_max_layer_id;k++)
if(output_layer_flag[opLsIdx][k])
    targetOpLayerIdList [numOutputLayers++]=layer_id_in_nuh[k].
```

Then a target decoded layer identifier list targetDLayerIdList and numDecodedLayers for the selected opIsIdx is derived as:

```
for(m=0, numDecodedLayers=0;m< numOutputLayers;m++) {
 for(n=0;n<NumDirectRefLayers[LayerIdInVps[targetOpLayerIdList[m]]];
n++) {
    rLid=RefLayerId[LayerIdInVps[targetOpLayerIdList[m]]][n]
    if(rLid not included in targetDLayerIdList[0,..., numDecodedLayers])
        targetDLayerIdList[numDecodedLayers++]=rLid;
    }
 }
```

In one embodiment an additional flag maybe signalled to indicate if oop_dpb_information_parameters are signalled for the particular layer as follows:

```
for( j = 0; j <= vps_max_layer_id; j++ ) {
    vps_layer_info_present_flag[j]                u(1)
    if(vps_layer info_present_flag)
        oop_dpb_info_parameters(j)
}
```

The vps_layer_info_present_flag[j] equal to 1 specifies that oop_dpb_info_parameters are present for the j'th layer for the particular output layer set. vps_layer_info_present_flag[j] equal to 0 specifies that oop_dpb_info_parameters are not present for the j'th layer for the particular output layer set.

In another embodiment num_dpb_info_parameters decoders may be in the range of 0 to 1024, inclusive. In yet another embodiment a different fixed number could be used in place of 1024.

In an alternative embodiment output_point_layer_set_idx [i] is in the range of 0 to 1023, inclusive.

Referring to FIG. 19, another modified VPS extension and layer_dpb_info(i) may be used if the DPB parameters are sent in the VPS extension for each layer independently of output layer sets and operation points.

Referring to FIG. 20, a modified layer_dpb_info(i) may be used where the syntax element vps_max_sub_layer_minus1 signaled from VPS is used for all the layers and is not separately signalled in oop_dpb_info_parameters(id)/op_dpb_info_parameters(id).

Referring to FIG. 1 as mentioned previously the decoded picture buffer (DPB) 122 may include separately identified and managed picture buffers for decoded pictures having different characteristics. For example, the decoded picture buffer (DPB) 122 may include separately identified and managed picture buffers for decoded pictures with different resolutions, different bit-depths and/or different color chromaticity. In this case there may be a separate DPB for each layer or some layers who have the same picture charactertistics (e.g. resolution, bit-depth, chromaticity, etc.) may share a DPB. In this case there will be different DPBs for different picture characteristics such as resolution, bit-depth, chromaticity etc. Based on the application needs in some case a separate DPB for each layer may be beneficial, e.g. in terms of simplicity of DPB book-keeping and DPB operation. Such a DPB can be termed layer-wise DPB. On the other hand for some other applications a shared DPB where layers with the same picture characteristics share a DPB may be beneficial. Such a shared DPB based on picture characteristics may be termed a picture characteristics based shared DPB. As a result it may be advantageous to support both the layer-wise DPB and picture charatersitics based shared DPB operation.

Typically a picture charatersitics based shared DPB requires specifying additional information regarding number of shared DPBs, their size, resolution, bit-depth, picture characteristics, etc. These parameters could be termed shared DPB information parameters (e.g. shared_dpb_info_parameters( )), In a preferred embodiment a flag may be signaled in the bitstream to indicate that shared DPB information parameters are signaled. An example syntax for this is shown as follows:

```
shared_dpb_info_present_flag                u(1)
    if(shared_dpb_info_present_flag)
        shared_dpb_info_parameters(j)
}
``` shared_dpb_info_present_flag equal to 1 specifies that shared DPB information parameters are present and the DPB may operate as shared DPB or layer-wise separate DPB for each layer.

shared_dpb_info_present_flag equal to 0 specifies that shared DPB information parameters are not present and the DPB operates as layer-wise separate DPB for each layer. When shared_dpb_info_present_flag is not present, its value is inferred to be equal to 0.

The shared_dpb_info_present_flag may be signaled in a parameter set such as video parameter set (VPS) and/or sequence parameter set (sps) and/or picture parameter set (pps) and/or slice segment header and/or in any other normative part of the bitstream. In a preferred embodiment the shared_dpb_info_present_flag may be signaled in hrd_parameters( ). hrd_parameters( ) are described in JCTVC-L1003, JCTVC-N1008, and JCT3V-E1004.

The sequence parameter set (SPS) is a syntax structure containing syntax elements that apply to zero or more entire CVSs as determined by the content of a syntax element found in the PPS referred to by a syntax element found in each slice segment header.

The picture parameter set (PPS) is a syntax structure containing syntax elements that apply to zero or more entire coded pictures as determined by a syntax element found in each slice segment header.

The video parameter set (VPS) is a syntax structure containing syntax elements that apply to zero or more entire CVSs as determined by the content of a syntax element found in the SPS referred to by a syntax element found in the PPS referred to by a syntax element found in each slice segment header.

The slice segment header is a part of a coded slice segment containing the data elements pertaining to the first or all coding tree units represented in the slice segment.

In one case when shared_dpb_info_present_flag in the selected hrd_parameters( ) syntax structure is equal to 1, the DPB can is scheduled to operate either at operate as shared DPB in which case a variable SharedDPBFlag is set equal to 1 or as layer-wise separate DPB for each layer in which case the variable SharedDPBFlag is set equal to 0.

A variable SharedDPBPreferredFlag may be either specified by external means, or when not specified by external means, may be set equal to 0.

When the value of the variable SharedDPBFlag has not been set by step described above based on the shared_dpb_info_present_flag in hrd_parameters( ), it may be derived as follows:
SharedDPBFlag=shared_dpb_info_present_flag && SharedDPBPreferredFlag In other case the variable SharedDPBFlag may be set based on some other logical combination (.e.g OR, NOR, XOR, AND, NAND, NOT etc.) of the shared_dpb_info_present_flag and/or SharedDPBPreferredFlag.

If SharedDPBFlag is equal to 0, each layer has its own separate DPB and the DPB of each layer operates deparately and independently without sharing of DPBs across the layers. Otherwise the DPB operates as a shared DPB where layers which have the same picture characteristics such as resolution, bit-depth, chromaticity, etc. share a common DPB.

In another embodiment a shared_sub_dpb_info_present_flag may be signaled. In an example embodiment the flag may be signaled inside dpb_size( ) syntax and may be used to control signaling shared sub-dpb related parameters such as max_vps_dec_pic_buffering_minus1 [i][k][j]. An example for this signaling is shown below:

```
dpb_size( ) {
    shared_sub_dpb_info_present_flag                                           u(1)
    for( i = 1; i < NumOutputLayerSets; i++ ) {
        sub_layer_flag_info_present_flag[ i ]                                  u(1)
        for( j = 0; j <= MaxSubLayersInLayerSetMinus1[ i ]; j++ ) {
            if( j > 0 && sub_layer_flag_info_present_flag[ i ] )
                sub_layer_dpb_info_present_flag[ i ][ j ]                      u(1)
            if( sub_layer_dpb_info_present_flag[ i ][ j ] ) {
                if(shared_sub_dpb_info_present_flag ) {
                    for( k = 0; k < NumSubDpbs[ LayerSetIdxForOutputLayerSet[ i ] ]; k++ )
                        max_vps_dec_pic_buffering_minus1[ i ][ k ][ j ]        ue(v)
                }
                max_vps_num_reorder_pics[ i ][ j ]                             ue(v)
                if( NumSubDpbs[ LayerSetIdxForOutputLayerSet[ i ] ] !=
                        NumLayersInIdList[ LayerSetIdxForOutputLayerSet[ i ] ] )
                    for( k = 0; k < NumLayersInIdList[ LayerSetIdxForOutputLayerSet[ i ] ]; k++ )
                        max_vps_layer_dec_pic_buff_minus1[ i ][ k ][ j ]       ue(v)
                max_vps_latency_increase_plus1[ i ][ j ]                       ue(v)
            }
        }
    }
}
``` shared_sub_dpb_info_present_flag equal to 1 specifies that shared sub-DPB related parameters are present and the sub-DPB may operate as shared sub-DPB. shared_sub_dpb_info_present_flag equal to 0 specifies that shared sub-DPB information parameters are not present and the DPB operates as layer-wise separate DPB for each layer. When shared_sub_dpb_info_present_flag is not present, its value is inferred to be equal to 0.

In an alternate embodiment when shared_sub_dpb_info_present_flag is not present, its value is inferred to be equal to 0.

In yet another alternate embodiment the shared_sub_dpb_info_present_flag equal to 1 specifies that max_vps_dec_pic_buffering_minus1 [i][k][j] parameters are present. shared_sub_dpb_info_present_flag equal to 0 specifies that max_vps_dec_pic_buffering_minus1 [i][k][j] parameters are not present. When shared_sub_dpb_info_present_flag is not present, its value is inferred to be equal to 0.

Additionally the process for derivation of the number of sub-DPBs and assigning a sub-DPB to each layer included in the layer set is performed only when shared_sub_dpb_info_present_flag is equal to 1. An example embodiment for this is shown below.

In some embodiments the value of shared_sub_dpb_info_present_flag may be required to be equal to 0 when some other syntax elements have certain values. An example of this is shown next.

In some embodiments max_tid_ref_present_flag and max_tid_il_ref_pics_plus1 [i][j] syntax elements may be signaled in vps extension as shown below.

```
vps_extension( ) {
    ...
    max_tid_ref_present_flag                                                   u(1)
    if( max_tid_ref_present_flag )
        for( i = 0; i < MaxLayersMinus1; i++ )
            for( j = i + 1; j <= MaxLayersMinus1; j++ )
                if( direct_dependency_flag[ j ][ i ] )
                    max_tid_il_ref_pics_plus1[ i ][ j ]                        u(3)
    ...
}
``` max_tid_ref_present_flag equal to 1 specifies that the syntax element max_tid_il_ref_pics_plus1 [i][j] is present.

max_tid_ref_present_flag equal to 0 specifies that the syntax element max_tid_il_ref_pics_plus1 [i][j] is not present.

max_tid_il_ref_pics_plus1 [i][j] equal to 0 specifies that within the CVS non-IRAP pictures with nuh_layer_id equal to layer_id_in_nuh[i] are not used as reference for inter-layer prediction for pictures with nuh_layer_id equal to layer_id_in_nuh[j]. max_tid_il_ref_pics_plus1[i][j] greater than 0 specifies that within the CVS pictures with nuh_layer_id equal to layer_id_in_nuh[i] and TemporalId greater than max_tid_il_ref_pics_plus1 [i][j]−1 are not used as reference for inter-layer prediction for pictures with nuh_layer_id equal to layer_id_in_nuh[j]. When not present, max_tid_il_ref_pics_plus1 [i][j] is inferred to be equal to 7.

In some cases it may be a requirement of bitstream conformance that when max_tid_il_ref_pics_plus1 [i][j] is equal to 0 for any value of i, shared_sub_dpb_info_present_flag may be equal to 0.

In other embodiment it may be a requirement of bitstream conformance that when max_tid_il_ref_pics_plus1[i][j] is not equal to 7 for any value of i, shared_sub_dpb_info_present_flag may be equal to 0.

In yet another embodiment it may be a requirement of bitstream conformance that when max_tid_ref_present_flag is equal to 0, shared_sub_dpb_info_present_flag may be equal to 0.

The variable MaxSubLayersInLayerSetMinus1[i] is derived as follows:

```
for( i = 1; i < NumOutputLayerSets; i++) {
    maxSLMinus1 = 0
    optLsIdx = LayerSetIdxForOutputLayerSet[ i ]
```

```
            for( k = 0; k < NumLayersInIdList[ optLsIdx ]; k++ ) {
                lId = LayerSetLayerIdList[ optLsIdx ][ k ]          (F-5)
                maxSLMinus1 =Max( maxSLMinus1, sub_layers_vps_max_
                    minus1[ LayerIdxInVps[ lId ] ] )
            }
            MaxSubLayersInLayerSetMinus1[ i ] = maxSLMinus1
        }
```

If shared_sub_dpb_info_present_flag is equal to 1, for each layer set specified by the VPS, the following applies for derivation of the number of sub-DPBs and assigning a sub-DPB to each layer included in the layer set:

Let lsIdx be equal to the layer set index of the layer set.
For i from 0 to NumLayersInIdList[lsIdx]−1, inclusive, the arrays layerSpatRes, layerColourFormat, and layerBitDepthId are derived as follows:

The entries layerSpatRes[i][0] and layerSpatRes[i][1] are set equal to the values of pic_width_vps_in_luma_samples and pic_height_vps_in_luma_samples, respectively, of the vps_rep_format_idx[LayerIdxInVps[LayerSetLayerIdList[lsIdx][i]]]-th rep_format( ) syntax structure in the VPS.

The entry layerColourFormat[i] is set equal to the value of chroma_format_vps_idc of the vps_rep_format_idx[LayerIdxInVps[LayerSetLayerIdList[lsIdx][i]]]-th rep_format( ) syntax structure in the VPS.

The entries layerBitDepth[i][0] and layerBitDepth[i][1] are set equal to the values of bit_depth_vps_luma_minus8 and bit_depth_vps_chroma_minus8, respectively, of the vps_rep_format_idx[LayerIdxInVps[LayerSetLayerIdList[lsIdx][i]]]-th rep_format( ) syntax structure in the VPS.

The following applies:

```
if(shared_sub_dpb_info_present_flag==1)
{
    subDpbCtr = 1
    SubDpbAssigned[ IsIdx ][ 0 ] = 0
    subDpbSpatRes[ 0 ][ 0 ] = layerSpatRes[ 0 ][ 0 ]
    subDpbSpatRes[ 0 ][ 1 ] = layerSpatRes[ 0 ][ 1 ]
    subDpbColourFormat[ 0 ] = layerColourFormat[ 0 ]
    subDpbBitDepth[ 0 ][ 0 ] = layerBitDepth[ 0 ][ 0 ]
    subDpbBitDepth[ 0 ][ 1 ] = layerBitDepth[ 0 ][ 1 ]
    for( i = 1; i < NumLayersInIdList[ IsIdx ]; i++) {
        newSubDpbFlag = 1
        for( j = 0; j < subDpbCtr && bNewSubDpb; j++ )
            if( layerSpatRes[ i ][ 0 ] == subDpbSpatRes[ j ][ 0 ] &&
                layerSpatRes[ i ][ 1 ] == subDpbSpatRes[ j ][ 1 ] &&
                layerColourFormat[ i ] == subDpbColourFormat[ j ] &&
                layerBitDepth[ i ][ 0 ] == subDpbBitDepth[ j ][ 0 ] &&
                layerBitDepth[ i ][ 1 ] == subDpbBitDepth[ j ][ 1 ] ) {
                SubDpbAssigned[ IsIdx ][ i ] = j
            newSubDpbFlag = 0
            j = subDpbCtr
            }
        if( newSubDpbFlag ) {
            subDpbSpatRes[ subDpbCtr ][ 0 ] = layerSpatRes[ i ][ 0 ]
            subDpbSpatRes[ subDpbCtr ][ 1 ] = layerSpatRes[ i ][ 1 ]
            subDpbColourFormat[ subDpbCtr ] = layerColourFormat[ i ]
            subDpbBitDepth[ subDpbCtr ][ 0 ] = layerBitDepth[ i ][ 0 ]
            subDpbBitDepth[ subDpbCtr ][ 1 ] = layerBitDepth[ i ][ 1 ]
            SubDpbAssigned[ IsIdx ][ i ] = subDpbCtr++
        }
    }
    NumSubDpbs[ IsIdx ] = subDpbCtr
}
else
{
    for( i = 1; i < NumLayersInIdList[ IsIdx ]; i++) {
    {
        SubDpbAssigned[ IsIdx ][ i ]=i;
    }
}
```

If shared_sub_dpb_info_present_flag is equal to 1 for the lsIdx-th layer set, the number of sub-DPBs is NumSubDpbs[lsIdx], and for each layer with a particular value of nuh_layer_id in the layer set, the sub-DPB with index SubDpbAssigned[lsIdx][layerIdx] is assigned, where LayerSetLayerIdList[lsIdx][layerIdx] is equal to nuh_layer_id.

Otherwise (when shared_sub_dp_info_present_flag is equal to 0) for the lsIdx-th layer set, the number of sub-DPBs is NumLayersInIdList[lsIdx], and for each layer with a particular value of nuh_layer_id in the layer set, the sub-DPB with index SubDpbAssigned[lsIdx][layerIdx] is assigned, where LayerSetLayerIdList[lsIdx][layerIdx] is equal to nuh_layer_id.

Also in one embodiment max_vps_dec_pic_buffering_minus1 [i][k][j]plus1 specifies the maximum required size of the k-th sub-DPB for the CVS in the i-th output layer set in units of picture storage buffers when HighestTid is equal to j. When j is greater than 0, max_vps_dec_pic_buffering_minus1 [i][k][j] may be greater than or equal to max_vps_dec_pic_buffering_minus1 [i][k][j−1].

When shared_sub_dp_info_present_flag is equal to 0 max_vps_dec_pic_buffering_minus1 [i][k][j] is inferred to be equal to max_vps_layer_dec_pic_buff_minus1 [i][k][j].

When shared_sub_dp_info_present_flag is equal to 1 and max_vps_dec_pic_buffering_minus1[i][k][j] is not present for j in the range of 1 to MaxSubLayersInLayerSetMinus1 [i], inclusive, it is inferred to be equal to max_vps_dec_pic_buffering_minus1[i][k][j−1].

The dpb_size( ) syntax structure provides information regarding the size of the decoded picture buffer.

```
dpb_size( ) {
    for( i = 1; i < NumOutputLayerSets; i++ ) {
        sub_layer_flag_info_present_flag[ i ]                                    u(1)
        for( j = 0; j <= MaxSubLayersInLayerSetMinus1[ i ]; j++ ) {
            if( j > 0 && sub_layer_flag_info_present_flag[ i ] )
                sub_layer_dpb_info_present_flag[ i ][ j ]                        u(1)
            if( sub_layer_dpb_info_present_flag[ i ][ j ] ) {
                for( k = 0; k < NumSubDpbs[ LayerSetIdxForOutputLayerSet[ i ] ]; k++ )
                    max_vps_dec_pic_buffering_minus1[ i ][ k ][ j ]              ue(v)
                max_vps_num_reorder_pics[ i ][ j ]                               ue(v)
                if( NumSubDpbs[ LayerSetIdxForOutputLayerSet[ i ] ] !=
                        NumLayersInIdList[ LayerSetIdxForOutputLayerSet[ i ] ] )
                    for( k = 0; k < NumLayersInIdList[ LayerSetIdxForOutputLayerSet[ i ] ]; k++ )
                        max_vps_layer_dec_pic_buff_minus1[ i ][ k ][ j ]         ue(v)
                max_vps_latency_increase_plus1[ i ][ j ]                         ue(v)
            }
```

-continued

```
    }
   }
}
```

The size of the decoded picture buffer is based upon several parameters, including, the number of output layer sets (e.g., NumOutputLayerSets), the maximum sub-layers in the layer set (e.g., MaxSubLayersInLayerSetMinus1), and a pair of additional parameters. The first of the additional parameters relates to size of the decoded picture buffer of the shared sub-layer (e.g., max_vps_dec_pic_buffering_minus1 [i][k][j]). The second of the additional parameters relates to the size of the decoded picture buffer of each layer (e.g., max_vps_layer_dec_pic_buff_minus1 [i][k][j]).

The max_vps_dec_pic_buffering_minus1 [i][k][j]plus1 specifies the maximum required size of the k-th sub-DPB for the CVS in the i-th output layer set in units of picture storage buffers when HighestTid is equal to j. When j is greater than 0, max_vps_dec_pic_buffering_minus1 [i][k][j] may be greater than or equal to max_vps_dec_pic_buffering_minus1 [i][k][j−1]. When max_vps_dec_pic_buffering_minus1 [i][k][j] is not present for j in the range of 1 to MaxSubLayersInLayerSetMinus1 [i], inclusive, it is inferred to be equal to max_vps_dec_pic_buffering_minus1 [i][k][j−1].

The max_vps_layer_dec_pic_buff_minus1[i][k][j]plus1 specifies the maximum number of decoded pictures, of the k-th layer for the CVS in the i-th output layer set, that need to be stored in the DPB when HighestTid is equal to j. When j is greater than 0, max_vps_layer_dec_pic_buff_minus1 [i][k][j] may be greater than or equal to max_vps_layer_dec_pic_buff_minus1 [i][k][j−1]. When max_vps_layer_dec_pic_buff_minus1 [i][k][j] is not present for j in the range of 1 to MaxSubLayersInLayerSetMinus1 [i], inclusive, it is inferred to be equal to max_vps_layer_dec_pic_buff_minus1 [i][k][j−1].

For example, a video may include a base layer 0, and enhancement layers 1, 2, and 3. The parameters for each of the layers (i.e. 4 sets of) are signaled. If all 4 layers can share sub-DPB with one another due to them having same representation format, then NumSubDpbs is 1 and 1 additional set of parameters max_vps_dec_pic_buffering_minus1 [i][k][j] are provided. Thus a total of 5 sets of parameters (one set for max_vps_dec_pic_buffering_minus1 [i][k][j] and 4 sets for max_vps_layer_dec_pic_buff_minus1 [i][k][j]) are provided.

For example, a video may include a base layer 0, and enhancement layers 1, 2, and 3. The parameters for each of the layers (i.e. 4 sets of max_vps_layer_dec_pic_buff_minus1 [i][k][j]) are signaled. The parameters for each of the layer (i.e. 4) are signaled. If layers 0 and 1 can share sub-DPB and layers 2 and 3 can share sub-DPB shared, then 2 additional sets of parameters (max_vps_dec_pic_buffering_minus1 [i][k][j]) are provided. Thus a total of 6 sets of parameters (two sets for max_vps_dec_pic_buffering_minus1 [i][k][j] and 4 sets for max_vps_layer_dec_pic_buff_minus1 [i][k][j]) are provided.

As it may be observed, depending on the particular configuration the overall size requirements of the decoded picture buffer size will vary. It is desirable to include maximum DPB size level limit constraints for per-layer sub-DPB parameters max_vps_layer_dec_pic_buff_minus1 [ ][ ][ ] and for (shared) sub-DPB parameters max_vps_dec_pic_buffering_minus1 [ ][ ][ ] for SHVC and MV-HEVC profiles.

In JCTVC-P1008 and JCT3V-G1004, the DPB parameters are signalled in dpb_size( ) syntax structure in Video Parameter Set (VPS). dpb_size( ) signals various DPB parameters for output layer sets for number of temporal sub-layers for number of sub-DPBs and for number of layers when number of sub-DPBs is different than number of layers. The DPB operation is defined based on parameters signaled in Video Parameter Set (VPS) and Sequence Parameter Set (SPS).

In JCTVC-P1008 and JCT3V-G1004, the representation formats signaled in VPS provide an upper bound on the representation format values used by layers with nuh_layer_id>0. This is because when update_rep_format_flag is equal to 1, it is a requirement of bitstream conformance that the value of chroma_format_idc, separate_colour_plane_flag, pic_width_in_luma_samples, pic_height_in_luma_samples, bit_depth_luma_minus8, or bit_depth_chroma_minus8 may be less than or equal to chroma_format_vps_idc, separate_colour_plane_vps_flag, pic_width_vps_in_luma_samples, pic_height_vps_in_luma_samples, bit_depth_vps_luma_minus8, or bit_depth_vps_chroma_minus8, respectively, of the vps_rep_format_idx[j]-th rep_format( ) syntax structure in the active VPS, where j is equal to LayerIdxInVps[layerIdCurr].

Because of this the per-layer maximum sub-DPB size level limit constraint should use the appropriate representation format parameters signalled in VPS.

For the (possibly) shared sub-DPBs currently no max sub-DPB size level limits are defined in SHVC scalable main and scalable main 10 and MV-HEVC stereo main profiles. The qualification "(possibly)" refers to the aspect that depending upon the representation format of each layer the sub-DPB may not actually be shared among layers. For brevity the qualification "(possibly)" is omitted from now on in this document when referring to the shared sub-DPB.

It is desirable to define per-layer and shared DPB capacity level limits for SHVC and MV-HEVC profiles. Maximum DPB size level limit constraints for per-layer sub-DPB parameters max_vps_layer_dec_pic_buff_minus1 [ ][ ][ ] and for shared sub-DPB parameters max_vps_dec_pic_buffering_minus1 [ ][ ][ ] for SHVC scalable main and scalable main 10 and MV-HEVC stereo main profiles are desirable.

Per-layer and shared DPB capacity level limits for SHVC and MV-HEVC profiles are preferably included, such as follows:

(1) Maximum DPB size level limit constraints for per-layer sub-DPB parameters max_vps_layer_dec_pic_buff_minus1 [ ][ ][ ]

(2) Maximum DPB size level limit constraints for shared sub-DPB parameters max_vps_dec_pic_buffering_minus1 [ ][ ][ ] for SHVC scalable main and scalable main 10 and MV-HEVC stereo main profiles are proposed.

With respect to Per-Layer sub-DPB capacity limit, the maximum DPB size level limit constraints are included per-layer sub-DPB parameters max_vps_layer_dec_pic_buff_minus1 [ ][ ][ ]. Bitstreams containing output layer sets conforming to the Scalable Main or Scalable Main 10 profiles may obey the following constraints on a derived sub-bitstream for the output layer set, with layerSetIdx being the layer set for the output layer set conforming to Scalable Main or Scalable Main 10 profile, respectively, derived by invoking the sub-bitstream extraction process as specified in subclause F.10 with tIdTarget equal to 7 and with TargetDecLayerIdList containing the nuh_layer_id values of the layer set with the index layerSetIdx, and TargetOutputLayerSetIdx containing the index to the list of output layer sets specified by the VPS of the target output layer set. Selecting the upper bounds in the VPS provided a more global parameter than signaling the upper bounds in the SPS, which tends to vary more frequently and would otherwise tend to result in instantaneously changes in the video buffering which is problematic to implement.

Bitstreams containing output layer sets conforming to the Scalable Main or Scalable Main 10 profiles may also obey the following constraints on the base layer bitstream derived by invoking the sub-bitstream extraction process as specified in subclause F.10 with tIdTarget equal to 7 and with TargetDecLayerIdList containing only one nuh_layer_id value that is equal to 0 as inputs.

The base layer bitstream derived from bitstreams conforming to the Scalable Main profile may obey the following constraints:

The base layer bitstream may obey all constraints of the Main profile specified in subclause A.3.2.

SPSs of the base layer bitstream may have general_profile_idc equal to 1 or general_profile_compatibility_flag[1] equal to 1.

The base layer bitstream derived from bitstreams conforming to the Scalable Main 10 profile may obey the following constraints:

The base layer bitstream may obey all constraints of the Main 10 profile specified in subclause A.3.3.

SPSs of the base layer bitstream may have general_profile_idc equal to 1 or 2, or general_profile_compatibility_flag[1] or general_profile_compatibility_flag[2] equal to 1

The derived sub-bitstream for an output layer set conforming to the Scalable Main or Scalable Main 10 profiles may obey the following constraints:

All active SPSs for the sub-bitstream may have chroma_format_idc equal to 1 only.

CtbLog2SizeY derived from any active SPS for the sub-bitstream may be in the range of 4 to 6, inclusive.

The variables NumResampling, NumSampleResampling, and NumMotionResampling may be less than or equal to 1 for each decoded picture with nuh_layer_id included in the layer set with the index layerSetIdx.

ScalabilityId[j][smIdx] may be equal to 0 for any smIdx value not equal to 2 and for any value of j for which layer_id_included_flag[layerSetIdx][j] is equal to 1.

For a layer with layer id iNuhLId equal to any of nuh_layer_id included in the layer set with the index layerSetIdx, the value of NumRefLayers[iNuhLId], which specifies the total number of direct and indirect dependent layers and is derived as in F.7.4.3.1, may be less than or equal to 7.

All active SPSs may have sps_extension_type_flag[i] equal to 0 only for i equal to 0, and in the range of 2 to 6, inclusive.

All active PPSs may have pps_extension_type_flag[i] equal to 0 only for i in the range of 0 to 6, inclusive.

The derived sub-bitstream for an output layer set conforming to the Scalable Main profile may obey the following constraints:

All active SPSs for the sub-bitstream may have bit_depth_luma_minus8 equal to 0 only.

All active SPSs for the sub-bitstream may have bit_depth_chroma_minus8 equal to 0 only.

The derived sub-bitstream for an output layer set conforming to the Scalable Main 10 profile may obey the following constraints:

All active SPSs for the sub-bitstream may have bit_depth_luma_minus8 in the range of 0 to 2, inclusive.

All active SPSs for the sub-bitstream may have bit_depth_chroma_minus8 in the range of 0 to 2, inclusive.

Bitstreams containing output layer sets conforming to the Scalable Main or Scalable Main 10 profiles may obey the following constraints on a derived sub-bitstream for the output layer set, with layerSetIdx being the layer set for the output layer set conforming to the Scalable Main or Scalable Main 10 profile, respectively, derived by invoking the sub-bitstream extraction process as specified in subclause F.10 with tIdTarget equal to 7 and with TargetDecLayerIdList containing the nuh_layer_id values of the layer set with the index layerSetIdx, and TargetOutputLayerSetIdx containing the index to the list of output layer sets specified by the VPS of the target output layer set:

Each layer in the TargetDecLayerIdList may obey the General tier and level limits in A.4.1, and the Profile-specific level limits a), b), c), d), g), h), i), and j) for the Main and Main 10 profiles specified in A.4.2

For each k in the range of 0 to NumLayersInIdList[layerSetIdx] the value of max_vps_layer_dec_pic_buff_minus1 [TargetOutputLayerSetIdx][k][HighestTid]+1 may be less than or equal to MaxDpbSize[k], which is derived as follows:

---

PicSizeInSamplesY[ k ] is set equal to the value of
pic_width_vps_in_luma_
samples multiplied by the value of
pic_height_vps_in_luma_samples, of the
vps_rep_format_idx[ LayerIdxInVps[ LayerSetLayerIdList[ layerSetIdx ]
[ k ] ] ]-th rep_format( ) syntax structure in the VPS.
  If( PicSizeInSamplesY[ k ] <= ( MaxLumaPs >> 2 ) )
    MaxDpbSize[ k ] = Min( 4 * maxDpbPicBuf, 16 )
  else if( PicSizeInSamplesY[ k ] <= ( MaxLumaPs >> 1 ) )
    MaxDpbSize[ k ] = Min( 2 * maxDpbPicBuf, 16 )
  else if( PicSizeInSamplesY[ k ] <= ( ( 3 * MaxLumaPs ) >> 2 ) )
    MaxDpbSize[ k ] = Min( ( 4 * maxDpbPicBuf ) / 3, 16 )
  else
    MaxDpbSize[ k ] = maxDpbPicBuf

--- where MaxLumaPs is specified in Table A-1 and maxDpbPicBuf is equal to 6.

In another embodiment max_vps_layer_dec_pic_buff_minus1 [TargetOutputLayerSetIdx][k][HighestTid] above may be replaced by max_vps_layer_dec_pic_buff_minus1 [layerSetIdx][k][HighestTid] and the limit imposed on this new variable.

In another embodiment NumLayersInIdList[layerSetIdx] may be replaced by NumLayersInIdList[LayerSetIdxForOutputLayerSet[TargetOutputLayerSetIdx]].

With respect to the shared DPB capacity limit, the maximum DPB size level limit constraints for shared sub-DPB parameters max_vps_dec_pic_buffering_minus1 [ ][ ][ ] for SHVC scalable main and scalable main 10 and MV-HEVC stereo main profiles. To help define the constraints on shared sub-DPB a change in the "DPB size semantics" of SHVC and MV-HEVC specification to keep track of variables during derivation of the number of sub-DPBs and assignment of a sub-DPB to each layer included in the layer set is also described. This change allows to keep track of various representation format parameters for shared sub-DPBs on global basis instead of locally. This allows the global variables to be used when specifying shared sub-DPB capacity limits.

The variable MaxSubLayersInLayerSetMinus1 [i] is derived as follows:

```
for( i = 1; i < NumOutputLayerSets; i++) {
  maxSLMinus1 = 0
  optLsIdx = LayerSetIdxForOutputLayerSet[ i ]
  for( k = 0; k < NumLayersInIdList[ optLsIdx ]; k++) {
    lId = LayerSetLayerIdList[ optLsIdx ][ k ]
    maxSLMinus1 = Max( maxSLMinus1, sub_layers_vps_max_
    minus1[ LayerIdxInVps[ lId ] ] )
  }
  MaxSubLayersInLayerSetMinus1[ i ] = maxSLMinus1
}
```

For each layer set specified by the VPS, the following applies for derivation of the number of sub-DPBs and assigning a sub-DPB to each layer included in the layer set:

Let lsIdx be equal to the layer set index of the layer set.

For i from 0 to NumLayersInIdList[lsIdx]−1, inclusive, the arrays layerSpatRes, layerColourFormat, and layerBitDepthId are derived as follows:

The entries layerSpatRes[i][0] and layerSpatRes[i][1] are set equal to the values of pic_width_vps_in_luma_samples and pic_height_vps_in_luma_samples, respectively, of the vps_rep_format_idx[LayerIdxInVps[LayerSetLayerIdList[lsIdx][i]]]-th rep_format( ) syntax structure in the VPS.

The entry layerColourFormat[i] is set equal to the value of chroma_format_vps_idc of the vps_rep_format_idx [LayerIdxInVps[LayerSetLayerIdList[lsIdx][i]]]-th rep_format( ) syntax structure in the VPS.

The entries layerBitDepth[i][0] and layerBitDepth[i][1] are set equal to the values of bit_depth_vps_luma_minus8 and bit_depth_vps_chroma_minus8, respectively, of the vps_rep_format_idx[LayerIdxInVps[LayerSetLayerIdList[lsIdx][i]]]-th rep_format( ) syntax structure in the VPS.

The following applies:

```
subDpbCtr = 1
SubDpbAssigned[ lsIdx ][ 0 ] = 0
SubDpbSpatRes[ lsIdx ][ 0 ][ 0 ] = layerSpatRes[ 0 ][ 0 ]
SubDpbSpatRes[ lsIdx ][ 0 ][ 1 ] = layerSpatRes[ 0 ][ 1 ]
SubDpbColourFormat[ lsIdx ][ 0 ] = layerColourFormat[ 0 ]
SubDpbBitDepth[ lsIdx ][ 0 ][ 0 ] = layerBitDepth[ 0 ][ 0 ]
SubDpbBitDepth[ lsIdx ][ 0 ][ 1 ] = layerBitDepth[ 0 ][ 1 ]
NumLayersShareSubDpb[ lsIdx ][ 0 ] = 1;
for( i = 1; i < NumLayersInIdList[ lsIdx ]; i++) {
  newSubDpbFlag = 1
  for( j = 0; j < subDpbCtr && ( newSubDpbFlag>0 ); j++ )
    if( layerSpatRes[ i ][ 0 ] == SubDpbSpatRes[ lsIdx ][ j ][ 0 ] &&
        layerSpatRes[ i ][ 1 ] == SubDpbSpatRes[ lsIdx ][ j ][ 1 ] &&
        layerColourFormat[ i ] == SubDpbColourFormat[ lsIdx ][ j ] &&
        layerBitDepth[ i ][ 0 ] == SubDpbBitDepth[ lsIdx ][ j ][ 0 ] &&
        layerBitDepth[ i ][ 1 ] == SubDpbBitDepth[ lsIdx ][ j ][ 1 ] ) {
      SubDpbAssigned[ lsIdx ] [ i ] = j
      newSubDpbFlag = 0
      NumLayersShareSubDpb[ lsIdx ][ j ] ++
      j = subDpbCtr
    }
  if( newSubDpbFlag ) {
    SubDpbSpatRes[ lsIdx ][ subDpbCtr ][ 0 ] = layerSpatRes[ i ][ 0 ]
    SubDpbSpatRes[ lsIdx ][ subDpbCtr ][ 1 ] = layerSpatRes[ i ][ 1 ]
    SubDpbColourFormat[ lsIdx ][ subDpbCtr ] = layerColourFormat[ i ]
    SubDpbBitDepth[ lsIdx ][ subDpbCtr ][ 0 ] = layerBitDepth[ i ][ 0 ]
    SubDpbBitDepth[ lsIdx ][ subDpbCtr ][ 1 ] = layerBitDepth[ i ][ 1 ]
    SubDpbAssigned[ lsIdx ][ i ] = subDpbCtr++
```

```
  }
}
NumSubDpbs[ lsIdx ] = subDpbCtr
```

For the lsIdx-th layer set, the number of sub-DPBs is NumSubDpbs[lsIdx], and for each layer with a particular value of nuh_layer_id in the layer set, the sub-DPB with index SubDpbAssigned[lsIdx][layerIdx] is assigned, where LayerSetLayerIdList[lsIdx][layerIdx] is equal to nuh_layer_id.

Bitstreams containing output layer sets conforming to the Scalable Main or Scalable Main 10 profiles may obey the following constraints on a derived sub-bitstream for the output layer set, with layerSetIdx being the layer set for the output layer set conforming to the Scalable Main or Scalable Main 10 profile, respectively, derived by invoking the sub-bitstream extraction process as specified in subclause F.10 with tIdTarget equal to 7 and with TargetDecLayerIdList containing the nuh_layer_id values of the layer set with the index layerSetIdx, and TargetOutputLayerSetIdx containing the index to the list of output layer sets specified by the VPS of the target output layer set:

Each layer in the TargetDecLayerIdList may obey the General tier and level limits in A.4.1, and the Profile-specific level limits a), b), c), d), g), h), i), and j) for the Main and Main 10 profiles specified in A.4.2

In one embodiment the MaxSharedDpbSize for each layer sharing a sub-DPB is calculated similarly as the calculation for non-shared DPB but a scaled value of PicSizeInSamplesY which is scaled by number of layers sharing the sub-DPB is used for the calculations without scaling the MaxLumaPs value. This calculation results in maintaining the MaxDpbSize value per layer at the highest resolution when level is less than 6.

For each k in the range of 0 to NumSubDpbs[layerSetIdx] following applies: NPicSizeInSamplesY[k]=SubDpbSpatRes[layerSetIdx][k][0]*SubDpbSpatRes[layerSetIdx][k][1]*NumLayersShareSubDpb[layerSetIdx][k]

NPicSizeInSamplesY[k] may be less than or equal to NumLayersShareSubDpb[layerSetIdx][k] *MaxLumaPs, where MaxLumaPs is specified in Table A-1.

For each k in the range of 0 to NumSubDpbs[layerSetIdx] the value of max_vps_dec_pic_buffering_minus1 [TargetOutputLayerSetIdx][k][HighestTid]+1 may be less than or equal to MaxSharedDpbSize[k], which is derived as follows:

```
if( NPicSizeInSamplesY[ k ] <= ( MaxLumaPs >> 2 ) )
  MaxSharedDpbSize[ k ] = Min( 4 * maxDpbPicBuf, 16 )
else if( NPicSizeInSamplesY[ k ] <= ( MaxLumaPs >> 1 ) )
  MaxSharedDpbSize[ k ] = Min( 2 * maxDpbPicBuf, 16 )
else if( NPicSizeInSamplesY[ k ] <= ( ( 3 * MaxLumaPs ) >> 2 ) )
  MaxSharedDpbSize[ k ] = Min( ( 4 * maxDpbPicBuf ) / 3, 16 )
else
  MaxSharedDpbSize[ k] = maxDpbPicBuf
MaxSharedDpbSize[ k ] = MaxSharedDpbSize[ k ] *
NumLayersShareSubDpb[ layerSetIdx ][ k ]
``` where MaxLumaPs is specified in Table A-1 and maxDpbPicBuf is equal to 6.

In another embodiment max_vps_dec_pic_buffering_minus1 [TargetOutputLayerSetIdx][k][HighestTid] above may be replaced by max_vps_dec_pic_buffering_minus1 [layerSetIdx][k][HighestTid] and the limit imposed on this new variable.

In another embodiment NumSubDpbs[layerSetIdx] may be replaced by NumSubDpbs[LayerSetIdxForOutputLayerSet[TargetOutputLayerSetIdx]].

In another embodiment the MaxSharedDpbSize for each layer sharing a sub-DPB is calculated similarly as the calculation for non-shared DPB. When more than one layer shares a sub-DPB, for each layer after the first layer only a percentage of the MaxSharedDpbSize capacity is added.

For each k in the range of 0 to NumSubDpbs[layerSetIdx] following applies: NPicSizeInSamplesY[k]=SubDpbSpatRes[layerSetIdx][k][0]*SubDpbSpatRes[layerSetIdx][k][1]

NPicSizeInSamplesY[k] may be less than or equal to MaxLumaPs, where MaxLumaPs is specified in Table A-1.

For each k in the range of 0 to NumSubDpbs[layerSetIdx] the value of max_vps_dec_pic_buffering_minus1 [TargetOutputLayerSetIdx][k][HighestTid]+1 may be less than or equal to MaxSharedDpbSize[k], which is derived as follows:

```
if( NPicSizeInSamplesY[ k ] <= ( MaxLumaPs >> 2 ) )
    MaxSharedDpbSize[ k ] = Min( 4 * maxDpbPicBuf, 16 )
else if( NPicSizeInSamplesY[ k ] <= ( MaxLumaPs >> 1 ) )
    MaxSharedDpbSize[ k ] = Min( 2 * maxDpbPicBuf, 16 )
else if( NPicSizeInSamplesY[ k ] <= ( ( 3 * MaxLumaPs ) >> 2 ) )
    MaxSharedDpbSize[ k ] = Min( ( 4 * maxDpbPicBuf ) / 3, 16 )
else
    MaxSharedDpbSize[ k ] = maxDpbPicBuf
MaxSharedDpbSize[ k ] = Ceil ( MaxSharedDpbSize[ k ] * ( 1 + ( x *
    □( NumLayersShareSubPpb[ layerSetIdx ][ k ]–1 ) ) ) )
``` where MaxLumaPs is specified in Table A-1 and maxDpbPicBuf is equal to 6 and $0 \leq x \leq 1$.

In another embodiment max_vps_dec_pic_buffering_minus1 [TargetOutputLayerSetIdx][k][HighestTid] above may be replaced by max_vps_dec_pic_buffering_minus1 [layerSetIdx][k][HighestTid] and the limit imposed on this new variable.

In another embodiment NumSubDpbs[layerSetIdx] may be replaced by NumSubDpbs[LayerSetIdxForOutputLayerSet[TargetOutputLayerSetIdx]].

In another embodiment the MaxSharedDpbSize for each layer sharing a sub-DPB is calculated similarly as the calculation for non-shared DPB. For each layer that shares a sub-DPB more tapering is applied.

For each k in the range of 0 to NumSubDpbs[layerSetIdx] following applies:
NPicSizeInSamplesY[k]=SubDpbSpatRes[layerSetIdx][k][0]*SubDpbSpatRes[layerSetIdx][k][1]

NPicSizeInSamplesY[k] may be less than or equal to MaxLumaPs, where MaxLumaPs is specified in Table A-1.

For each k in the range of 0 to NumSubDpbs[layerSetIdx] the value of max_vps_dec_pic_buffering_minus1 [TargetOutputLayerSetIdx][k][HighestTid]+1 may be less than or equal to MaxSharedDpbSize[k], which is derived as follows:

```
if( NPicSizeInSamplesY[ k ] <= ( MaxLunnaPs >> 2 ) )
    MaxSharedDpbSize[ k ] = Min( 4 * maxDpbPicBuf, 16 )
else if( NPicSizeInSamplesY[ k ] <= ( MaxLumaPs >> 1 ) )
    MaxSharedDpbSize[ k ] = Min( 2 * maxDpbPicBuf, 16 )
else if( NPicSizeInSamplesY[ k ] <= ( ( 3 * MaxLumaPs ) >> 2 ) )
    MaxSharedDpbSize[ k ] = Min( ( 4 * maxDpbPicBuf ) / 3, 16 )
else
    MaxSharedDpbSize[ k ] = maxDpbPicBuf
if(NumLayersShareSubDpb[ layerSetIdx ][ k ]>1)
MaxSharedDpbSize[ k ] = Ceil ( MaxSharedDpbSize[ k ] * (1 + (1
    □□NumLayersShareSubDpb[ layerSetIdx ][ k ]) ) )
``` where MaxLumaPs is specified in Table A-1 and maxDpbPicBuf is equal to 6.

In another embodiment max_vps_dec_pic_buffering_minus1 [TargetOutputLayerSetIdx][k][HighestTid] above may be replaced by max_vps_dec_pic_buffering_minus1 [layerSetIdx][k][HighestTid] and the limit imposed on this new variable.

In another embodiment NumSubDpbs[layerSetIdx] may be replaced by NumSubDpbs[LayerSetIdxForOutputLayerSet[TargetOutputLayerSetIdx]].

In another embodiment the equation above could be modified to MaxSharedDpbSize[k]=Ceil(MaxSharedDpbSize[k]*(1+(1   □□□NumLayersShareSubDpb[layerSetIdx][k]−1)))).

In another embodiment the MaxSharedDpbSize for each layer sharing a sub-DPB is calculated similarly as the calculation for non-shared DPB.

For each k in the range of 0 to NumSubDpbs[layerSetIdx] following applies:

NPicSizeInSamplesY[k]=SubDpbSpatRes[layerSetIdx][k][0]*SubDpbSpatRes[layerSetIdx][k][1]

NPicSizeInSamplesY[k] may be less than or equal to MaxLumaPs, where MaxLumaPs is specified in Table A-1.

This option is a special case with x=1.

For each k in the range of 0 to NumSubDpbs[layerSetIdx] the value of max_vps_dec_pic_buffering_minus1 [TargetOutputLayerSetIdx][k][HighestTid]+1 may be less than or equal to MaxSharedDpbSize[k], which is derived as follows:

```
if( NPicSizeInSamplesY[ k ] <= ( MaxLumaPs >> 2) )
    MaxSharedDpbSize[ k ] = Min( 4 * maxDpbPicBuf, 16 )
else if( NPicSizeInSamplesY[ k ] <= ( MaxLumaPs >> 1 ) )
    MaxSharedDpbSize[ k ] = Min( 2 * maxDpbPicBuf, 16 )
else if( NPicSizeInSamplesY[ k ] <= ( ( 3 * MaxLumaPs ) >> 2 ) )
    MaxSharedDpbSize[ k ] = Min( ( 4 * maxDpbPicBuf ) / 3, 16 )
else
    MaxSharedDpbSize[ k ] = maxDpbPicBuf
MaxSharedDpbSize[ k ] = MaxSharedDpbSize[ k ] *
NumLayersShareSubDpb[ layerSetIdx ][ k ]
``` where MaxLumaPs is specified in Table A-1 and maxDpbPicBuf is equal to 6.

In another embodiment max_vps_dec_pic_buffering_minus1 [TargetOutputLayerSetIdx][k][HighestTid] above may be replaced by max_vps_dec_pic_buffering_minus1 [layerSetIdx][k][HighestTid] and the limit imposed on this new variable.

In another embodiment NumSubDpbs[layerSetIdx] may be replaced by NumSubDpbs[LayerSetIdxForOutputLayerSet[TargetOutputLayerSetIdx]].

This embodiment can also be specified as follows:

For each k in the range of 0 to NumSubDpbs[layerSetIdx] the value of max_vps_dec_pic_buffering_minus1 [TargetOutputLayerSetIdx][k][HighestTid]+1 may be less than or equal to MaxSharedDpbSize[k], which is derived as follows:

$$MaxSharedDpbSize[k]=MaxDpbSize[j]*NumLayersShareSubDpb[layerSetIdx][k]$$

where for a layer with nuh_layer_id equal to IIdx in the layerset layerSetIdx, if k is equal to SubDpbAssigned [layerSetIdx][IIdx] then j is set equal to LayerSetLayerIdList[layerSetIdx][IIdx].

In another embodiment max_vps_dec_pic_buffering_minus1[TargetOutputLayerSetIdx][k][HighestTid] above may be replaced by max_vps_dec_pic_buffering_minus1 [layerSetIdx][k][HighestTid] and the limit imposed on this new variable.

In another embodiment NumSubDpbs[layerSetIdx] may be replaced by NumSubDpbs[LayerSetIdxForOutputLayerSet[TargetOutputLayerSetIdx]].

In another embodiment the MaxSharedDpbSize for each layer sharing a sub-DPB is calculated similarly as the calculation for non-shared DPB. When more than one layer shares a sub-DPB for each layer after the first layer only half the MaxDpbSize capacity is added.

This option is a special case with x=0.5.

For each k in the range of 0 to NumSubDpbs[layerSetIdx] following applies:

NPicSizeInSamplesY[k]=SubDpbSpatRes[layerSetIdx][k][0]*SubDpbSpatRes[layerSetIdx][k][1]

NPicSizeInSamplesY[k] may be less than or equal to MaxLumaPs, where MaxLumaPs is specified in Table A-1.

For each k in the range of 0 to NumSubDpbs[layerSetIdx] the value of max_vps_dec_pic_buffering_minus1 [TargetOutputLayerSetIdx][k][HighestTid]+1 may be less than or equal to MaxSharedDpbSize[k], which is derived as follows:

```
if( NPicSizeInSamplesY[ k ] <= ( MaxLumaPs >> 2 ) )
    MaxSharedDpbSize[ k ] = Min( 4 * maxDpbPicBuf, 16 )
else if( NPicSizeInSamplesY[ k ] <= ( MaxLumaPs >> 1 ) )
    MaxSharedDpbSize[ k ] = Min( 2 * maxDpbPicBuf, 16 )    (A-2)
else if( NPicSizeInSamplesY[ k ] <= ( ( 3 * MaxLumaPs ) >> 2 ) )
    MaxSharedDpbSize[ k ] = Min( ( 4 * maxDpbPicBuf ) / 3, 16 )
else
    MaxSharedDpbSize[ k ] = maxDpbPicBuf
MaxSharedDpbSize[ k ] = Ceil ( MaxSharedDpbSize[ k ] * (1 + (0.5 * □( NumLayersShareSubDpb[ layerSetIdx ][ k ]-1 ) ) ) )
``` where MaxLumaPs is specified in Table A-1 and maxDpbPicBuf is equal to 6.

In another embodiment max_vps_dec_pic_buffering_minus1 [TargetOutputLayerSetIdx][k][HighestTid] above may be replaced by max_vps_dec_pic_buffering_minus1 [layerSetIdx][k][HighestTid] and the limit imposed on this new variable.

In another embodiment NumSubDpbs[layerSetIdx] may be replaced by NumSubDpbs[LayerSetIdxForOutputLayerSet[TargetOutputLayerSetIdx]].

In another embodiment, for each k in the range of 0 to NumSubDpbs[layerSetIdx] following applies:

NPicSizeInSamplesY[k]=SubDpbSpatRes[layerSetIdx][k][0]*SubDpbSpatRes[layerSetIdx][k][1]

NPicSizeInSamplesY[k] may be less than or equal to MaxLumaPs, where MaxLumaPs is specified in Table A-1.

For each k in the range of 0 to NumSubDpbs[layerSetIdx] the value of max_vps_dec_pic_buffering_minus1 [TargetOutputLayerSetIdx][k][HighestTid]+1 may be less than or equal to MaxSharedDpbSize[k], which is derived as follows:

```
if( NPicSizeInSamplesY[ k ] <= ( MaxLumaPs >> 2 ) )
    MaxSharedDpbSize[ k ] = Min( 4 * maxDpbPicBuf, 16 )
else if( NPicSizeInSamplesY[ k ] <= ( MaxLumaPs >> 1 ) )
    MaxSharedDpbSize[ k ] = Min( 2 * maxDpbPicBuf, 16 )
else if( NPicSizeInSamplesY[ k ] <= ( ( 3 * MaxLunnaPs ) >> 2 ) )
    MaxSharedDpbSize[ k ] = Min( ( 4 * maxDpbPicBuf ) / 3, 16 )
else
    MaxSharedDpbSize[ k ] = maxDpbPicBuf
MaxSharedDpbSize[ k ] = MaxSharedDpbSize[ k ] * x
``` where MaxLumaPs is specified in Table A-1 and maxDpbPicBuf is equal to 6 and x is a real number or integer.

In another embodiment x above may be replaced with NumLayersShareSubDpb[layerSetIdx][k] *y where y is a real number or integer. Typically y will be less than or equal to 1.

In yet another embodiment MaxSharedDpbSize[k]=/(MaxSharedDpbSize[k], NumLayersShareSubDpb[layerSetIdx][k], z), where f( ) is a mathematical function of MaxSharedDpbSize[k], NumLayersShareSubDpb[layerSetIdx][k], and z and where z is a real number or integer.

In another embodiment max_vps_dec_pic_buffering_minus1 [TargetOutputLayerSetIdx][k][HighestTid] above may be replaced by max_vps_dec_pic_buffering_minus1 [layerSetIdx][k][HighestTid] and the limit imposed on this new variable.

In another embodiment NumSubDpbs[layerSetIdx] may be replaced by NumSubDpbs[LayerSetIdxForOutputLayerSet[TargetOutputLayerSetIdx]].

In one embodiment all the above limits on per-layer DPB capacity and limits on shared DPB capacity will apply when vps_base_layer_external_flag is equal to 0 in the active VPS.

The value of TotalPicSizeInSamplesY may be less than or equal to 2*MaxLumaPs, where MaxLumaPs is specified in Table A-1, and where TotalPicSizeInSamplesY is derived as follows:

```
TotalPicSizeInSamplesY = 0
for (i = 0; i <= 62; i++)
    if layer i in TargetDecLayerIdList
        TotalPicSizeInSamplesY += PicSizeInSamplesY of the layer with nuh_layer_id equal to i
```

The nominal removal time of access unit n (with n greater than 0) from the CPB, as specified in subclause C.2.3, may satisfy the constraint that AuNominalRemovalTime[n]−AuCpbRemovalTime[n−1] is greater than or equal to Max (TotalPicSizeInSamplesY÷(2*MaxLumaSr), fR) for the value of TotalPicSizeInSamplesY of access unit n−1, where MaxLumaSr is the value specified in Table A-2 that applies to access unit n−1.

For the VCL HRD parameters, BitRate[i] may be less than or equal to 2*CpbBrVclFactor*MaxBR for at least one value of i in the range of 0 to cpb_cnt_minus1 [HighestTid], inclusive, where BitRate[i] is specified in subclause E.2.3 based on parameters selected as specified in subclause C.1 and MaxBR is specified in Table A-2 in units of CpbBrVclFactor bits/s.

For the NAL HRD parameters, BitRate[i] may be less than or equal to 2*CpbBrNalFactor*MaxBR for at least one value of i in the range of 0 to cpb_cnt_minus1 [HighestTid], inclusive, where BitRate[i] is specified in subclause E.2.3 based on parameters selected as specified in subclause C.1 and MaxBR is specified in Table A-2 in units of CpbBrNalFactor bits/s.

G. Tech, K. Wegner, Y. Chen, M. Hannuksela, J. Boyce, "MV-HEVC Draft Text 8," JCT3V-H1004, Valencia, May 2014; and J. Chen, J. Boyce, Y. Ye, M. M. Hannuksela, Y.-K. Wang, "High Efficiency Video Coding (HEVC) Scalable Extension Draft 6," JCTVC-Q1008, Valencia, May 2014, are hereby incorporated by reference herein in their entirety.

In JCTVC-Q1008 and JCT3V-H1004, the representation formats signaled in VPS provide an upper bound on the representation format values used by layers with nuh_layer_id>0. This is because when update_rep_format_flag is equal to 1, it is a requirement of bitstream conformance that the value of chroma_format_idc, separate_colour_plane_flag, pic_width_in_luma_samples, pic_height_in_luma_samples, bit_depth_luma_minus8, or bit_depth_chroma_minus8 may be less than or equal to chroma_format_vps_idc, separate_colour_plane_vps_flag, pic_width_vps_in_luma_samples, pic_height_vps_in_luma_samples, bit_depth_vps_luma_minus8, or bit_depth_vps_chroma_minus8, respectively, of the vps_rep_format_idx[j]-th rep_format( ) syntax structure in the active VPS, where j is equal to LayerIdxInVps[layerIdCurr].

Because of this the maximum DPB size level limit constraint should use the appropriate representation format parameters signalled in VPS.

For a bitstream containing OLSs with bitstream partitions conforming to the Stereo Main profile, let olsIdx be the OLS index of an OLS, layerSetIdx be the layer set index for the OLS, the sub-bitstream of the OLS be derived by invoking the sub-bitstream extraction process as specified in subclause F.10 with the following inputs: the bitstream, tIdTarget equal to 6, and layerIdListTarget containing the nuh_layer_id values of the layers that are included in the layer set with the index layerSetIdx and are primary picture layers, and the base layer bitstream be derived by invoking the sub-bitstream extraction process as specified in subclause F.10 with the bitstream, tIdTarget equal to 6, and layerIdListTarget containing only one nuh_layer_id value that is equal to 0 as inputs.

A bitstream containing OLSs with bitstream partitions conforming to the Stereo Main profile may obey the following constraints:

All active VPSs may have vps_base_layer_internal_flag equal to 1 only

All active VPSs may have vps_num_rep_formats_minus1 in the range of 0 to 15, inclusive.

All output layers may be primary picture layers.

The base layer bitstream may obey the following constraints:

The base layer bitstream may obey all constraints of the Main profile specified in subclause A.3.2.

All active SPSs for the base layer may have general_profile_idc equal to 1 or general_profile_compatibility_flag[1] equal to 1.

The sub-bitstream of each OLS may obey one or more of the following constraints:

All active SPSs for the sub-bitstream may have chroma_format_idc equal to 1 only.

CtbLog2SizeY derived from any active SPS of the sub-bitstream may be in the range of 4 to 6, inclusive.

ScalabilityId[j][smIdx] may be equal to 0 for any smIdx value not equal to 1 and for any value of j for the sub-bitstream.

The number of the layers in the sub-bitstream may be equal to 2.

output_layer_flag[olsIdx][j] may be equal to 1 for all values of j in the range of 0 to 1. This restriction implies that alt_output_layer_flag[olsIdx] is equal to 0.

When ViewScalExtLayerFlag[i] is equal to 1 for the layer with nuh_layer_id equal to i in the sub-bitstream, inter_view_mv_vert_constraint_flag may be equal to 1 in the sps_multilayer_extension( ) syntax structure in each active SPS RBSP for that layer.

When ViewScalExtLayerFlag[i] is equal to 1 for the layer with nuh_layer_id equal to i in the sub-bitstream, num_scaled_ref_layer_offsets may be equal to 0 in each active SPS for that layer.

When ViewScalExtLayerFlag[i] is equal to 1 for the layer with nuh_layer_id equal to i in the sub-bitstream, the values of pic_width_in_luma_samples and pic_height_in_luma_samples in each active SPS for that layer may be equal to the values of pic_width_in_luma_samples and pic_height_in_luma_samples, respectively, in each active SPS for all direct reference layers of that layer.

In an alternative embodiment the sub-bitstream of each OLS may obey one or more of the following constraints:

When ViewScalExtLayerFlag[i] is equal to 1 for the layer with nuh_layer_id equal to i in the sub-bitstream, the values of pic_width_vps_in_luma_samples and pic_height_vps_in_luma_samples of the vps_rep_format_idx[LayerIdxInVps[i]]-th rep_format( ) syntax structure in the active VPS in each active SPS for that layer may be equal to the values of pic_width_vps_in_luma_samples and pic_height_vps_in_luma_samples, respectively, rep_format( ) syntax structure in the active VPS for all direct reference layers of that layer.

All active SPSs for the sub-bitstream may have sps_range_extensions_flag equal to 0 only and sps_extension_6bits equal to 0 only.

All active PPSs for the sub-bitstream may have pps_range_extensions_flag equal to 0 only and pps_extension_6bits equal to 0 only.

All active SPSs for the sub-bitstream may have bit_depth_luma_in_minus8 equal to 0 only.

All active SPSs for the sub-bitstream may have bit_depth_chroma_in_minus8 equal to 0 only.

When AuxId[i] and AuxId[j] are both equal to 0 and i is not equal to j, ViewOrderIndex[i] may not be equal to ViewOrderIndex[j].

In the remainder of this subclause and subclause G.11.3, for a sub-bitstream of an OLS, general_profile_idc, general_profile_compatibility_flag[i], general_tier_flag, and general_level_idc refer to the general_profile_idc, general_profile_compatibility_flag[i], general_tier_flag, and general_level_idc, respectively, in the profile_tier_level( ) syntax structure for the bitstream partition.

Conformance of a bitstream partition to the Stereo Main profile is indicated by general_profile_idc being equal to 6 or general_profile_compatibility_flag[6] being equal to 1. When general_profile_compatibility_flag[6] is equal to 1, general_profile_compatibility_flag[1] should also be equal to 1.

For purposes of comparison of tier capabilities, the tier with general_tier_flag equal to 0 is considered to be a lower tier than the tier with general_tier_flag equal to 1.

For purposes of comparison of level capabilities, a particular level of a specific tier is considered to be a lower level than some other level of the same tier when the value of the general_level_idc of the particular level is less than that of the other level.

The following is specified for expressing the constraints in this subclause, subclause G.11.2.2, and subclause G.11.3:

Let access unit n be the n-th access unit in decoding order, with the first access unit being access unit 0 (i.e. the 0-th access unit).

Let the variable fR be set equal to 1÷300.

Let the variable optLsIdx be the index of the OLS.

Let picture n be the coded picture or the corresponding decoded picture of access unit n.

For each bitstream partition, let the variable numLayersInPartition be the number of layers in the bitstream partition, and the variable partitionSizeInSamplesY be derived as follows:

```
partitionSizeInSamplesY = 0
for( i = 0; i < numLayersInPartition; i++ )
    partitionSizeInSamplesY += PicSizeInSamplesY of the i-th layer in the
      bitstream partition
```

In one embodiment a bitstream partition may be a sequence of bits, in the form of a NAL unit stream or a byte stream, that is a subset of a bitstream according to a partitioning scheme.

In a variant embodiment.

For each bitstream partition, let the variable numLayersInPartition be the number of layers in the bitstream partition, and the variable partitionSizeInSamplesY be derived as follows:

```
partitionSizeInSamplesY = 0
for( i = 0; i < numLayersInPartition; i++ )
    partitionSizeInSamplesY += pic_width_vps_in_luma_samples multiplied
      by the value of pic_height_vps_in_luma_samples, of the
      vps_rep_format_idx[ LayerIdxInVps[ LayerSetLayerIdList[ layerSetIdx ]
      [ i ] ] ]-th rep_format( )
    syntax structure in the VPS of the i-th layer in the bitstream partition
```

For each layer with nuh_layer_id equal to currLayerId in the bitstream partition, MaxPicSizeInSamplesY[currLayerId] is set equal to the value of pic_width_vps_in_luma_samples multiplied by the value of pic_height_vps_in_luma_samples, of the vps_rep_format_idx[LayerIdxInVps[currLayerId]]-th rep_format( ) syntax structure in the VPS.

Each bitstream partition conforming to a profile at a specified tier and level may obey the following constraints for each bitstream conformance test as specified in Annex C:

a) The value of partitionSizeInSamplesY may be less than or equal to MaxLumaPs, where MaxLumaPs is specified in Table A-1 for the tier and level of the bitstream partition.

b) For each layer with nuh_layer_id equal to currLayerId in the bitstream partition, the value of pic_width_vps_in_luma_samples of the vps_rep_format_idx[LayerIdxInVps[currLayerId]]-th rep_format( ) syntax structure in the VPS may be less than or equal to Sqrt(MaxLumaPs*8).

c) For each layer with nuh_layer_id equal to currLayerId in the bitstream partition, the value of pic_height_vps_in_luma_samples of the vps_rep_format_dx[LayerIdxInVps[currLayerId]]-th rep_format( ) syntax structure in the VPS may be less than or equal to Sqrt(MaxLumaPs*8).

d) For each layer with nuh_layer_id equal to currLayerId in the bitstream partition, the value of max_vps_dec_pic_buffering_minus1 [optLsIdx][LayerIdxInVps[currLayerId]][HighestTid] may be less than or equal to MaxDpbSize as derived by Equation A-2, with PicSizeInSamplesY being replaced with MaxPicSizeInSamplesY[currLayerId].

e) For level 5 and higher levels, the value of CtbSizeY for each layer in the bitstream partition may be equal to 32 or 64.

f) The value of NumPicTotalCurr for each picture in the bitstream partition may be less than or equal to 8.

g) When decoding each coded picture in the bitstream partition, the value of num_tile_columns_minus1 may be less than MaxTileCols and num_tile_rows_minus1 may be less than MaxTileRows, where MaxTileCols and MaxTileRows are specified in Table A-1 for the tier and level of the bitstream partition.

h) For the VCL HRD parameters of the bitstream partition, CpbSize[i] may be less than or equal to 1000*MaxCPB for at least one value of i in the range of 0 to cpb_cnt_minus1 [HighestTid], inclusive, where CpbSize[i] is specified in subclause E.3.3 based on parameters selected as specified in subclause C.1 and MaxCPB is specified in Table A-1 for the tier and level of the bitstream partition in units of 1000 bits.

i) For the NAL HRD parameters of the bitstream partition, CpbSize[i] may be less than or equal to 1100*MaxCPB for at least one value of i in the range of 0 to cpb_cnt_minus1 [HighestTid], inclusive, where CpbSize[i] is specified in subclause E.3.3 based on parameters selected as specified in subclause C.1 and MaxCPB is specified in Table A-1 for the tier and level of the bitstream partition in units of 1100 bits.

Table A-1 specifies the limits for each level of each tier.

A tier and level to which a bitstream partition conforms are indicated by the syntax elements general_tier_flag and general_level_idc as follows:

general_tier_flag equal to 0 indicates conformance to the Main tier, and general_tier_flag equal to 1 indicates conformance to the High tier, according to the tier constraints specified in Table A-1. general_tier_flag may be equal to 0 for levels below level 4 (corresponding to the entries in Table A-1 marked with"–").

general_level_idc may be set equal to a value of 30 times the level number specified in Table A-1.

Each bitstream partition conforming to the Stereo Main profile at a specified tier and level may obey the following constraints for each conformance test as specified in Annex C, where "access unit" is used to denote the set of pictures contained in the bitstream partition, along with their associated non-VCL NAL units, of layers contained in the bitstream partition and that have the same output time and the CPB is understood to be the BPB:

a) The nominal removal time of access unit n (with n greater than 0) from the CPB, as specified in subclause C.2.3, may satisfy the constraint that AuNominalRemovalTime[n]−AuCpbRemovalTime[n−1] is greater than or equal to Max (partitionSizeInSamplesY÷MaxLumaSr, fR), where partitionSizeInSamplesY is the value of partitionSizeInSamplesY for access unit n−1 and MaxLumaSr is the value specified in Table A-2 that applies to access unit n−1 for the tier and level of the bitstream partition.

b) The difference between consecutive output times of pictures from the DPB, as specified in subclause C.3.3, may satisfy the constraint that DpbOutputInterval[n] is greater than or equal to Max (partitionSizeInSamplesY÷MaxLumaSr, fR), where partitionSizeInSamplesY is the value of partitionSizeInSamplesY of access unit n and MaxLumaSr is the value specified in Table A-2 for access unit n for the tier and level of the bitstream partition, provided that access unit n is an access unit that has a picture that is output and is not the last of such access units.

c) The removal time of access unit 0 may satisfy the constraint that the number of coded slice segments in access unit 0 is less than or equal to Min(Max(numLayersInPartition, MaxSliceSegmentsPerPicture*MaxLumaSr/MaxLumaPs*(AuCpbRemovalTime[0]−AuNominalRemovalTime[0])+MaxSliceSegmentsPerPicture*partitionSizeInSamplesY/MaxLumaPs), MaxSliceSegmentsPerPicture), where MaxSliceSegmentsPerPicture, MaxLumaPs and MaxLumaSr are the values specified in Table A-1 and Table A-2, respectively, for the tier and level of the bitstream partition.

d) The difference between consecutive CPB removal times of access units n and n−1 (with n greater than 0) may satisfy the constraint that the number of slice segments in picture n is less than or equal to Min((Max(numLayersInPartition, MaxSliceSegmentsPerPicture*MaxLumaSr/MaxLumaPs*(AuCpbRemovalTime[n]−AuCpbRemovalTime[n−1])), MaxSliceSegmentsPerPicture), where numLayersInPartition is the value of access unit n, and MaxSliceSegmentsPerPicture, MaxLumaPs and MaxLumaSr are the values specified in Table A-1 and Table A-2, respectively, that apply to access unit n for the tier and level of the bitstream partition.

e) For the VCL HRD parameters for the bitstream partition, BitRate[i] may be less than or equal to CpbBrVclFactor*MaxBR for at least one value of i in the range of 0 to cpb_cnt_minus1[HighestTid], inclusive, where BitRate[i] is specified in subclause E.3.3 based on parameters selected as specified in subclause C.1 and MaxBR is specified in Table A-2 in units of CpbBrVclFactor bits/s, where CpbBrVclFactor is specified in Table A-3 for the tier and level of the bitstream partition.

f) For the NAL HRD parameters for the bitstream partition, BitRate[i] may be less than or equal to CpbBrNalFactor*MaxBR for at least one value of i in the range of 0 to cpb_cnt_minus1[HighestTid], inclusive, where BitRate[i] is specified in subclause E.3.3 based on parameters selected as specified in subclause C.1 and MaxBR is specified in Table A-2 in units of CpbBrNalFactor bits/s, where CpbBrNalFactor is specified in Table A-3 for the tier and level of the bitstream partition.

g) The sum of the NumBytesInNalUnit variables for access unit 0 may be less than or equal to FormatCapabilityFactor*(Max(partitionSizeInSamplesY, fR*MaxLumaSr)+MaxLumaSr*(AuCpbRemovalTime[0]−AuNominalRemovalTime[0]))÷MinCr, where MaxLumaSr and MinCr are the values specified in Table A-2 and FormatCapabilityFactor is the value specified in Table A-3 that apply to picture 0 for the tier and level of the bitstream partition.

h) The sum of the NumBytesInNalUnit variables for access unit n (with n greater than 0) may be less than or equal to FormatCapabilityFactor*MaxLumaSr*(AuCpbRemovalTime[n]−AuCpbRemovalTime[n−1])÷MinCr, where MaxLumaSr and MinCr are the values specified in Table A-2 and FormatCapabilityFactor is the value specified in Table A-3 that apply to picture n for the tier and level of the bitstream partition.

i) The removal time of access unit 0 may satisfy the constraint that the number of tiles in coded pictures in access unit 0 is less than or equal to Min(Max(numLayersInPartition, MaxTileCols*MaxTileRows*120*(AuCpbRemovalTime[0]−AuNominalRemovalTime[0])+MaxTileCols*MaxTileRows*MaxPicSizeInSamplesY[currLayerId]/MaxLumaPs), MaxTileCols*MaxTileRows), for the value of MaxPicSizeInSamplesY[currLayerId] of picture 0 of the layer with nuh_layer_id equal to currLayerId, where MaxTileCols and MaxTileRows are the values specified in Table A-1 that apply to picture 0 for the tier and level of the bitstream partition.

j) The difference between consecutive CPB removal times of access units n and n−1 (with n greater than 0) may satisfy the constraint that the number of tiles in coded pictures in access unit n is less than or equal to Min(Max(numLayersInPartition, MaxTileCols*MaxTileRows*120*(AuCpbRemovalTime[n]−AuCpbRemovalTime[n−1])), MaxTileCols*MaxTileRows), where numLayersInPartition is the value for access unit n, and MaxTileCols and MaxTileRows are the values specified in Table A-1 that apply to access unit n for the tier and level of the bitstream partition.

Similar constraints may be included for SHV scalable main profile, scalable main 10 profile and other profiles.

An example of proposed change to scalable main and scalable main 10 profiles is shown below.

Bitstreams containing output layer sets conforming to the Scalable Main or Scalable Main 10 profiles may obey the following constraints on a derived sub-bitstream for the output layer set indicated to conform to the Scalable Main or Scalable Main 10 profile, respectively, with layerSetIdx being the layer set for the output layer set conforming to Scalable Main or Scalable Main 10 profile, respectively, derived by invoking the sub-bitstream extraction process as specified in subclause F.10 with tIdTarget equal to 7 and with TargetDecLayerIdList containing the nuh_layer_id values layerId of the layer set with the index layerSetIdx for which AuxId[layerId] is equal to 0.

Bitstreams containing output layer sets conforming to the Scalable Main or Scalable Main 10 profiles may also obey the following constraints on the base layer bitstream derived by invoking the sub-bitstream extraction process as specified in subclause F.10 with tIdTarget equal to 7 and with TargetDecLayerIdList containing only one nuh_layer_id value that is equal to 0 as inputs.

The base layer bitstream derived from bitstreams conforming to the Scalable Main profile may obey the following constraints:

The base layer bitstream may obey all constraints of the Main profile specified in subclause A.3.2.

SPSs of the base layer bitstream may have general_profile_idc equal to 1 or general_profile_compatibility_flag[1] equal to 1.

The base layer bitstream derived from bitstreams conforming to the Scalable Main 10 profile may obey the following constraints:

The base layer bitstream may obey all constraints of the Main 10 profile specified in subclause A.3.3.

SPSs of the base layer bitstream may have general_profile_idc equal to 1 or 2, or general_profile_compatibility_flag[1] or general_profile_compatibility_flag[2] equal to 1.

The derived sub-bitstream for an output layer set conforming to the Scalable Main or Scalable Main 10 profiles may obey the following constraints:

All active SPSs for the sub-bitstream may have chroma_format_idc equal to 1 only.

CtbLog2SizeY derived from any active SPS for the sub-bitstream may be in the range of 4 to 6, inclusive.

The variables NumResampling, NumSampleResampling, and NumMotionResampling may be less than or equal to 1 for each decoded picture with nuh_layer_id included in the layer set with the index layerSetIdx.

ScalabilityId[j][smIdx] may be equal to 0 for any smIdx value not equal to 2 and for any value of j for which layer_id_included_flag[layerSetIdx][layer_id_in_nuh[j]] is equal to 1.

For a layer with layer id iNuhLId equal to any of nuh_layer_id included in the layer set with the index layerSetIdx, the value of NumRefLayers[iNuhLId], which specifies the total number of direct and indirect dependent layers and is derived as in F.7.4.3.1, may be less than or equal to 7.

All active SPSs may have sps_extension_type_flag[i] equal to 0 only for i equal to 0, and in the range of 2 to 6, inclusive.

All active PPSs may have pps_extension_type_flag[i] equal to 0 only for i in the range of 0 to 6, inclusive.

The derived sub-bitstream for an output layer set conforming to the Scalable Main profile may obey the following constraints:

All active SPSs for the sub-bitstream may have bit_depth_luma_minus8 equal to 0 only.

All active SPSs for the sub-bitstream may have bit_depth_chroma_minus8 equal to 0 only.

All active PPSs for the sub-bitstream may have colour_mapping_enabled_flag equal to 0 only.

The derived sub-bitstream for an output layer set conforming to the Scalable Main 10 profile may obey the following constraints:

All active SPSs for the sub-bitstream may have bit_depth_luma_minus8 in the range of 0 to 2, inclusive.

All active SPSs for the sub-bitstream may have bit_depth_ chroma_minus8 in the range of 0 to 2, inclusive.

Bitstreams containing output layer sets conforming to the Scalable Main or Scalable Main 10 profiles may obey the following constraints on a derived sub-bitstream for the output layer set, with layerSetIdx being the layer set for the output layer set conforming to the Scalable Main or Scalable Main 10 profile, respectively, derived by invoking the sub-bitstream extraction process as specified in subclause F.10 with tIdTarget equal to 7 and with TargetDecLayerIdList containing the nuh_layer_id values of the layer set with the index layerSetIdx:

a) Each layer in the TargetDecLayerIdList may obey the General tier and level limits in A.4.1, and the Profile-specific level limits a), b), c), d), g), h), i), and j) for the Main and Main 10 profiles specified in A.4.2.

j) The value of partitionSizeInSamplesY may be less than or equal to MaxLumaPs, where MaxLumaPs is specified in Table A-1 for the tier and level of the bitstream partition.

k) For each layer with nuh_layer_id equal to currLayerId in the bitstream partition, the value of pic_width_vps_in_luma_samples of the vps_rep_format_idx[LayerIdxInVps[currLayerId]]-th rep_format( ) syntax structure in the VPS may be less than or equal to Sqrt(MaxLumaPs*8).

l) For each layer with nuh_layer_id equal to currLayerId in the bitstream partition, the value of pic_height_vps_in_luma_samples of the vps_rep_format_idx[LayerIdxInVps[currLayerId]]-th rep_format( ) syntax structure in the VPS may be less than or equal to Sqrt(MaxLumaPs*8).

m) For each layer with nuh_layer_id equal to currLayerId in the bitstream partition, MaxPicSizeInSamplesY is set equal to the value of pic_width_vps_in_luma_samples multiplied by the value of pic_height_vps_in_luma_samples, of the vps_rep_format_idx[LayerIdxInVps[currLayerId]]-th rep_format( ) syntax structure in the VPS.

For each layer with nuh_layer_id equal to currLayerId in the bitstream partition, the value of max_vps_dec_pic_buffering_minus1[optLsIdx][LayerIdxInVps[currLayerId]][HighestTid] may be less than or equal to MaxDpbSize as derived by Equation A-2, with PicSizeInSamplesY being replaced with MaxPicSizeInSamplesY.

b) The value of TotalPicSizeInSamplesY may be less than or equal to 2*MaxLumaPs, where MaxLumaPs is specified in Table A-1, and where TotalPicSizeInSamplesY is derived as follows:

```
TotalPicSizeInSamplesY = 0
for (i = 0; i <= 62; i++)
  if layer i in TargetDecLayerIdList
    TotalPicSizeInSamplesY += PicSizeInSamplesY of the layer with
      nuh_layer_id.
equal to i
``` c) The nominal removal time of access unit n (with n greater than 0) from the CPB, as specified in subclause C.2.3, may satisfy the constraint that AuNominalRemovalTime[n]−AuCpbRemovalTime[n−1] is greater than or equal to Max(TotalPicSizeInSamplesY+(2*MaxLumaSr), fR) for the value of TotalPicSizeInSamplesY of access unit n−1, where MaxLumaSr is the value specified in Table A-2 that applies to access unit n−1.

d) For the VCL HRD parameters, BitRate[i] may be less than or equal to 2*CpbBrVclFactor*MaxBR for at least one value of i in the range of 0 to cpb_cnt_minus1[HighestTid], inclusive, where BitRate[i] is specified in subclause E.2.3 based on parameters selected as specified in subclause C.1 and MaxBR is specified in Table A-2 in units of CpbBrVclFactor bits/s.

e) For the NAL HRD parameters, BitRate[i] may be less than or equal to 2*CpbBrNalFactor*MaxBR for at least one value of i in the range of 0 to cpb_cnt_minus1[HighestTid], inclusive, where BitRate[i] is specified in subclause E.2.3 based on parameters selected as specified in subclause C.1 and MaxBR is specified in Table A-2 in units of CpbBrNalFactor bits/s.

Additionally similar constraint may be proposed for other profiles.

In another embodiment one or more of the syntax elements may be signaled using a known fixed number of bits instead of u(v) instead of ue(v). For example they could be signaled using u(8) or u(16) or u(32) or u(64), etc.

In another embodiment one or more of these syntax element could be signaled with ue(v) or some other coding scheme instead of fixed number of bits such as u(v) coding.

In another embodiment the names of various syntax elements and their semantics may be altered by adding a plus1 or plus2 or by subtracting a minus1 or a minus2 compared to the described syntax and semantics.

In yet another embodiment various syntax elements may be signaled per picture anywhere in the bitstream. For example they may be signaled in slice segment header, pps/ sps/ vps/ or any other parameter set or other normative part of the bitstream.

In yet another embodiments all the concepts defined in this invention related to output layer sets could be applied to output operation points [2,3] and/or to operation points [1].

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an ASIC, a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for decoding a video bitstream comprising:
    (a) receiving a first bitstream layer representative of a coded video sequence;
    (b) receiving a second bitstream layer representative of said coded video sequence;
    (c) receiving a first dimension syntax element value associated with said first bitstream layer included within a first set of syntax elements defining a maximum width in luma samples of all pictures in said first bitstream layer;
    (d) receiving a second dimension syntax element value associated with a first picture within said first bitstream layer included within said first set of syntax elements defining the width of said first picture in luma samples;
    (e) receiving a third dimension syntax element value associated with a second picture within said first bitstream layer included within said first set of syntax elements defining the width of said second picture in luma samples;
    (f) receiving a fourth dimension syntax element value associated with said first bitstream layer included within said first set of syntax elements defining a maximum height in luma samples of all pictures in said first bitstream layer;
    (g) receiving a fifth dimension syntax element value associated with said first picture within said first bitstream layer included within said first set of syntax elements defining the height of said first picture in luma samples;
    (h) receiving a sixth dimension syntax element value associated with said second picture within said first bitstream layer included within said first set of syntax elements defining the height of said second picture in luma samples;
    (i) decoding said first picture based upon said second dimension syntax element value and said fifth dimension syntax element value, decoding said second picture based upon said third dimension syntax element value and said sixth dimension syntax element value, where said second dimension syntax element value is less than said first dimension syntax element value, where said third dimension syntax element value is less than said first dimension syntax element value, where said second dimension syntax element value has a different value than said third dimension syntax element value, where said fifth dimension syntax element value is less than said fourth dimension syntax element value, where said sixth dimension syntax element value is less than said fourth dimension syntax element value, where said fifth dimension syntax element value has a different value than said sixth dimension syntax element value.

\* \* \* \* \*

UNITED STATES PATENT AND TRADEMARK OFFICE
CERTIFICATE OF CORRECTION

PATENT NO. : 9,699,480 B2
APPLICATION NO. : 14/738552
DATED : July 4, 2017
INVENTOR(S) : Sachin G. Deshpande It is certified that error appears in the above-identified patent and that said Letters Patent is hereby corrected as shown below:

In the Specification

Column 15, Line 52:
Change "(au_cpb_removal_delay_minus1+1)*to == $T_{du}(k)$" to read --(au_cpb_removal_delay_minus1 + 1 ) * $t_c$ == $T_{du}(k)$--.

Column 16, Line 35:
Change "decoding unit, to is a clock" to read --decoding unit, $t_c$ is a clock--.

Columns 23-24, Table 4 (cont.'d), Line 3:
Change "Reserved non-TRAP" to read --Reserved non-IRAP--.

Column 30, Line 25:
Change "0 to 232-2" to read --$2^{32}-2$--.

Column 34, Line 20:
Change "= ( r – BitRate[ SchedSelIdx – 1 ]) □ ( BitRate[ SchedSelIdx ] – BitRate[ SchedSelIdx – 1 ] )," to read --□ = ( r – BitRate[ SchedSelIdx – 1 ] ) □ ( BitRate[ SchedSelIdx ] – BitRate[ SchedSelIdx – 1 ] ),--.

Column 58, Line 9:
Change "else if( NPicSizeInSamplesY[ k ] <= ( ( 3 * MaxLunnaPs ) >> 2 ) )" to read --else if( NPicSizeInSamplesY[ k ] <= ( ( 3 * MaxLumaPs ) >> 2) ) --.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*